(12) United States Patent
Wang et al.

(10) Patent No.: US 11,970,575 B2
(45) Date of Patent: Apr. 30, 2024

(54) BIODERIVED RECYCLABLE EPOXY-ANHYDRIDE THERMOSETTING POLYMERS AND RESINS

(71) Applicant: Alliance for Sustainable Energy, LLC, Golden, CO (US)

(72) Inventors: Chen Wang, Superior, CO (US); Robynne E. Murray, Superior, CO (US); Gregg Tyler Beckham, Golden, CO (US); Scott Mauger, Arvada, CO (US); Nicholas A. Rorrer, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 237 days.

(21) Appl. No.: 17/494,514

(22) Filed: Oct. 5, 2021

(65) Prior Publication Data
US 2022/0106442 A1 Apr. 7, 2022

Related U.S. Application Data

(60) Provisional application No. 63/087,547, filed on Oct. 5, 2020.

(51) Int. Cl.
| | | |
|---|---|---|
| C08G 67/04 | (2006.01) | |
| B32B 7/12 | (2006.01) | |
| B32B 17/10 | (2006.01) | |
| B32B 27/08 | (2006.01) | |
| B32B 27/30 | (2006.01) | |
| B32B 27/32 | (2006.01) | |
| B32B 27/36 | (2006.01) | |
| B32B 27/38 | (2006.01) | |
| C08J 5/18 | (2006.01) | |
| C08J 11/24 | (2006.01) | |
| C08K 3/04 | (2006.01) | |
| C08K 7/06 | (2006.01) | |
| C08K 7/14 | (2006.01) | |
| C09D 173/02 | (2006.01) | |

(52) U.S. Cl.
CPC .......... *C08G 67/04* (2013.01); *B32B 7/12* (2013.01); *B32B 17/10* (2013.01); *B32B 27/08* (2013.01); *B32B 27/306* (2013.01); *B32B 27/32* (2013.01); *B32B 27/36* (2013.01); *B32B 27/38* (2013.01); *C08J 5/18* (2013.01); *C08J 11/24* (2013.01); *C08K 3/04* (2013.01); *C08K 7/06* (2013.01); *C08K 7/14* (2013.01); *C09D 173/02* (2013.01); *B32B 2255/10* (2013.01); *B32B 2255/26* (2013.01); *C08G 2230/00* (2013.01); *C08J 2373/02* (2013.01); *C08J 2423/04* (2013.01); *C08J 2423/10* (2013.01); *C08J 2429/04* (2013.01); *C08J 2467/00* (2013.01)

(58) Field of Classification Search
CPC ................. C08G 67/04; C08G 59/22
See application file for complete search history.

(56) References Cited

U.S. PATENT DOCUMENTS

| | | |
|---|---|---|
| 5,376,428 A | 12/1994 | Palazzotto et al. |
| 8,742,018 B2 | 6/2014 | Reynolds et al. |
| 10,639,844 B2 | 5/2020 | Rolland et al. |
| 11,034,084 B2 | 6/2021 | Chen et al. |
| 11,090,859 B2 | 8/2021 | Menyo et al. |
| 2020/0165481 A1 | 5/2020 | Shieh et al. |

FOREIGN PATENT DOCUMENTS

| | | | |
|---|---|---|---|
| EP | 2 742 108 B1 | 1/2018 | |
| JP | 2005060662 A * | 3/2005 | ............ C08G 59/42 |
| WO | 2017/087094 A1 | 5/2017 | |

OTHER PUBLICATIONS

Yang et al The network structure and properties of multifunctional epoxy/anhydride systems, High Performance Polymers 2016, vol. 28(7) 854-860, published on Jul. 2015.*
Fan et al Curing behaviors and properties of an extrinsic toughened epoxy/anhydride system and an intrinsic toughened epoxy/anhydride system, Thermochimica Acta 554 (2013) 39-47, published on Dec. 2012.*
Supanchaiyamat et al (Thermosetting resin based on epoxidised linseed oil and bio-derived crosslinker, Green Chem., 2012, 14, 1759-1765, published on Jul. 2012.*
Jin et al Synthesis and application of epoxy resins: A review, / Journal of Industrial and Engineering Chemistry 29 (2015) 1-11, published on Apr. 2015.*
Carbonell-Verdu et al., "Development of environmentally friendly composite matrices from epoxidized cottonseed oil", European Polymer Journal, 2015, vol. 63, pp. 1-10.
Crater et al., "How Genomatica and Novamont successfully started up a 30,000 ton/yr bio-based 1,4-butanediol plant", Recent Advances in Fermentation Technology, available at https://sim.confex.com/sim/raft12/meetingapi.cgi/Paper/35059?filename=raft12_Paper35059.pdf&template=Word, accessed on Feb. 2, 2022, pp. 1-1.

(Continued)

*Primary Examiner* — Gregory Listvoyb
(74) *Attorney, Agent, or Firm* — Michael A. Mcintyre

(57) ABSTRACT

The present disclosure relates to a composition that includes a structure that includes

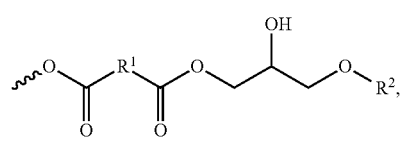

where $R_1$ includes at least one of a carbon atom and/or an oxygen atom, $R^2$ includes at least one of a carbon atom and/or an oxygen atom, and ⌇ represents a covalent bond. In some embodiments of the present disclosure, the composition may be bioderived.

13 Claims, 44 Drawing Sheets

(56) References Cited

OTHER PUBLICATIONS

Denissen et al., "Vitrimers: permanent organic networks with glass-like fluidity", Chemical Science, 2016, vol. 7, No. 1, pp. 30-38.
Dong et al., "Enhance interfacial properties of glass fiber/epoxy composites with environment-friendly water-based hybrid sizing agent", Composites Part A: Applied Science and Manufacturing, 2017, vol. 102, pp. 357-367.
Fukushima et al., "Advanced chemical recycling of poly(ethylene terephthalate) through organocatalytic aminolysis", Polymer Chemistry, 2013, vol. 4, pp. 1610-1616.
Han et al., "A Catalyst-Free Epoxy Vitrimer System Based on Multifunctional Hyperbranched Polymer", Macromolecules, 2018, vol. 51, No. 17, pp. 6789-6799.
Hao et al., "Triethanolamine-Mediated Covalent Adaptable Epoxy Network: Excellent Mechanical Properties, Fast Repairing, and Easy Recycling", Macromolecules, 2020, vol. 53, No. 8, pp. 3110-3118.
Kamber et al., "The Depolymerization of Poly(ethylene terephthalate) (PET) Using N-Heterocyclic Carbenes from Ionic Liquids", Journal of Chemical Education, 2010, vol. 87, No. 5, pp. 519-521.
Kuang et al., "Dissolution of epoxy thermosets via mild alcoholysis: the mechanism and kinetics study", RSC advances, 2018, vol. 8, pp. 1493-1502.
Kuang et al. "Extraction of Biolubricant via Chemical Recycling of Thermosetting Polymers", ACS Sustainable Chemistry & Engineering, 2019, vol. 7, pp. 6880-6888.
Kurokawa et al., "Methanolysis of polyethylene terephthalate (PET) in the presence of aluminium tiisopropoxide catalyst to form dimethyl terephthalate and ethylene glycol", Polymer Degradation and Stability, 2003, vol. 79, No. 3, pp. 529-533.
Li et al., "Catalyst-free vitrimer elastomers based on a dimer acid: robust mechanical performance, adaptability and hydrothermal recyclability", Green Chemistry, 2020, vol. 22, No. 3, pp. 870-881.
McBride et al., "Enabling Applications of Covalent Adaptable Networks", Annual Review of Chemical and Biomolecular Engineering, 2019, vol. 10, pp. 175-198.
Montarnal et al., "Silica-like malleable materials from permanent organic networks", Science, Nov. 2011, vol. 334, No. 6058, pp. 965-968.
Nicholson et al., "Manufacturing energy and greenhouse gas emissions associated with plastics consumption", Joule, Mar. 2021, vol. 5, No. 3, pp. 673-686.
Palmer et al., "Successful closed-loop recycling of thermoset composites", Composites Part A: Applied Science and Manufacturing, Apr. 2009, vol. 40, No. 4, pp. 490-498.
Pham et al., "Low-energy catalytic methanolysis of poly(ethyleneterephthalate)", Green Chemistry, 2021, vol. 23, pp. 511-525.
Raheem et al., "Current developments in chemical recycling of post-consumer polyethylene terephthalate wastes for new materials production: A review", Journal of Cleaner Production, 2019, vol. 225, No. 10, pp. 1052-1064.
Rocks et al., "The kinetics and mechanism of cure of an amino-glycidyl epoxy resin by a co-anhydride as studied by FT-Raman spectroscopy", Polymer, 2004, vol. 45, No. 20, pp. 6799-6811.
Röttger et al., "High-performance vitrimers from commodity thermoplastics through dioxaborolane metathesis", Science, 2017, vol. 356, No. 6333, pp. 62-65.
Samper et al., "Properties of biobased epoxy resins from epoxidized linseed oil (ELO) crosslinked with a mixture of cyclic anhydride and maleinized linseed oil", eXPRESS Polymer Letters, 2019, vol. 13, No. 5, pp. 407-418.
Shi et al., "Recyclable 3D printing of vitrimer epoxy", Materials Horizons, 2017, vol. 4, pp. 598-607.
Taynton et al., "Heat- or Water-Driven Malleability in a Highly Recyclable Covalent Network Polymer", Advance Materials, 2014, vol. 26, No. 23, pp. 3938-3942.
Taynton et al., "Repairable Woven Carbon Fiber Composites with Full Recyclability Enabled by Malleable Polyimine Networks", Advanced Materials, 2016, vol. 28, No. 15, pp. 2904-2909.
Wang et al., "Recyclable and repolymerizable thiol-X photopolymers", Materials Horizons, 2018, vol. 5, No. 6, pp. 1042-1046.
Wang et al., "Recyclable, Self-Healable, and Highly Malleable Poly(urethane-urea)s with Improved Thermal and Mechanical Performances", ACS Applied Materials & Interfaces, 2020, vol. 12, vol. 31, pp. 35403-35414.
Webster et al., "High performance bio-based thermosets from highly functional resin systems", 21st Annual Green Chemistry & Engineering Conference, Jun. 2017, pp. 1-16.
Worrell et al., "Bistable and photoswitchable states of matter", Nature Communications, 2018, vol. 9, No. 2804, pp. 1-7.
Wu et al., "Fully Biobased Vitrimers from Glycyrrhizic Acid and Soybean Oil for Self-Healing, Shape Memory, Weldable, and Recyclable Materials", ACS Sustainable Chemistry & Engineering, 2020, vol. 8, No. 16, pp. 6479-6487.
Xi et al., "Study on depolymerization of waste polyethylene terephthalate into monomer of bis(2-hydroxyethyl terephthalate)", Polymer Degradation and Stability, 2005, vol. 87, No. 1, pp. 117-120.
Yang et al., "The influence of tertiary amine accelerators on the curing behaviors of epoxy/anhydride systems", Thermochimica Acta, 2014, vol. 577, No. 10, pp. 11-16.
Ying et al., "Dynamic urea bond for the design of reversible and self-healing polymers", Nature Communications, Feb. 2014, vol. 5, No. 3218, pp. 1-9.
Yu et al., "Carbon fiber reinforced thermoset composite with near 100% recyclability", Advanced Functional Materials, 2016, vol. 26, No. 33, pp. 6098-6106.
Zhang et al., "Malleable and Recyclable Poly(urea-urethane) Thermosets bearing Hindered Urea Bonds", Advanced Materials, 2016, vol. 28, No. 35, pp. 7646-7651.
Alizadeh et al., "Flexible acrylic-polyurethane based graft-interpenetrating polymer networks for high impact structural applications", European Polymer Journal, Apr. 2021, vol. 148, pp. 1-11.
Ratna et al., "Interpenetrating Polymer Network of Rubbery Epoxy and Glassy PMMA: Network Inhomogeneities and Dynamic Heterogeneities", ACS Applied Polymer Materials, 2021, vol. 3, No. 10, pp. 5073-5086.

* cited by examiner

Formula A after degradation    Epoxy-amine no degradation

Panel A

Panel B

Panel A

Panel B

Panel A

Panel B

Panel A

Panel B

NMR Spectra Demonstrating the that Hardener can be reclaimed from depolymerization mixtures

BIODERIVED RECYCLABLE EPOXY-ANHYDRIDE THERMOSETTING POLYMERS AND RESINS

CROSS-REFERENCE TO RELATED APPLICATIONS

This application claims priority from U.S. Provisional Patent Application No. 63/087,547 filed on Oct. 5, 2020, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Currently thermosetting polymers are almost exclusively not recyclable and thus, not recycled. For example, there are over 900,000 metric tons of composite materials from wind blades in the United States alone. Most wind turbine blades are made using thermoset composite materials such as epoxies, polyesters and vinyl esters, which are not recyclable, and hence a large majority of blade materials end up in landfills. For another example, epoxy-amine based coating and adhesive materials are not degradable. Therefore, these coating and adhesives often prohibit the recovery and reuse of their substrate materials. Thus, there is an urgent need for drop-in solutions of new thermosetting polymers that are inherently recyclable.

SUMMARY

An aspect of the present disclosure is a composition that includes a structure that includes

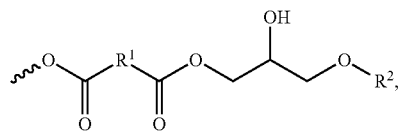

where $R_1$ includes at least one of a carbon atom and/or an oxygen atom, $R^2$ includes at least one of a carbon atom and/or an oxygen atom, and ⌇ represents a covalent bond. In some embodiments of the present disclosure, the composition may be bioderived.

In some embodiments of the present disclosure, $R_2$ may include a hydrocarbon chain having between 1 and 10 carbon atoms.

In some embodiments of the present disclosure, the hydrocarbon chain may be a straight chain.

In some embodiments of the present disclosure, the hydrocarbon chain may be a branched chain.

In some embodiments of the present disclosure, the hydrocarbon chain may be saturated.

In some embodiments of the present disclosure, the hydrocarbon chain may be unsaturated.

In some embodiments of the present disclosure, the hydrocarbon chain may further include at least one of a hydroxyl group, a carboxylic acid group, a glycidal ether, and/or an aromatic.

In some embodiments of the present disclosure, the structure may include at least one of

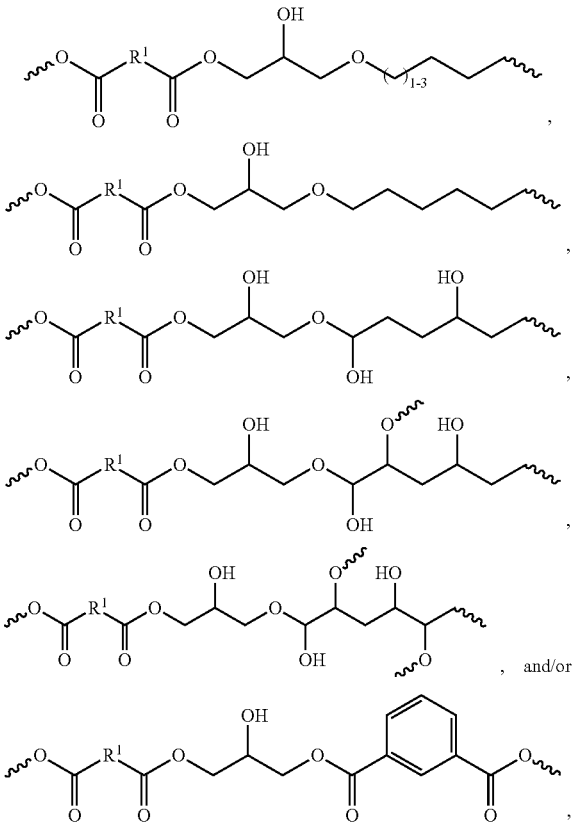

In some embodiments of the present disclosure, the structure may include at least one of

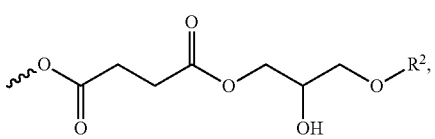

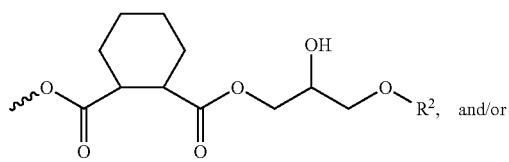

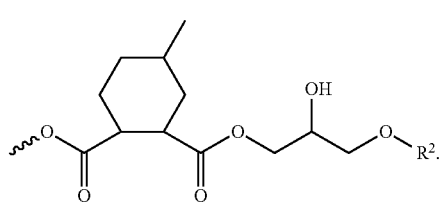

In some embodiments of the present disclosure, the structure may include at least one of

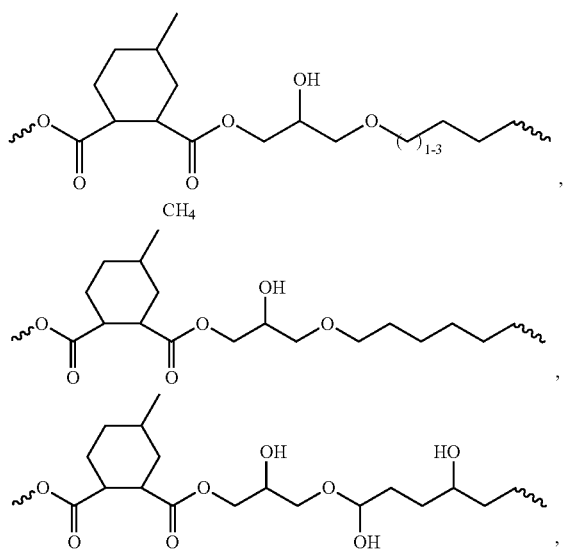

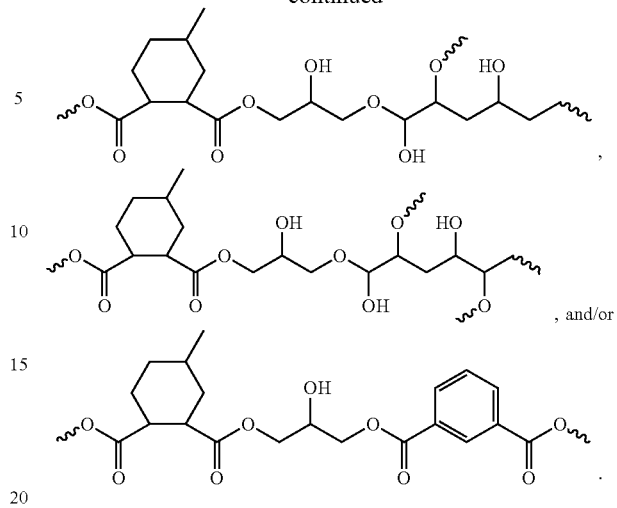

In some embodiments of the present disclosure, the structure may include

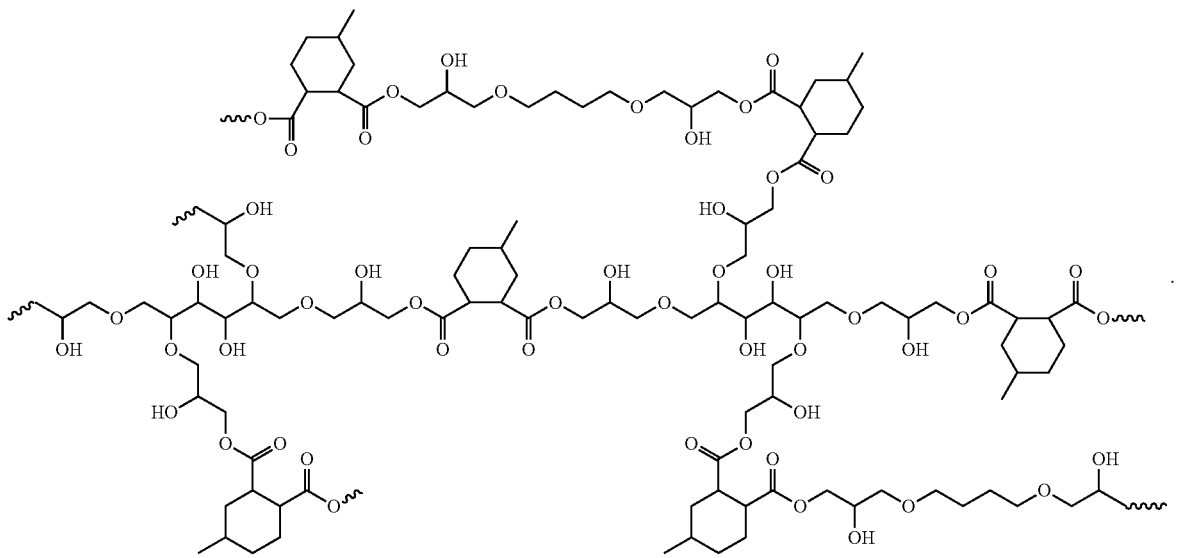

In some embodiments of the present disclosure, the composition may further include a glass transition temperature between about 60° C. and about 130° C. or between about 40° C. to 150° C.

In some embodiments of the present disclosure, the composition may further include a storage modulus between about 10 MPa and about 140 MPa or between about 1 MPa and about 10000 MPa.

In some embodiments of the present disclosure, the composition may further include an ultimate tensile modulus between about 45 MPa and about 75 MPa or between about 50 MPa and about 60 MPa.

In some embodiments of the present disclosure, the composition may further include at least one of a fiber or a particle such as a glass fiber, a carbon fiber, and/or a carbon black particle.

An aspect of the present disclosure is a method for making a composition, where the method includes reacting a first compound with a second compound to form at least one of the polymer or resin, where the first compound has a first structure that includes

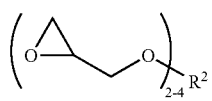

the second compound has a second structure that includes

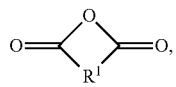

the polymer or resin has a third structure that includes

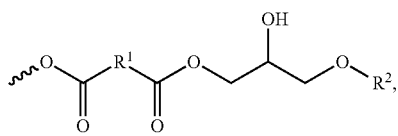

$R_1$ includes at least one of a carbon atom and/or an oxygen atom, $R^2$ includes at least one of a carbon atom and/or an oxygen atom, and ⁿⁿⁿ represents a covalent bond.

An aspect of the present disclosure is a composite that includes a composition having a structure that includes

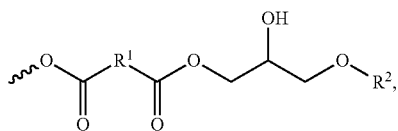

and at least one of a fiber and/or a particle, where $R_1$ includes at least one of a carbon atom and/or an oxygen atom, $R^2$ includes at least one of a carbon atom and/or an oxygen atom, and ⁿⁿⁿ represents a covalent bond.

An aspect of the present disclosure is a composite that includes a first film that includes a composition having a structure that includes

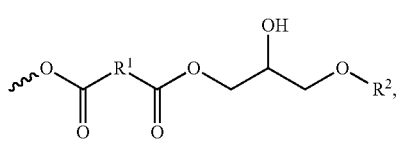

and a second film that includes at least one of a polymer and/or a glass, where $R_1$ includes at least one of a carbon atom and/or an oxygen atom, $R^2$ includes at least one of a carbon atom and/or an oxygen atom, and ⁿⁿⁿ represents a covalent bond.

An aspect of the present disclosure is a method that includes depolymerizing at least one of a polymer and/or a resin having a structure that includes

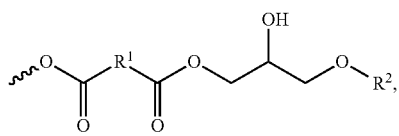

where $R_1$ includes at least one of a carbon atom and/or an oxygen atom, $R^2$ includes at least one of a carbon atom and/or an oxygen atom, the depolymerizing results in

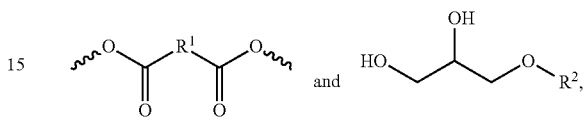

and ⁿⁿⁿ represents a covalent bond.

BRIEF DESCRIPTION OF DRAWINGS

Some embodiments are illustrated in referenced figures of the drawings. It is intended that the embodiments and figures disclosed herein are to be considered illustrative rather than limiting.

DETAILED DESCRIPTION

Figure 1:
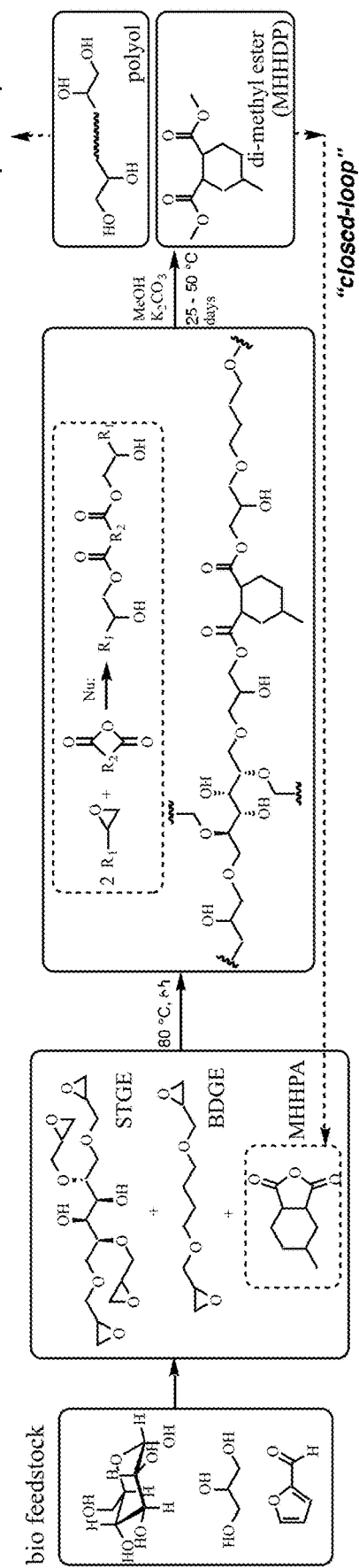
FIG. 1 illustrates an exemplary bioderivable epoxy-anhydride resin, according to some embodiments of the present disclosure. This example is based on three components, sorbitol-derived tetra-glycidyl ether (STGE), butanediol diglycidyl ether (BDGE), and methylhexahydrophthalic anhydride (MHHIPA). The epoxy-anhydride polymerization reaction results in a crosslinked polyester. The ester linkages enable depolymerization by transesterification reactions.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to +20%, ±15%, +10%, +5%, or ±1% of a specific numeric value or target. In some embodiments of the present invention, the term "about" is used to indicate an uncertainty limit of less than or equal to +1%, ±0.9%, ±0.8%, ±0.7%, ±0.6%, +0.5%, ±0.4%, ±0.3%, ±0.2%, or +0.1% of a specific numeric value or target.

The present disclosure relates to chemically recyclable thermosetting polymers and/or resins synthesized from bio-derived monomers, including sugar-derived epoxies, and anhydrides, for example the anhydride derived from maleic anhydride. Such bioderived materials can be drop-in replacements for numerous existing products, including the resin matrix used for glass fiber reinforced wind turbine blade material and antistatic coatings. These bioderived materials can also be chemically depolymerized to produce multifunctional alcohols and/or the starting epoxies and/or hydrides, enabling their recovery and use to produce valuable chemicals and/or new products, as well as the recovery and reuse of the fibers.

As described herein, bioderived polymers and/or resins may be produced by reacting epoxy-functionalized reactants with anhydride reactants. Examples of epoxy-functionalized reactants include,

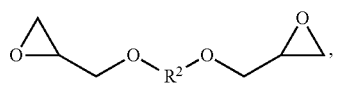

-continued

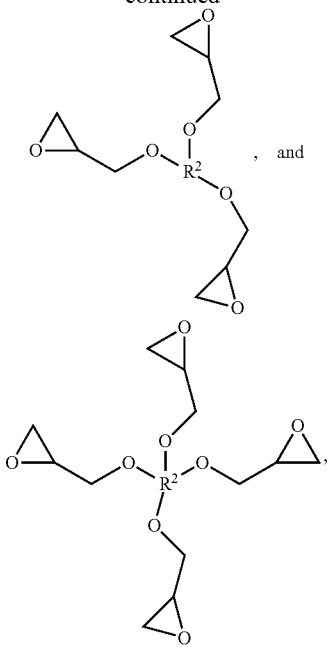

where $R^2$ is a linking group that may include at least one of a carbon atom and/or an oxygen atom. Thus, these three structural examples of epoxy-functionalized reactants may be simplified to the following structure (Structure 1):

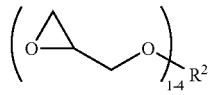

Structure 1

Examples of anhydrides include,

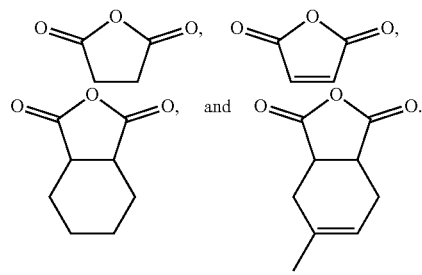

Therefore, these four exemplary anhydrides may be simplified to the following structure, where $R^1$ is a linking group that may include at least one of a carbon atom and/or an oxygen atom (Structure 2):

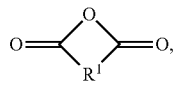

Structure 2

Reacting the generalized structures for an epoxy-functionalized molecule (Structure 1) with an anhydride (Structure 2) can result in a polymer and/or resin having the following generalized structure (Structure 3), where ~ represents a covalent bond:

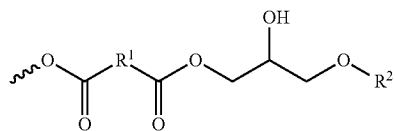

Structure 3

As described herein, in some embodiments of the present disclosure, one or more epoxy-functionalized molecules may be reacted with one or more anhydrides to produce polymers and/or resins, where at least one of the anhydrides and/or epoxy-functionalized molecules are bioderived. A variety of bioderived reactants are possible by changing the structure of at least one of the linking groups $R^1$ and/or $R^2$. For example, in some embodiments of the present disclosure, $R^2$ of the epoxy-functionalized reactant shown as Structure 1 above may include a hydrocarbon chain having between 1 and 10 carbon atoms. Such a hydrocarbon chain may be a straight chain or a branched chain and it may be saturated and/or unsaturated. Further, when R2 is a hydrocarbon chain it may further include a variety of functional groups and/or structures including at least one of a hydroxyl group, a carboxylic acid group, a glycidal ether, and/or an aromatic.

Examples of epoxy-containing reactants for producing bioderived polymers and/or resins, according to some embodiments of the present disclosure, include

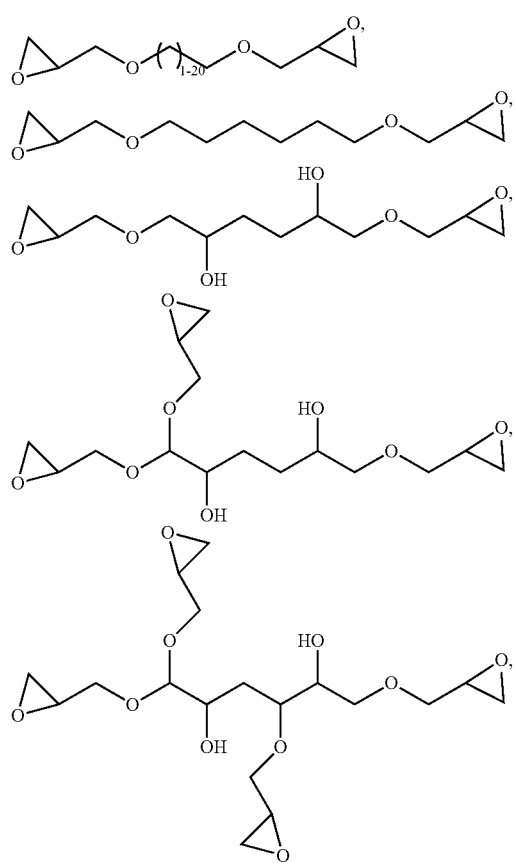

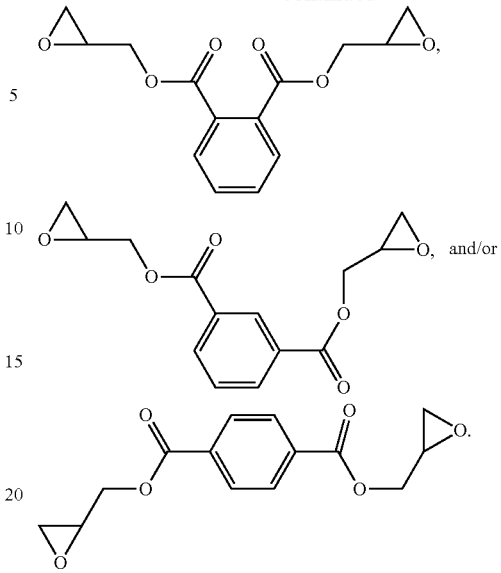

Examples of anhydride reactants for producing bioderived polymers and/or resins, according to some embodiments of the present disclosure, include

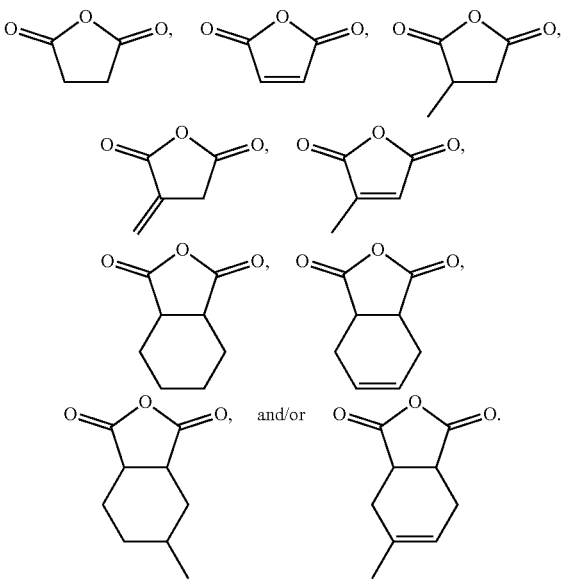

Reacting the exemplary epoxy-containing molecules with the exemplary anhydrides can result in hundreds of possible polymer and/or resin structures. Without intending to limit the scope of the present disclosure, some exemplary structures of such polymer and/or resin structures are illustrated below in Scheme 1.

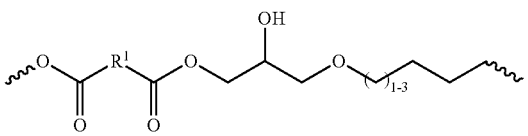

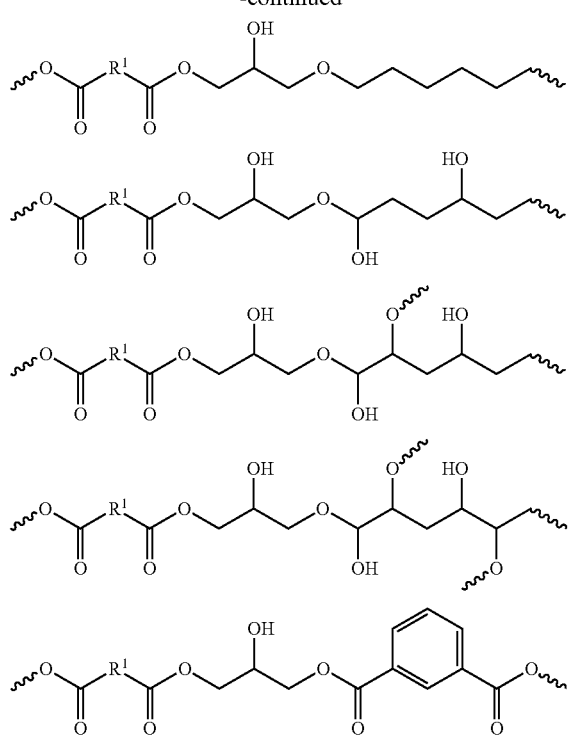

Scheme 1

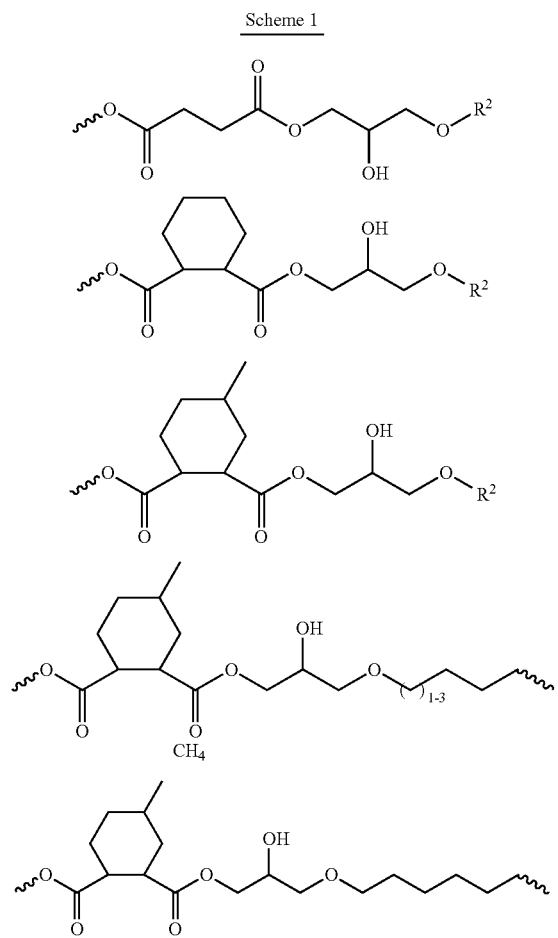

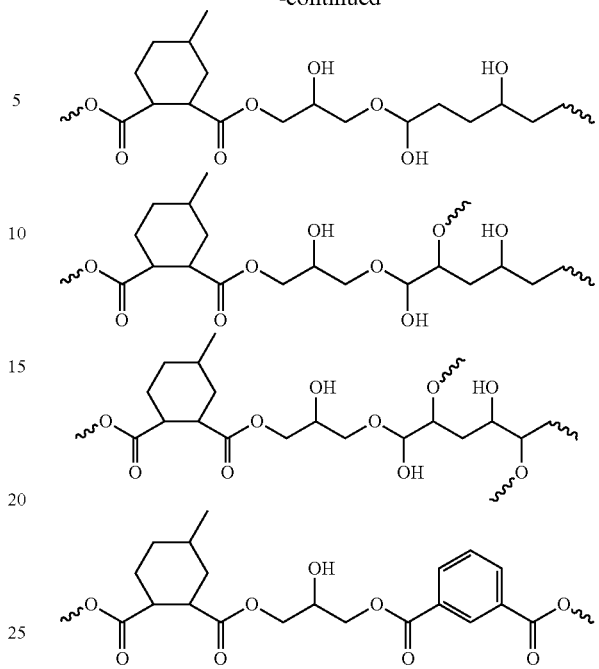

As shown herein, adjusting the choice of reactants, epoxy-containing molecules and/or anhydrides can enable the control and/or tuning of physical properties and/or performance metrics of the resultant polymers and/or resins. For example, in some embodiments of the present disclosure, the final polymer and/or resin may have a glass transition temperature between about 60° C. and about 130° C. or between about 40° C. to 150° C. In some embodiments of the present disclosure, the final polymer and/or resin may have a storage modulus between about 10 MPa and about 140 MPa or between about 1 MPa and about 10000 MPa. In some embodiments of the present disclosure, the final polymer and/or resin may have an ultimate tensile modulus between about 45 MPa and about 75 MPa or between about 50 MPa and about 60 MPa.

As shown herein, the bioderived polymers and/or resins described herein may be combined with fibers and/or particles to produce useful composites. Examples of fibers include glass fibers and/or carbon fibers. An example of a particle is carbon black. As with the polymer/resin itself, the physical properties and/or performance metrics of composites may also be adjusted and tuned to meet a specific need for a particular application. For example, as described herein, in some embodiments of the present disclosure, a polymer/resin/fiber composite may have an in-plane compression strength between about 100 MPa and about 160 MPa or between about 1 MPa an about 1000 MPa. In some embodiments of the present disclosure, a polymer/resin/fiber composite may have a transverse modulus between about 5 GPa and about 20 GPa or between about 0.1 GPa an about 50 GPa. Also shown herein, in some embodiments of the present disclosure, a polymer/resin may be combined with carbon black to produce a composite film having a sheet resistance between about $1 \times 10^3$ to about $4 \times 10^3 \Omega/$.

Further, in some embodiments of the present disclosure, the bioderived polymers and/or resins described herein may be used to make laminates where a film of a polymer/resin is positioned on a substrate and/or placed between two layers of at least one of a plastic and/or glass. For example, in some embodiments of the present disclosure, a laminate may be produces by positioned a film of a bioderived polymer and/or resin, as described herein, between two polymer sheets. Examples of suitable polymers for producing laminates include at least one of a polyester, a polyethylene, a polypropylene, an ethylene vinyl alcohol, and/or an ethylene vinyl alcohol, according to some embodiments of the present disclosure. A polymer/resin film used to produce such laminates may have a thickness between about 0.1 μm and about 100 μm.

Petroleum-based monomers, e.g., bisphenol A-derived epoxy and multifunctional amines, have been widely used as the polymer resin for fiber-reinforced composites (FRC) for decades. While these thermosetting polymers offer state-of-the-art performance in material properties and manufacturability, they lack end-of-life recyclability and utilize greenhouse gas-forming fossil feedstocks. Described herein are bio-derivable polymers and resins produced by epoxy-anhydride polymerization, which satisfy both competitive material properties and manufacturability. Among other things, these polyester based materials may be used as matrices in fiber composites, where, at the end of their functional life, the bio-derived polymers/resins may be depolymerized at near-ambient conditions using inexpensive reagents and catalysts, enabling the easy recovery of the fibers in a condition where they are ready for reuse. In addition, this method may enable the recovery of the building blocks used to initially construct the polymers/resins, enabling their reuse to manufacture new products such as wind turbine blades. Thus, as described herein, a series of cross-linked polyester resins are described that are derivable from bio-based feedstocks. In some embodiments of the present disclosure, a sorbitol-derived epoxy monomer and an aliphatic cyclic anhydride may be used to produce resins well suited as matrix molecules in a variety of applications and products including fiber-reinforced composites (FRCs), coatings on surfaces, and/or films positioned between other films. As described herein, various formulations were designed to fit FRC manufacturing processes, for example, vacuum assisted resin transfer molding (VARTM). As shown herein, the ester linkages enable facile depolymerization of the resins via transesterification reactions. Note: The bioderived resins described herein are compared herein to a commercial resin produced from reacting A di-glycidyl ether (BADGE), hexanediol di-glycidyl ether (HDGE), and isophorone diamine (IPDA) at a stoichiometric ratio between the epoxy groups and the active protons provided by the diamine. This comparative resin is referred to herein as "epoxy-amine" and/or as "typical FRC resin".

Design of recyclable matrices. Epoxy-anhydride systems were chosen as a handle to incorporate the ester linkages, since nucleophilic ring-opening of an epoxy with an acid intermediate results in an ester group. An example of an epoxy-anhydride system, according to some embodiments of the present disclosure, is based on a sorbitol-derived tetra-glycidyl ether (STGE) and methylhexahydrophthalic anhydride (MHHPA). The STGE is statistically tetrafunctional, containing higher (i.e., penta-functional) and lower (i.e., tri-functional) functionalized moieties that the glycidyl group is attached at various hydroxyl sites. When STGE and MHHPA were mixed in a stoichiometric ratio (epoxy to anhydride molar ratio of 2:1), the viscosity of the resultant resin was too high (>1000 cP @ 25° C.) to be used in a VARTM process. A diluent monomer, namely butanediol di-glycidyl ether (BDGE), was added to reduce the viscosity, as shown in FIG. 1. As shown in Table 1, three compositions were evaluated, referred to herein as Formulas A, B, and C, having varying amounts of BDGE, in place of STGE. The results show, that when the amount of BDGE increased from 16.5 wt %, 22.0 wt %, to 27.5 wt %, the viscosities of the mixture were found to be 425 cP, 257 cP, and 175 cP, respectively, at 25° C. So, the addition of BDGE was effective in reducing the viscosity of the resultant resin, resulting in a material having physical properties more suited for the VARTM process. This illustrates that a monomer acting as a diluent can be used to tune the viscosity of the starting reaction mixture to a desired target.

TABLE 1

Details of the three formulas comprising glycidyl ether monomers and an anhydride monomer.

| Formulation name | Sorbitol-tetra glycidyl ether (STGE) | Butanediol di-glycidyl ether (BDGE) | Methylhexa-hydrophthalic anhydride (MHHPA) [1] | Viscosity cP @ 25° C. [2] |
|---|---|---|---|---|
| Formula A | 38.5 wt % | 16.5 wt % | 45.0 wt % | 425 |
| Formula B | 33.0 wt % | 22.0 wt % | 45.0 wt % | 257 |
| Formula C | 27.5 wt % | 27.5 wt % | 45.0 wt % | 175 |

Notes:
[1] In each formula, the molar ratios between glycidyl ether and anhydride are kept at 2 to 1.
[2] Measured on a rheometer with a cone-and-plate setup.

Figure 2A:
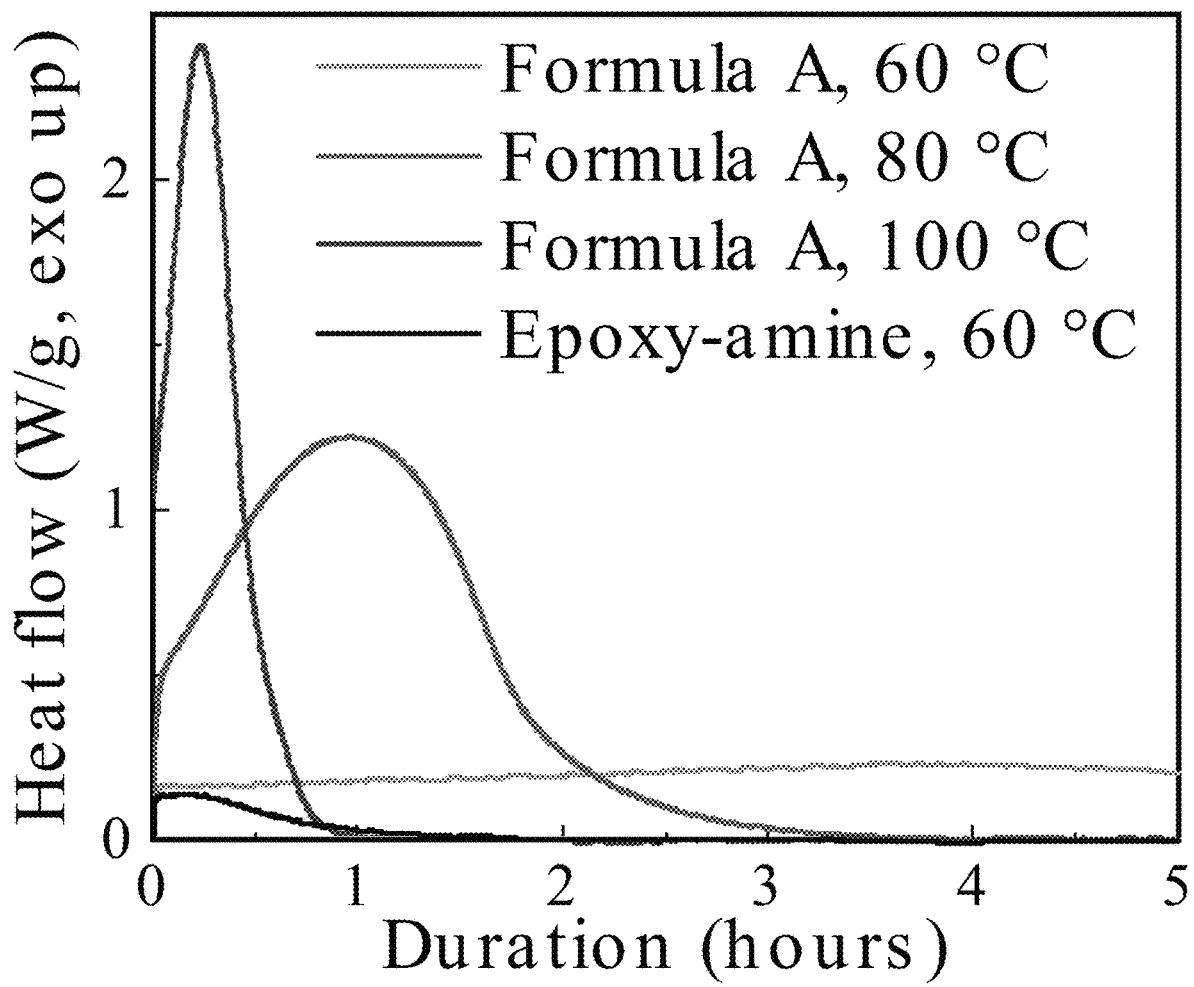
FIG. 2A illustrates exothermic profiles of an exemplary epoxy-anhydride reaction, according to some embodiments of the present disclosure. The sample (~10 mg) was produced using Formula A (see Table 1), containing 1 wt % 2,4-ethylmethylimidazole (EMI) as the catalyst, and was monitored at isotherm conditions at various temperatures.
Figure 2B:
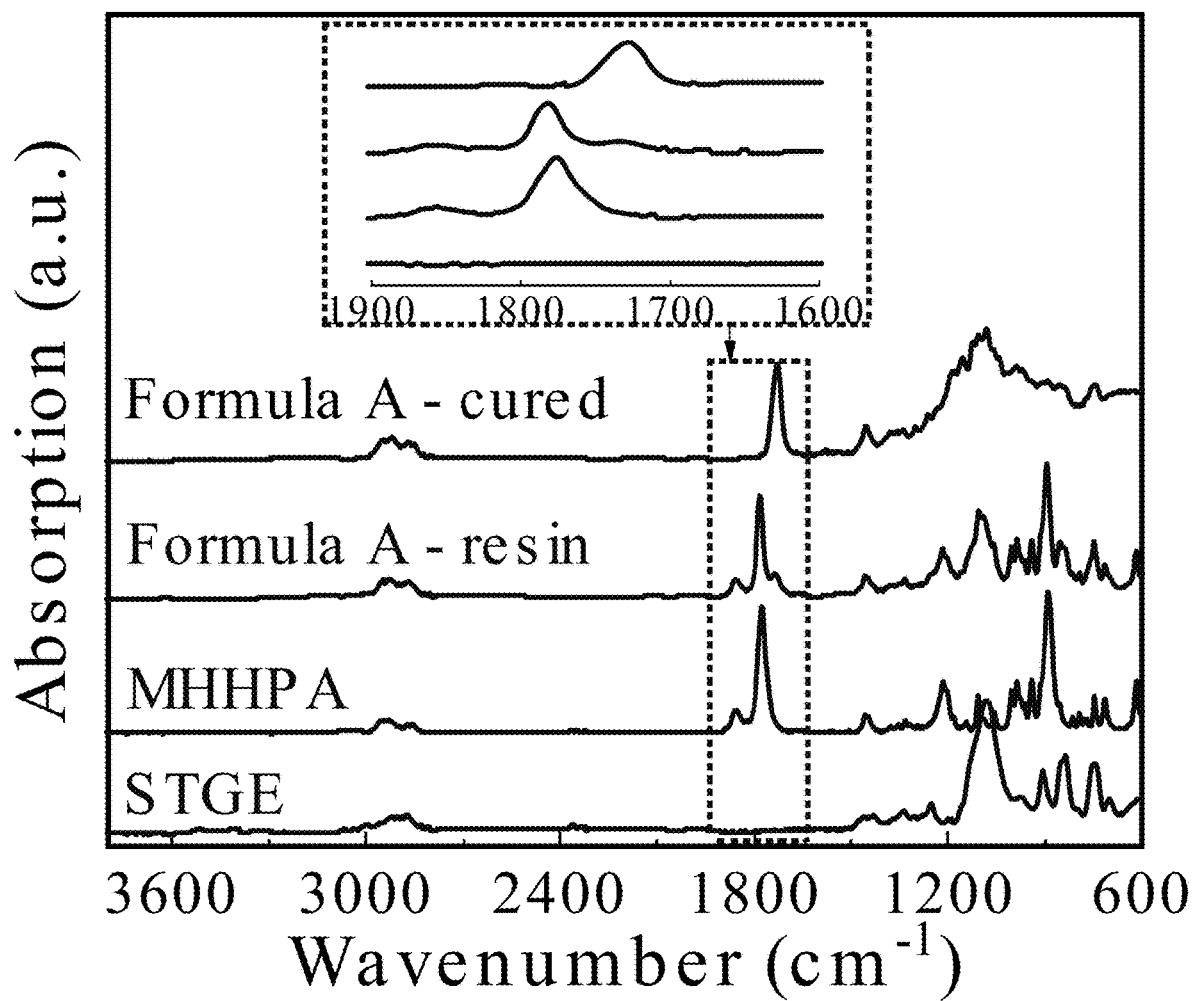
FIG. 2B illustrates FT-IR spectra showing the disappearance of anhydride and the formation of esters, according to some embodiments of the present disclosure. The polymerization was carried out at 80° C. for 5 hrs.
Figure 2C:
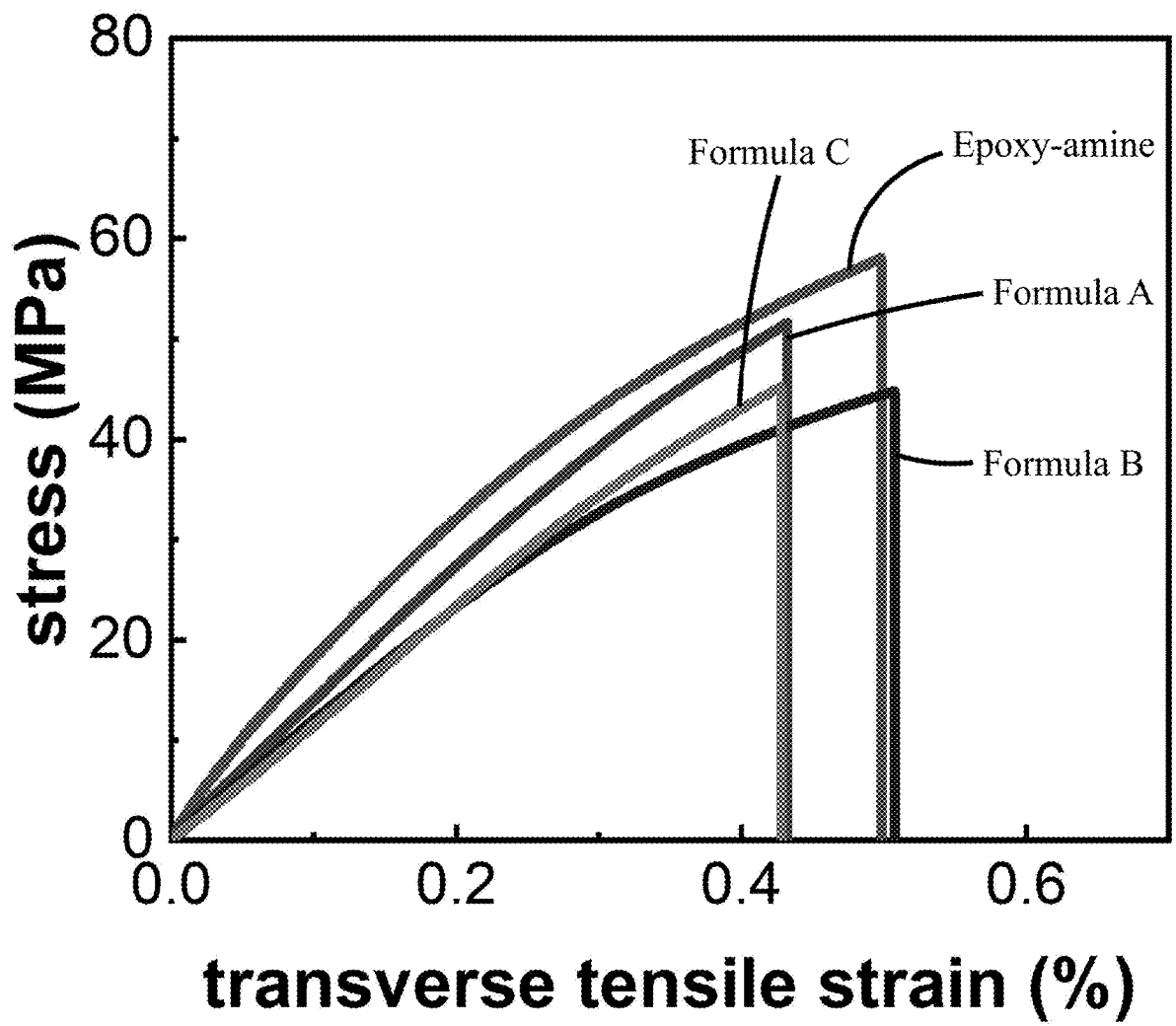
FIG. 2C illustrates tensile stress/strain curves based of ASTM type IV samples tested at 1% strain per minute, according to some embodiments of the present disclosure.

The epoxy-anhydride reaction shown in FIG. 1 used 2-ethyl-4-methylimidazole (EMI) as a catalyst, at a concentration of about 1 wt % with respect to the monomers. The reactions were monitored by time-coursed exothermic measurements by DSC at varied temperatures. As shown in FIG. 2A, the reaction rates increased dramatically as a result of higher reaction temperatures, from about 60° C. to about 100° C. At 100° C. the reaction was complete after about one hour of reaction time, whereas, when at about 80° C., the reaction the reaction time was about four hours, and the reaction was not fully completed after five hours at a reaction temperature of about 60° C. Completion of the epoxy-anhydride reactions were also confirmed by the transformation of the anhydride carbonyl to ester carbonyl groups, as evidenced by Fourier-transform infrared spectroscopy (FTIR). The anhydride carbonyl stretch was found to be at 1780 cm$^{-1}$, as seen in both MHHPA and the mixed monomers; the ester carbonyl stretch was found to be at 1730 cm$^{-1}$ (see FIG. 2B.

Figure 2D:
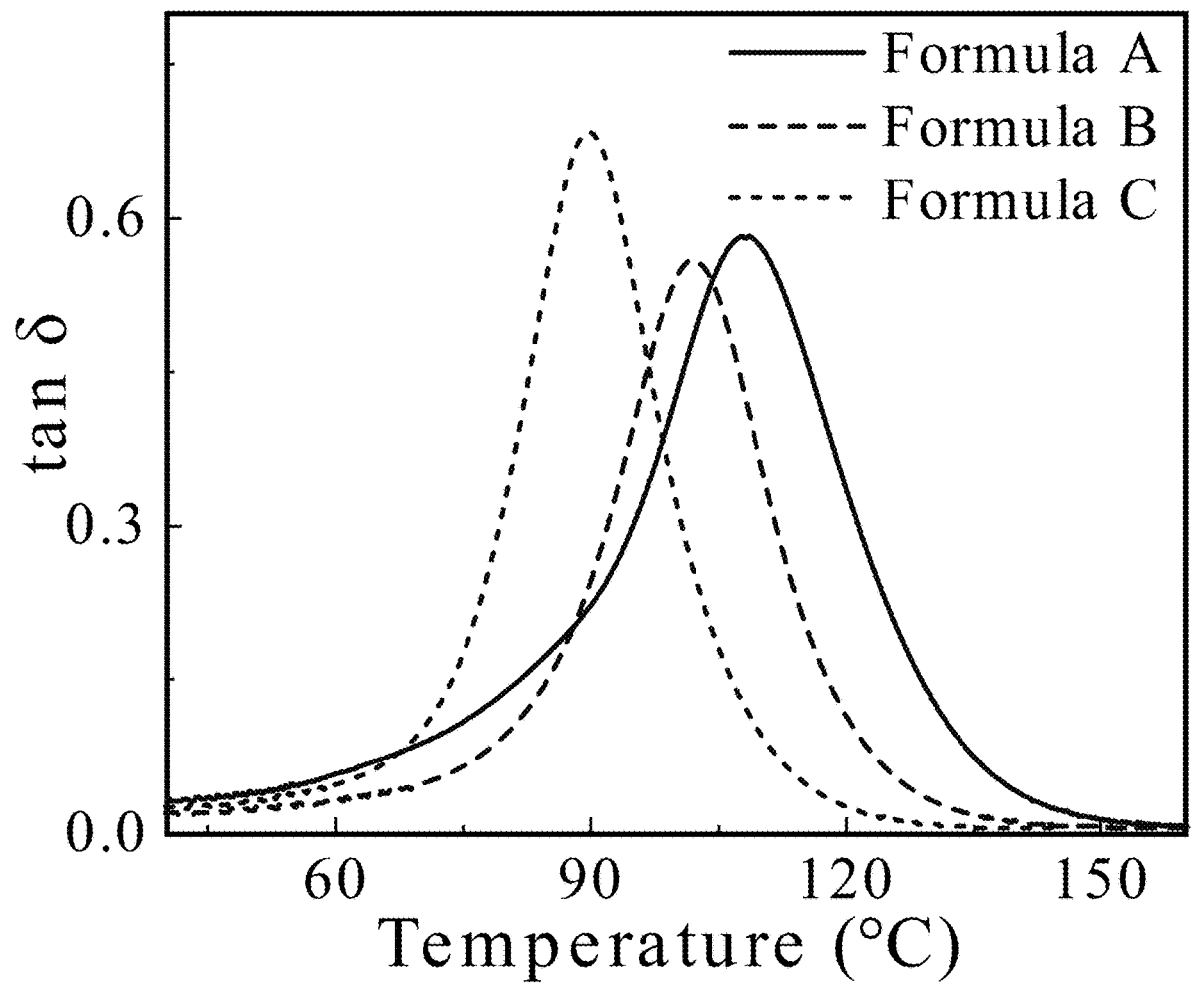
FIG. 2D illustrates glass transition temperatures of exemplary neat polymer matrices described by tan d curves, obtained from a heating cycle on dynamic mechanical analysis (DMA) at 3° C./min at 1 Hz, according to some embodiments of the present disclosure.

Next, neat resin samples were produced at a reaction temperature of about 80° C. and a reaction time of about 5 hours. Samples were prepared according to requirements in ASTM D618. Representative stress-strain curves are shown in FIG. 2D. The tensile modulus and ultimate tensile strength (UTS) were found to vary in the series of Formula A, B, and C. The tensile modulus for Formula A and B were both at 2.8 GPa, while that for Formula C was at 2.3 GPa. The UTS for Formula A and B were similar, at 56±2 MPa and 58±1 MPa, respectively. Formula C provided a UTS of 53±1 MPa. The flexible linkage of the butanediol core within BDGE is likely contributing to the decreased strength demonstrated by Formula C.

Figure 2E:
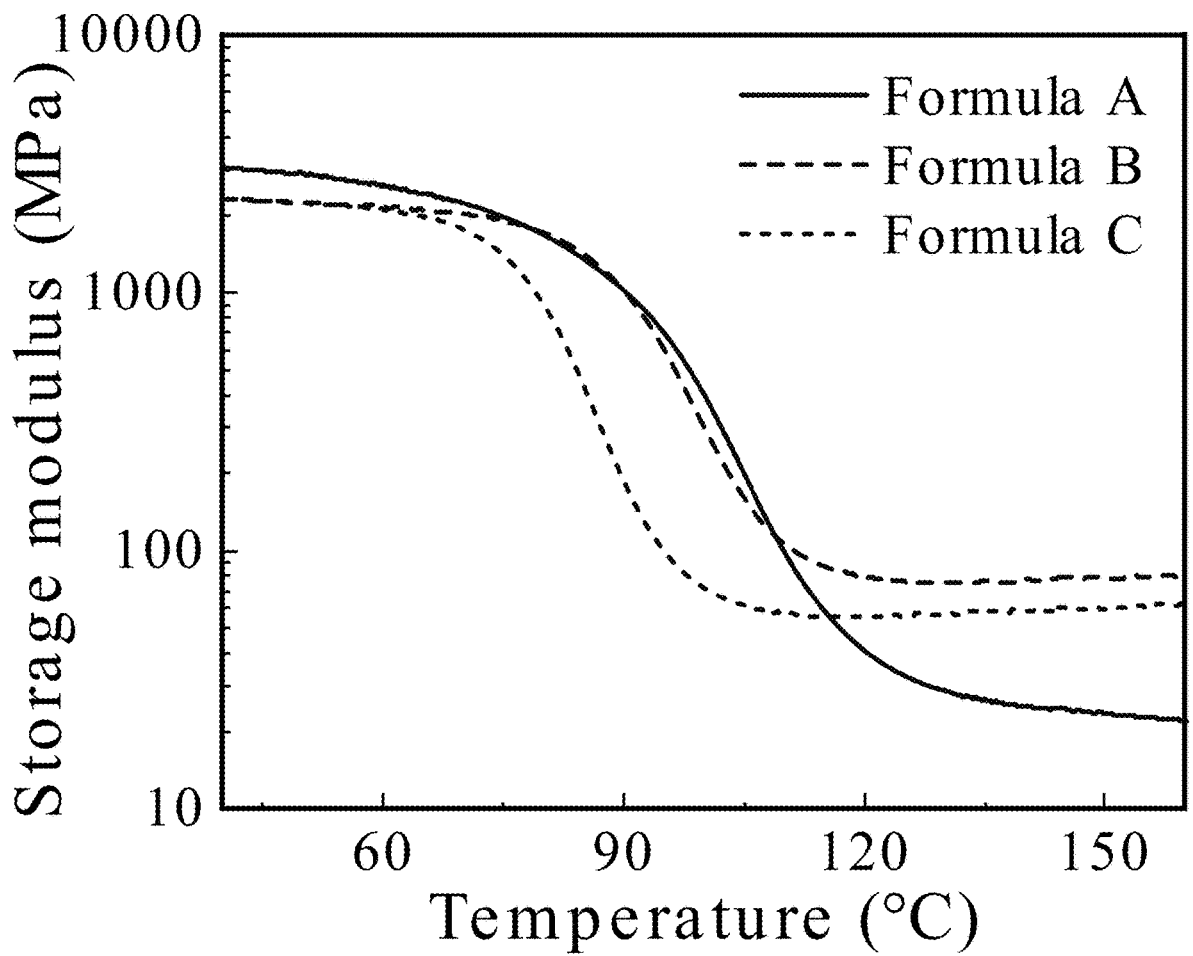
FIG. 2E storage moduli of the neat polymer matrices, as determined by a heating cycle on a DMA at 3° C./min at 1 Hz, according to some embodiments of the present disclosure.
Figure 2F:
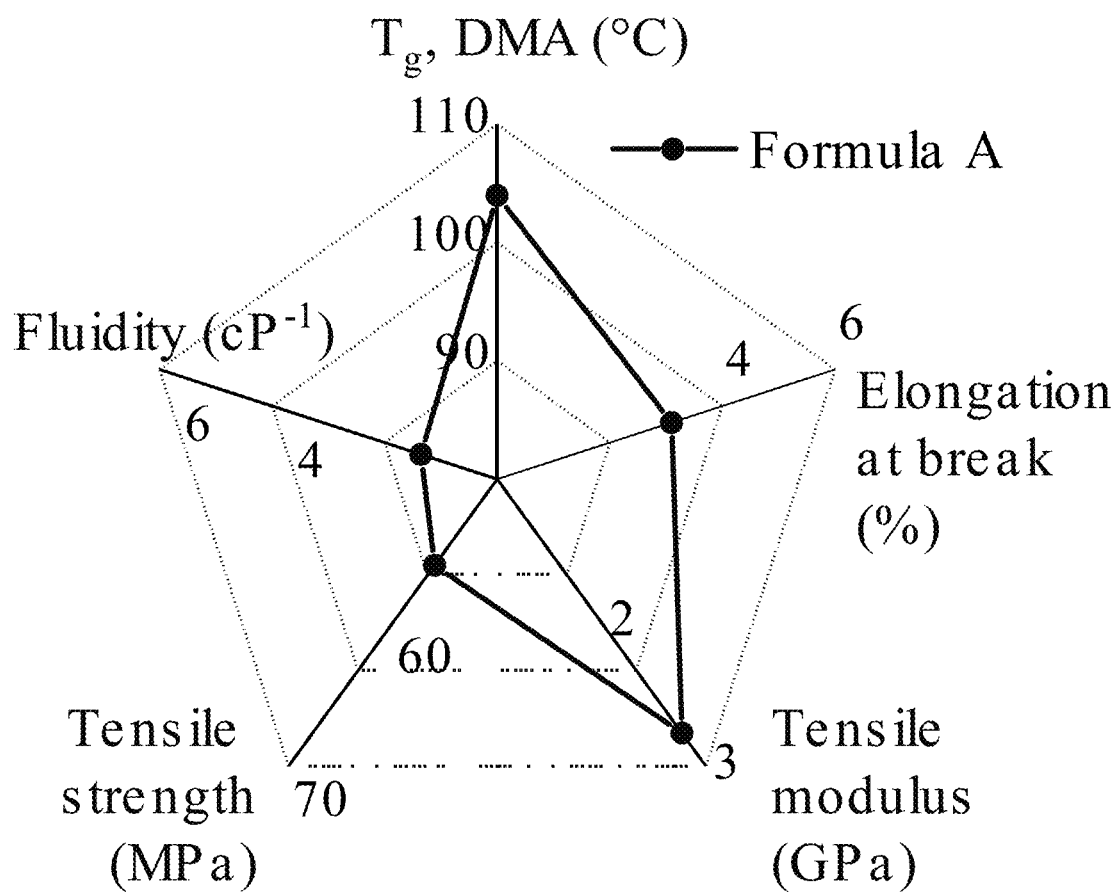
FIGS. 2F-2H illustrate spider charts that summarizes the properties of all three formulas and the industry standard material, according to some embodiments of the present disclosure.

Next, these resins were tested by dynamic mechanical analysis (DMA), through a heating cycle at 3° C./min where each sample was subjected to a 20 μm strain at 1 Hz. $T_g$ was determined at the peak of tan δ curve. Formula A, B, and C showed increasing glass transition temperatures from 82° C. to 110° C., respectively (see FIG. 2E), in an agreement with the trend observed in the tensile test. Additionally, at temperatures beyond $T_g$ the storage modulus became steady at a range between about 50 MPa and about 100 MPa (see FIG.

Figure 2G:
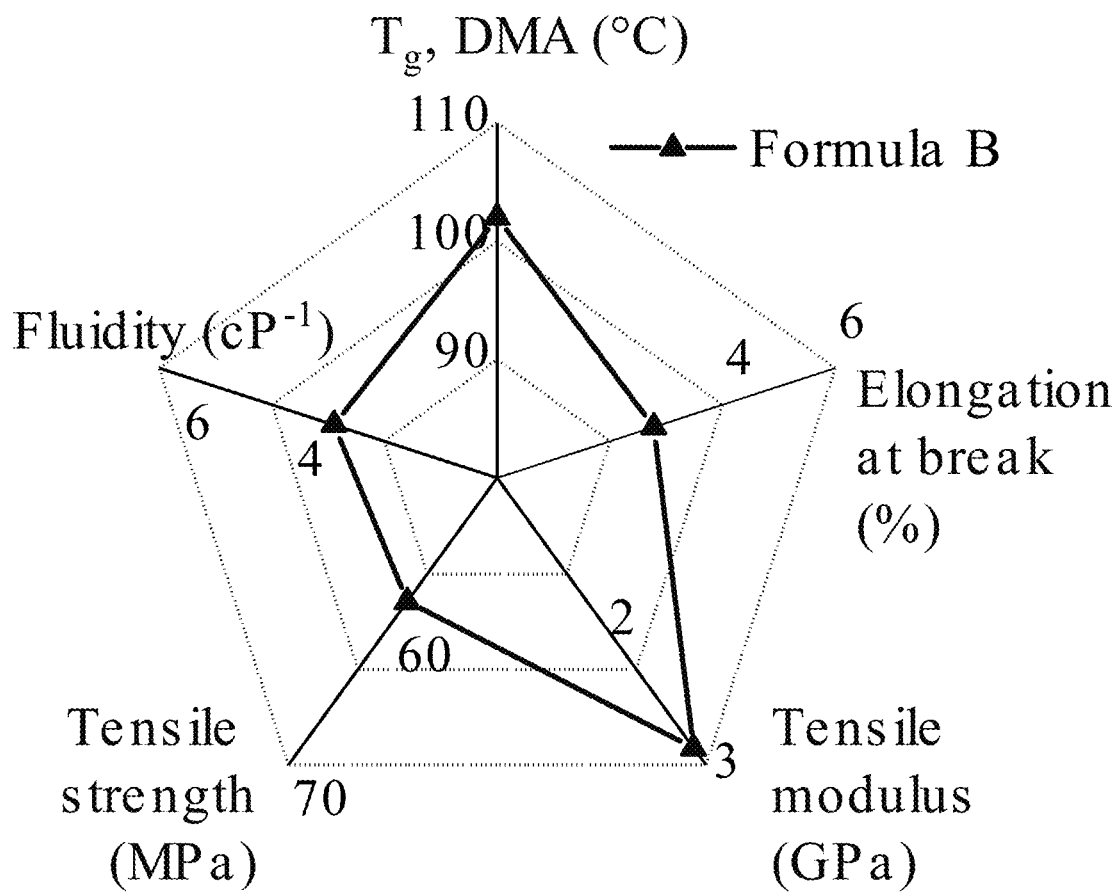
Figure 2H:
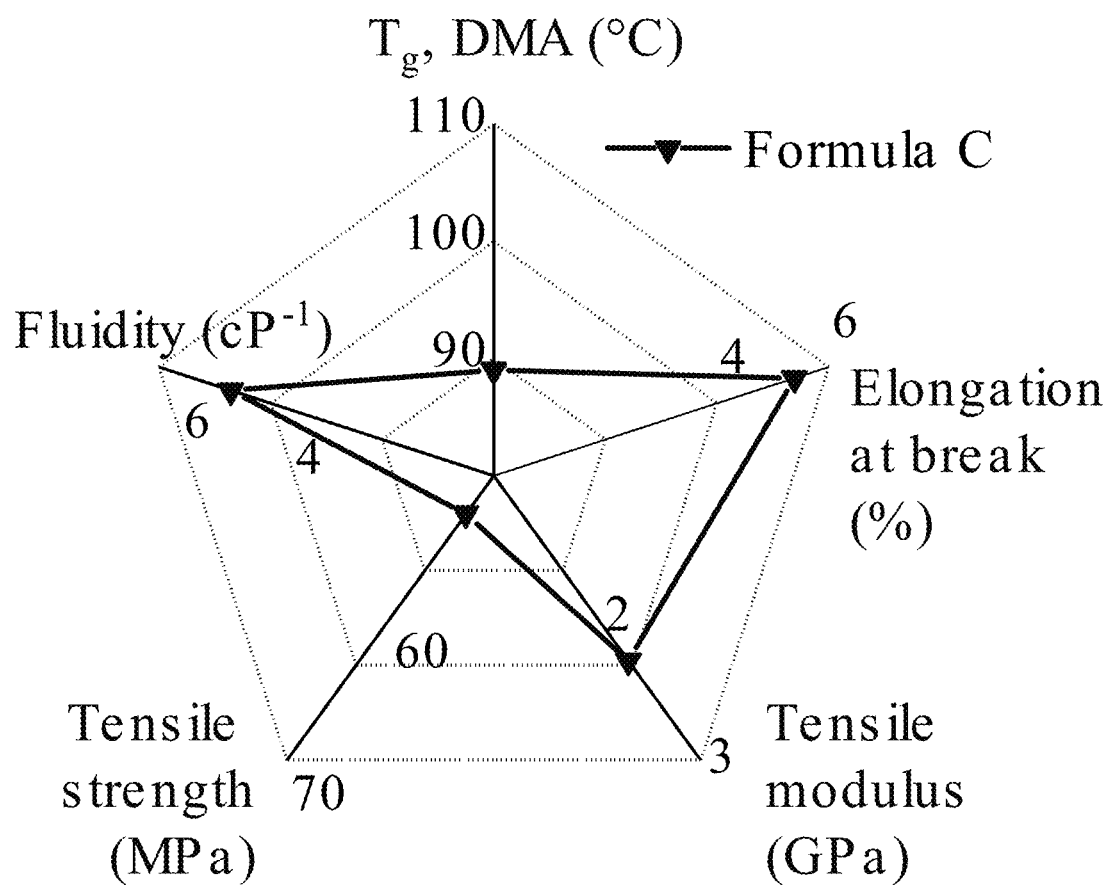
Figure 3:
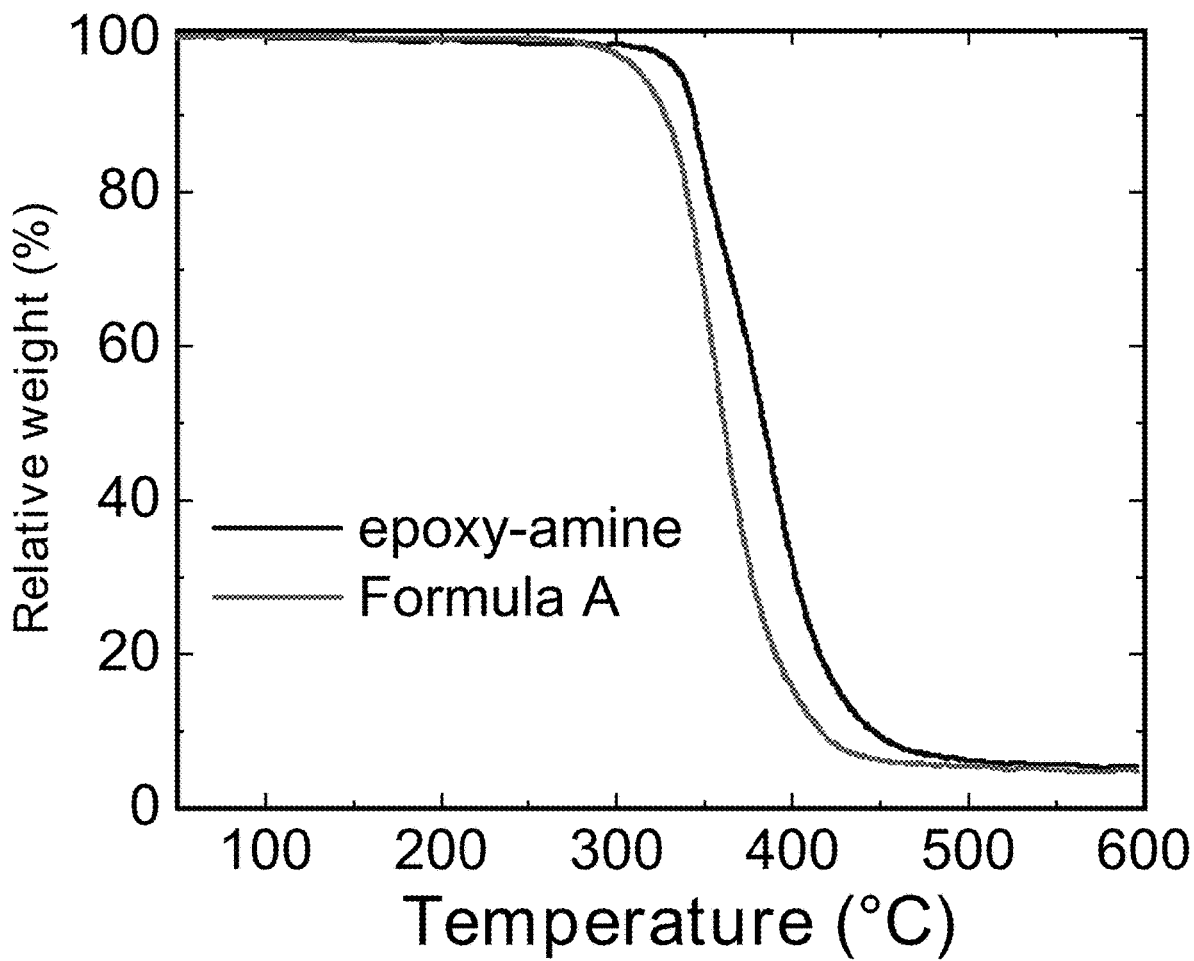
FIG. 3 illustrates TGA curves from an exemplary resin (Formula A) and the typical fiber reinforced composite (FRC) resin (i.e., an epoxy-amine), according to some embodiments of the present disclosure. A temperate ramping rate of 50° C./min was used, under nitrogen.

2F), confirming a thermosetting behavior and the network structures of these epoxy-anhydride materials. Further, these materials were found to be thermally stable, under air, up to 290° C. (by thermogravimetric analysis, see FIG. 3), further in agreement with their network structure. The overall properties of these materials are summarized in FIG. 2G as a "spider" chart, including fluidity (reciprocal of viscosity), tensile properties, and $T_g$.

Performance evaluation of glass fiber composites. FRC samples were prepared contacting four layers of unidirectional glass fiber fabric with the mixed monomers, STGE, MHHPA, and BDGE. Square panels, approximately one foot by one foot in dimension, took less than 15 minutes to become fully wetted with the reactants (wet out), similarly to the typical FRC resin. The infused panels were kept at 80° C. for about 5 hours to ensure complete reaction occurred.

Figure 4A:
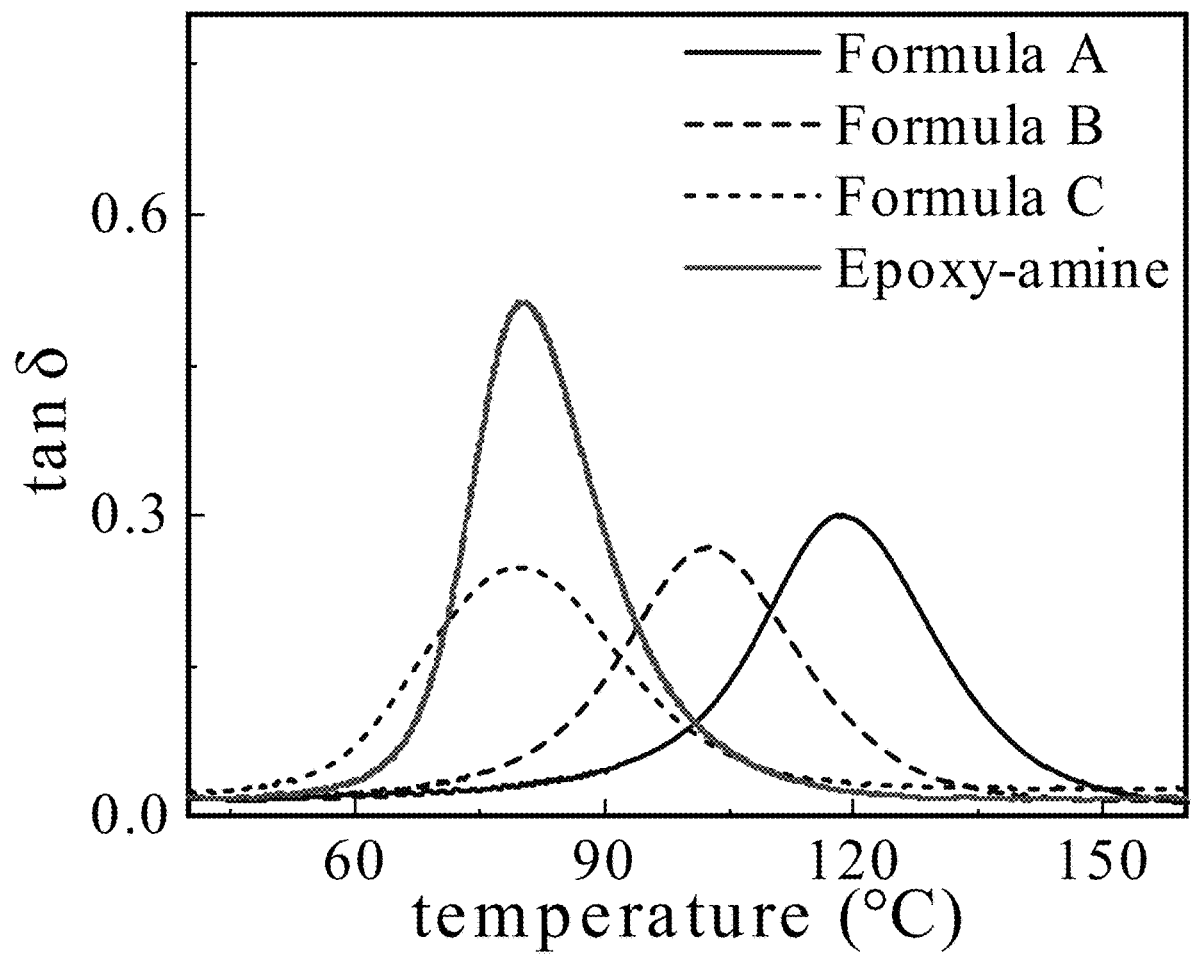
FIG. 4A illustrates glass transition temperatures of exemplary glass-fiber composites made from three epoxy-anhydride formula, as well as the epoxy-amine industrial standard matrix, according to some embodiments of the present disclosure.
Figure 4B:
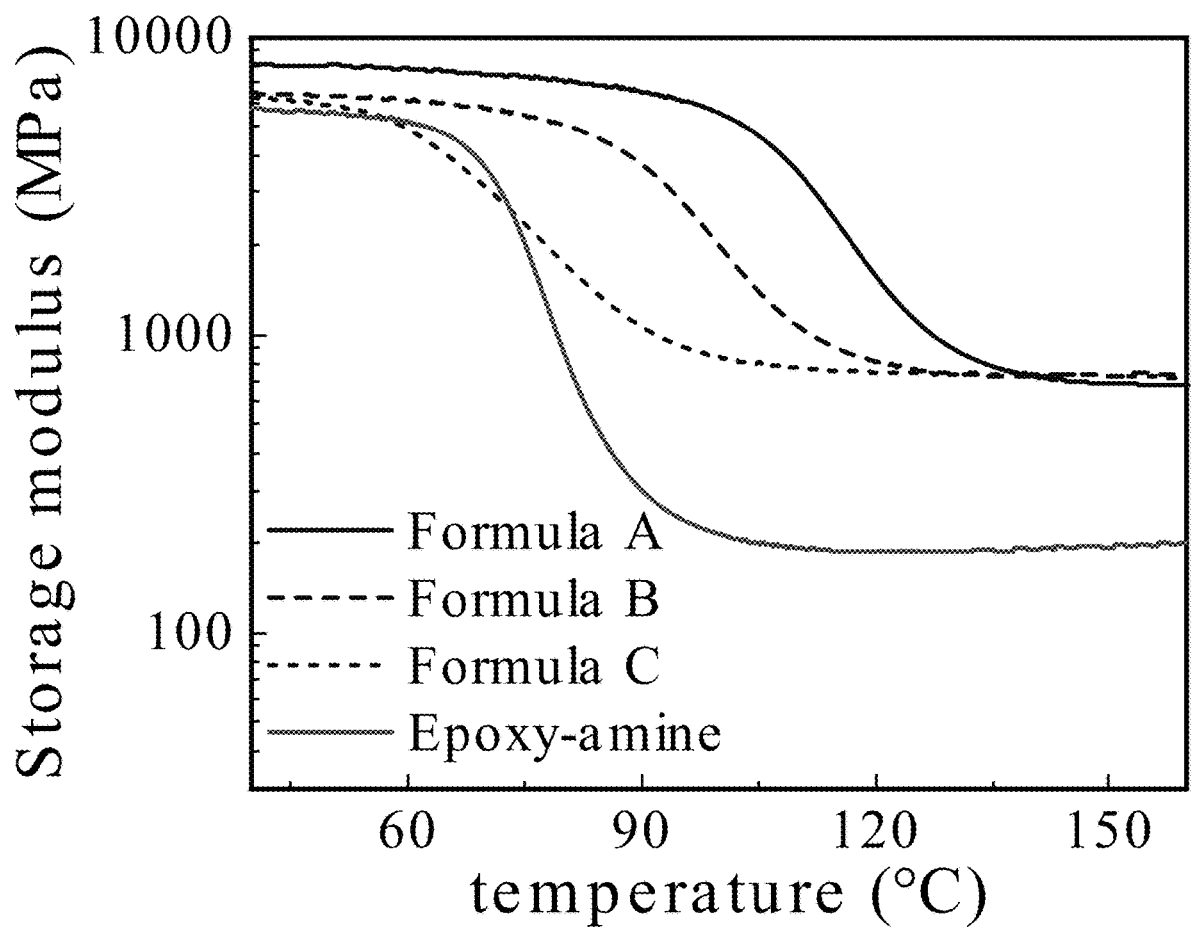
FIG. 4B illustrates temperature dependent storage modulus of all the exemplary glass-fiber composites, according to some embodiments of the present disclosure.
Figure 4C:
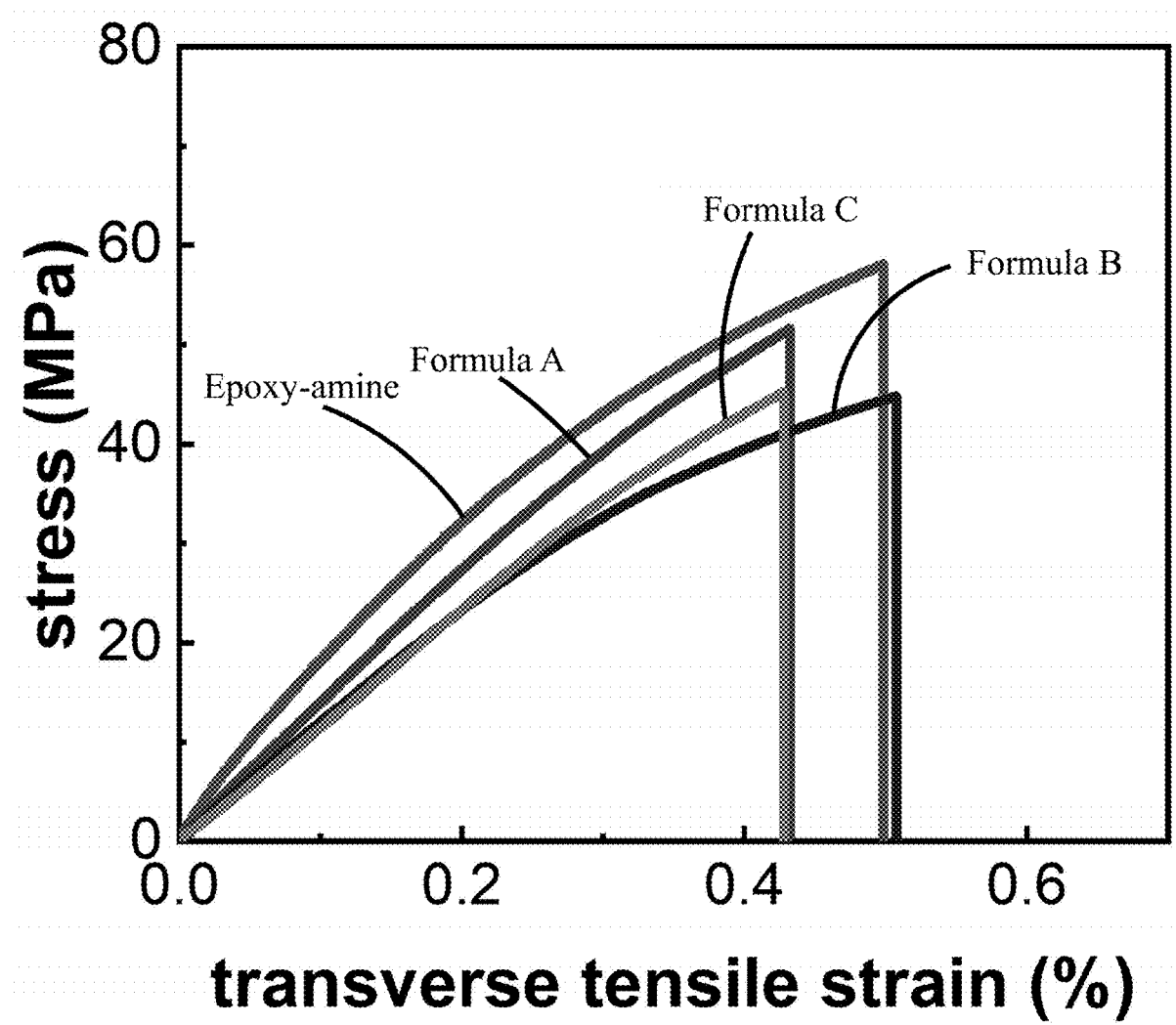
FIG. 4C illustrates in-plane compression tests of all of the exemplary composites, following ASTM D6641 standard with a combined load compression test fixture, according to some embodiments of the present disclosure.
Figure 4D:
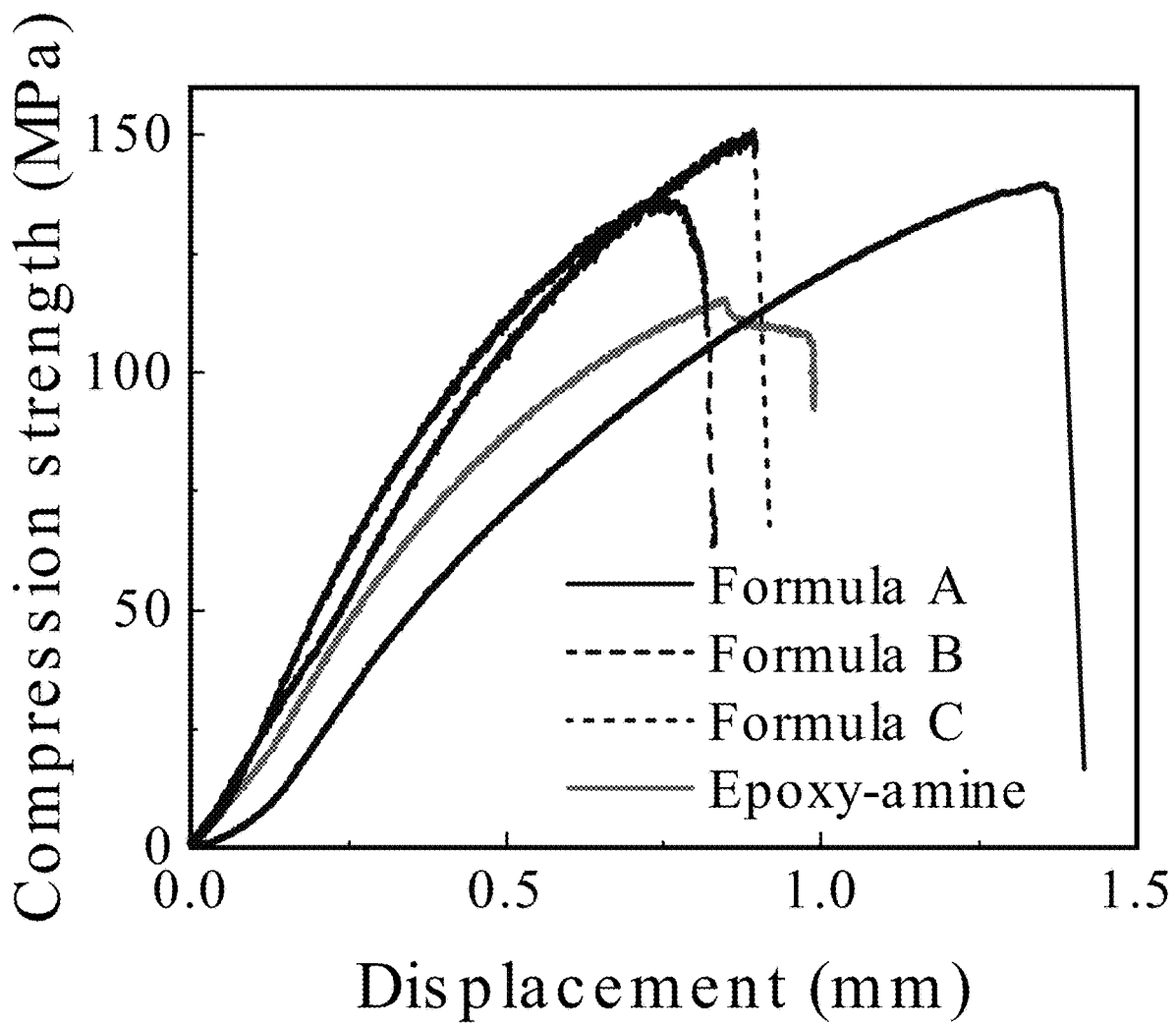
FIG. 4D illustrates transverse tensile tests of all the exemplary composites, following ASTM D3039 standard with a modified dog bone geometry to encourage failure within the gage section, according to some embodiments of the present disclosure.
Figure 4E:
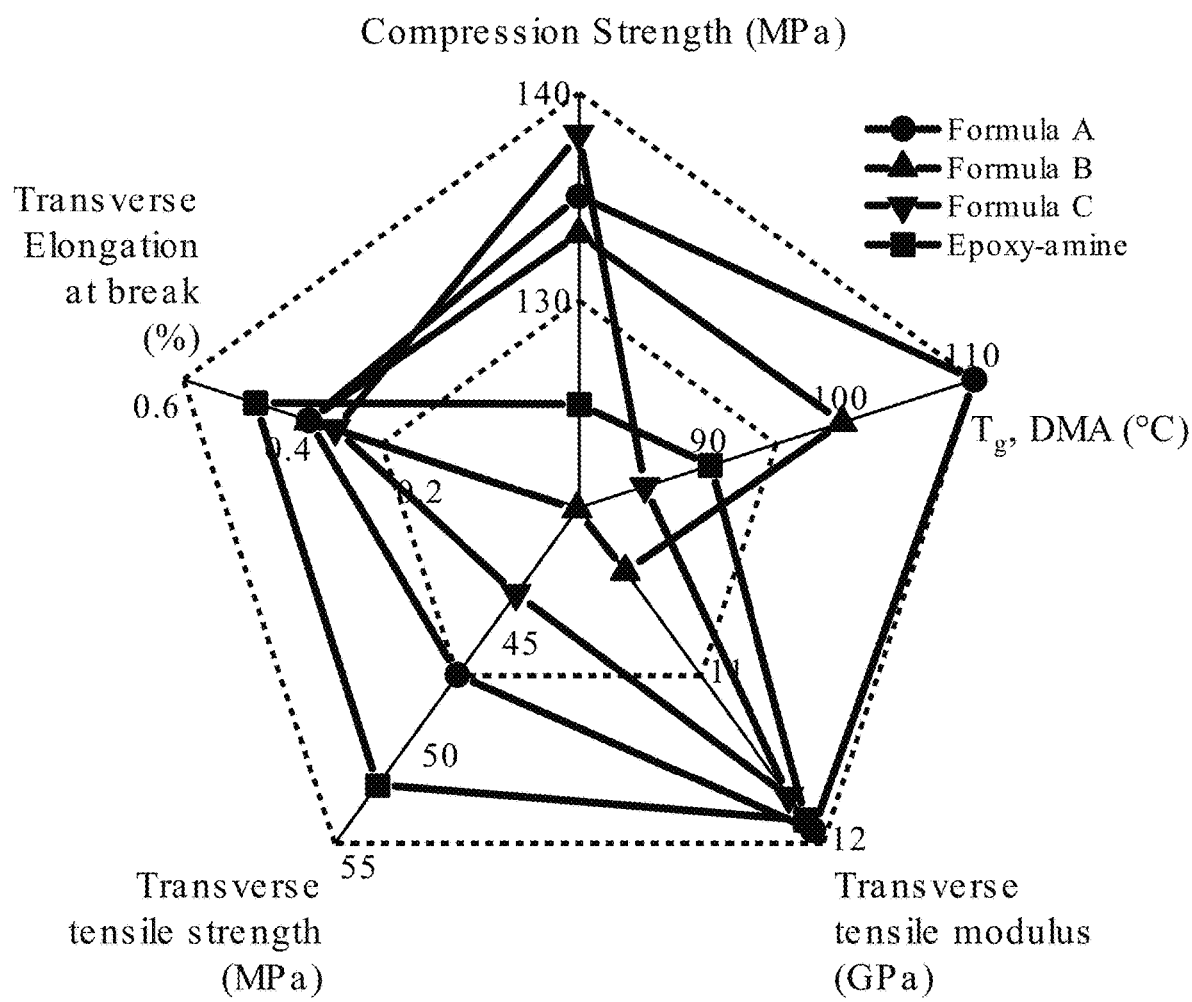
FIG. 4E illustrates a spider chart that summarizes the properties of all three formulas and the industry standard composites, according to some embodiments of the present disclosure.

The $T_g$ of the FRCs was determined by DMA, equipped with a single cantilever clamp. As shown in FIG. 4A, these exemplary composites followed the same trend exhibited by the neat polymer systems, with Formulas A, B, and C, exhibiting decreasing $T_g$ values of 120° C., 105° C., and 85° C., respectively. The storage moduli before the $T_g$ were at approximately 1 GPa (see FIG. 4B), which are more than ten times higher than those in the neat polymer systems, suggesting stable bonding between the polymer matrix and the glass fiber. The matrix-fiber interaction was further investigated through mechanical testing, including in-plane compression and transverse tension tests. In-plane compression tests were conducted according to ASTM D6641 standard. Formulas A, B, and C showed a compression strength of about 135±4 MPa, 133±6 MPa, and 138±7 MPa, respectively. Composites using the typical FRC resin showed a compression strength of 125±7 MPa. Furthermore, transverse tension tests revealed that the modulus are 11.9±0.4 GPa, 10.4±0.5 GPa, and 11.7±0.3 GPa, in Formula A, B, and C, respectively, matching the modulus of the typical FRC resin (11.8±0.9 GPa) (see FIG. 4D). Similarly, a spider chart that summarizes properties in these glass fiber composites is shown in FIG. 4E.

Figure 5A:
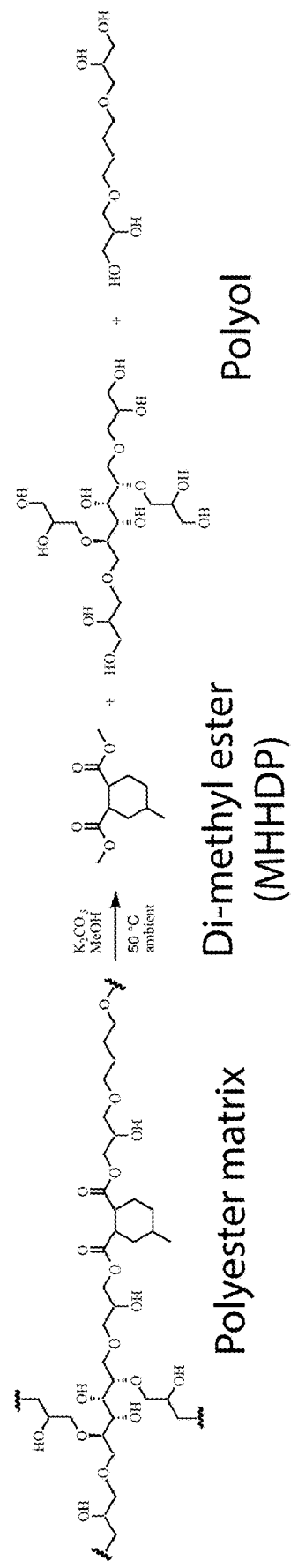
FIG. 5A illustrates a general scheme of transesterification reaction of the polyester matrix with exogeneous methanol, producing a mixture of polyol and dimethyl ester (DME), mediated by $K_2CO_3$ at 50° C. under ambient pressure, according to some embodiments of the present disclosure.

Chemical recycling. Depolymerization of polyesters through transesterification reactions with externally added alcohol reagents has been demonstrated by others. Though hydrolysis also depolymerizes polyesters, transesterification is advantageous in avoiding formulation of inorganic salts. For the resins synthesized and described herein, methanol was used to depolymerize the epoxy-anhydride network, dubbed "methanolysis" (see FIG. 5A). Accordingly, in some embodiments of the present disclosure, the resin component originally stemming from the anhydride reactant results in a methyl esters or carboxylic acid, while the resin component originally stemming from the epoxy reactant results in one or more polyols.

Figure 5B:
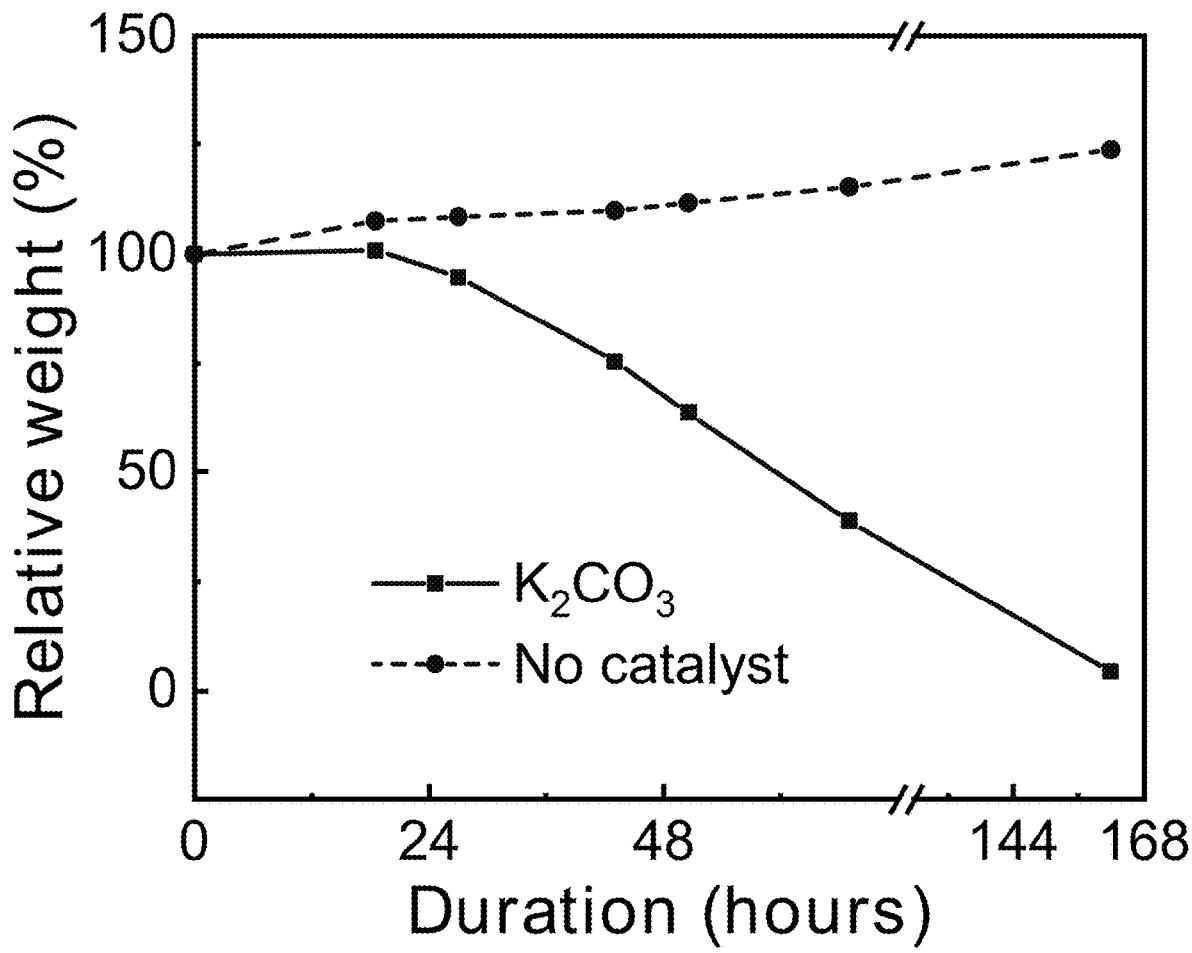
FIG. 5B illustrates a time-coursed degradation of 1.0 g sample in 12 mL methanol, with the presence of 0.05 g $K_2CO_3$, according to some embodiments of the present disclosure. Control groups include no catalyst and triethylamine used as the catalyst.

Degradation of the neat resin resulting from Formula A was tested using $K_2CO_3$ as catalyst. Samples in the form of 1 cm$^3$ cube, were exposed to 12 mL of methanol, under 50° C., with the presence of 0.05 g of $K_2CO_3$. A control group was carried out under the same conditions but without any catalyst. As shown in FIG. 5B, the sample consistently decreased in mass, after an induction period, and eventually solubilized and decomposed into the solution after about 7 days. In the control group, the sample underwent swelling and increased in mass due to absorption of the solvent— however, no mass loss was observed.

Figure 5C:
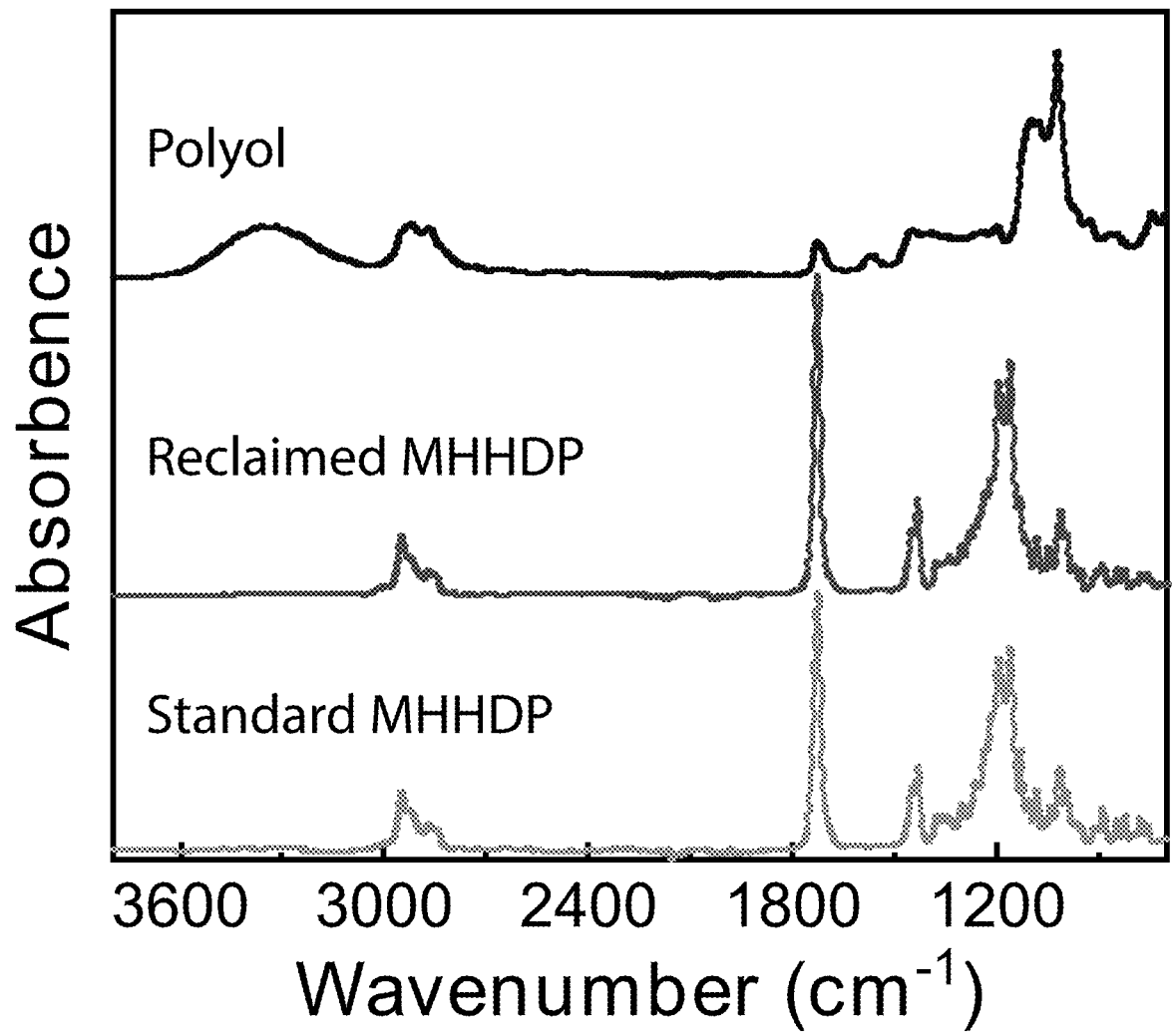
FIG. 5C illustrates FT-IR spectra of the dimethyl ester of MHHPA: bottom, a standard dimethyl ester synthesized from MHHPA; top, the dimethyl ester separated from depolymerization compound mixture, according to some embodiments of the present disclosure.

Methylhexahydro-dimethyl phthalate (MHHDP) was prepared from the anhydride precursor (MHHPA), through an esterification reaction with methanol and subsequent purification steps. The solution from the degradation reaction was then analyzed against the standard MHHDP. Thin layer chromatography revealed that the degradation solution contained the expected MHHDP at a Rf value of 0.5 with a developing solvent of ethyl acetate to hexane in 1:3 ratio. By silica gel chromatography, the MHHDP was isolated as the first obtained compound from the column, confirming its low polarity. An overlay of FT-IR spectra the isolated MHHDP against the standard confirmed the expected structure, as shown in FIG. 5C.

Figure 5D:
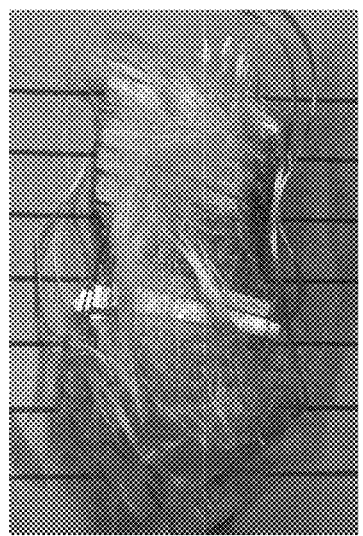
FIG. 5D illustrates pictures of the glass fiber composites after degradation of the polymer matrix, according to some embodiments of the present disclosure: formula A (left) and epoxy-amine materials (right).
Figure 5D:
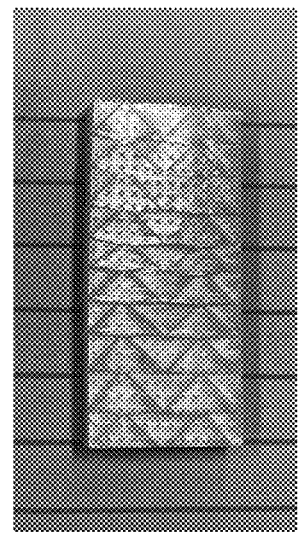
Figure 5E:
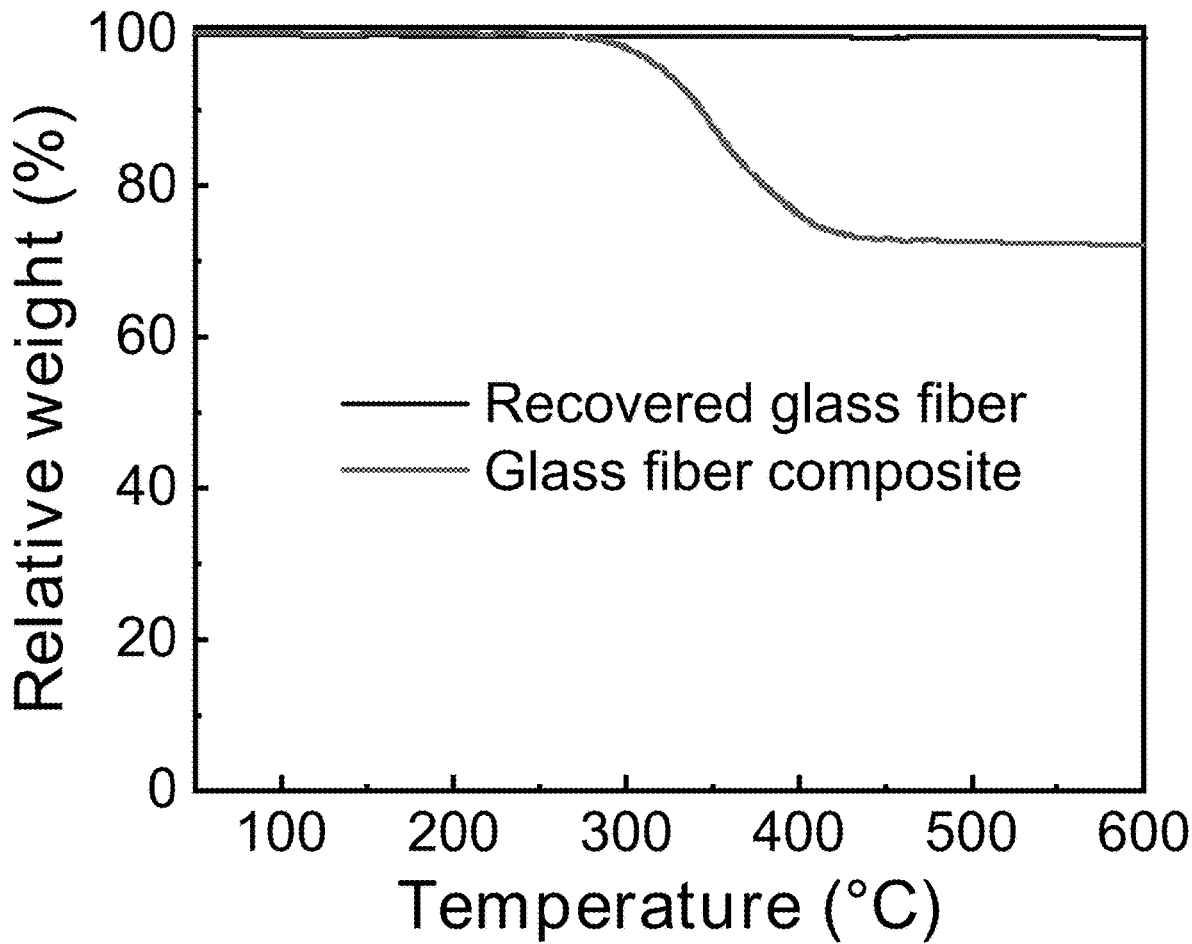
FIG. 5E illustrates TGA of the recovered glass fiber showing little organic matter remained, according to some embodiments of the present disclosure.

Similarly, degradation of the exemplary FRCs samples synthesized was also evaluated. In this case, dichloromethane was used as a cosolvent to methanol in equal volume, to enhance mass transfer. Accordingly, the degradation was carried out at room temperature in a fume hood, without agitation. Complete dissolution of the polymer was observed after about 7 days. In contrast, a FRC sample made from the typical epoxy-amine matrix showed no sign of degradation (see FIG. 5D). The recovered fiber was washed with methanol and dried under air. Subsequently, the fiber was subjected to thermogravimetric analysis (TGA). The reclaimed glass fiber showed 0.6% weight loss when heating from ambient to 600° C. (see FIG. 5E), which was nearly identical to that of pristine glass fibers (0.7% weight loss at 600° C.). It is concluded that the polymer matrix was completely removed, and the recovered fiber was essentially free of organic residue and was ready for recycle and/or reuse.

Figure 5F:
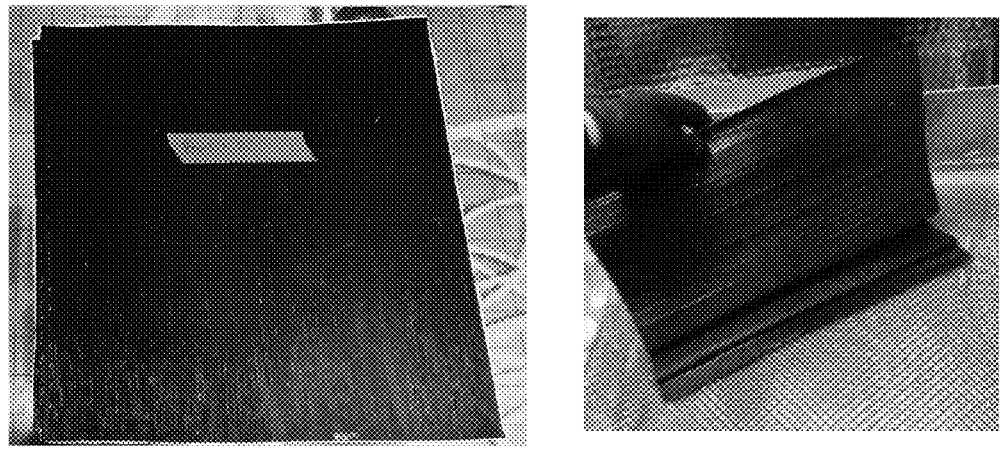
FIG. 5F illustrates pictures of carbon fiber composites before and after the degradation reaction of the polymer matrices (Formula A), according to some embodiments of the present disclosure.
Figure 5G:
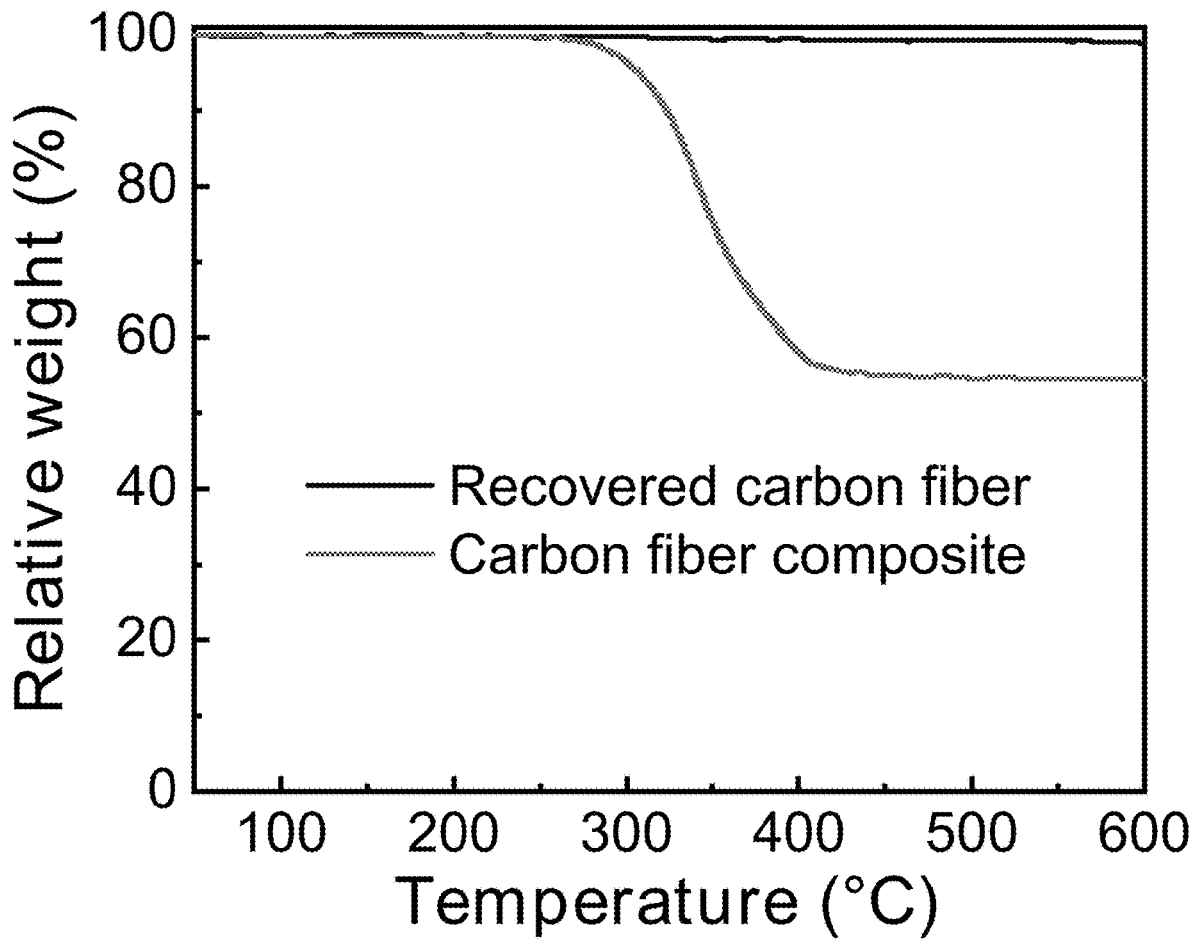
FIG. 5G illustrates TGA of the recovered glass fiber showing little organic matter remained on the recovered carbon fiber, according to some embodiments of the present disclosure.

Furthermore, a carbon fiber reinforced composite (CFRC) was fabricated using Formula A by the same VARTM process. Degradation of the CFRC (with unidirectional fiber) was carried out under the abovementioned conditions. As shown in FIG. 5F, the carbon fibers maintained integrity after the polymer degradation. TGA of the carbon fiber composite and the reclaimed fiber showed 45.6% and 1.0% weight loss at 600° C., respectively, confirming that little to no organic matter existed on the recovered fibers.

Polymer/composite design. The results described above demonstrate that epoxy-anhydride resins are suitable for VARTM process, resulting in FRCs that match the performances of a typical epoxy-amine based FRC resin. The aromatics in BADGE may provide stiffness that results in good strength, while the substituted cyclohexane in IPDA may provide flexibility due to the various conformations of the ring. IPDA is a non-viscous liquid (20 cP @ 23° C.), and likely due to its asymmetry and being a mixture of stereoisomers may suppress crystalline formation. Similarly, the series of tertiary carbon-carbon linkages on STGE may provide stiffness. MHHIPA is racemic mixture of cis and trans conformations, and can provide a desirable viscosity of about 60 cP when measured at a temperature of about 23° C. Despite being exclusively aliphatic, Formulas A, B, and C showed comparable performances to the model FRC resin that contained aromatic linkages.

Notably, all the STGE/BDGE/MHHPA formulas tested, even with the presence of the EMI catalyst, were stable for longer than one week at ambient conditions, with no gelation observed. This performance property is generally desirable in manufacturability, allowing for longer processing times between resin mixing and setting in a mold. It is envisioned that, in some embodiments of the present disclosure, the presence of a nucleophile catalyst that is stronger than imidazole may provide even lower curing temperatures.

It is worth noting that the resin/fiber interface can be covalently bonded through reactive functionalities on the glass fiber, typically an epoxy group. The glass fiber used in this work was manufactured by Saertex and its surface functionalization is well suited for an epoxy-amine matrix. Both the transverse tensile and the in-plain compression results suggest that the developed epoxy-anhydride matrices are compatible with commercial glass fiber products, and thus may provide very suitable "drop-in" replacements for today's commercially available FRC resins.

In this study, a resin particularly designed for wind turbine blades was used as an example of the existing FRC resins. There are many existing formulated epoxy-amine resins for various types of applications. Therefore, the design strategy described herein, using an epoxy-anhydride resin system from bio-derivable monomers, can also be applied to replace a variety of other petroleum-derived, incumbent epoxy-amine resins.

FIG. 1 illustrates a summary of the overall reaction scheme entailing epoxy-anhydride curing chemistry and depolymerization reaction options for the end-of-life, according to some embodiments of the present disclosure. Two exemplary formulations for synthesizing materials, e.g., polymers and resins, by the epoxy-anhydride chemistry described herein are summarized in Table 2 below. For each formulation, the epoxy mix included 70 wt % sorbitol tetraglycidyl ether (STGE) and 30 wt % butanediol diglycidyl ether (BDGE). HHMPA refers to hexahydro 4-methylphthalic anhydride and THMPA refers to tetrahydro 4-methylphthalic anhydride. Table 3 illustrates some physical properties

TABLE 2

Exemplary Resin Formulations

| Formulation Name | Composition | Estimated Viscosity at 25° C. (cps) |
|---|---|---|
| Bio-1 | 55 parts epoxy mix 45 parts HHMPA Catalyst (trace) | 300 |
| Bio-6 | 55 parts epoxy mix 45 parts THMPA Catalyst (trace) | 300 |

TABLE 3

Properties of the bio-derivable resins included in this work.

| Formulation name | Viscosity @ 25° C. | Tg (C, by DMA) |
|---|---|---|
| Commercial epoxy-amine (Hexion) | 377 cP | 94 |
| Bio-1 | 425 cP | 104 |
| Bio-7 | 257 cP | 102 |
| Bio-8 | 175 cP | 89 |

Figure 6:
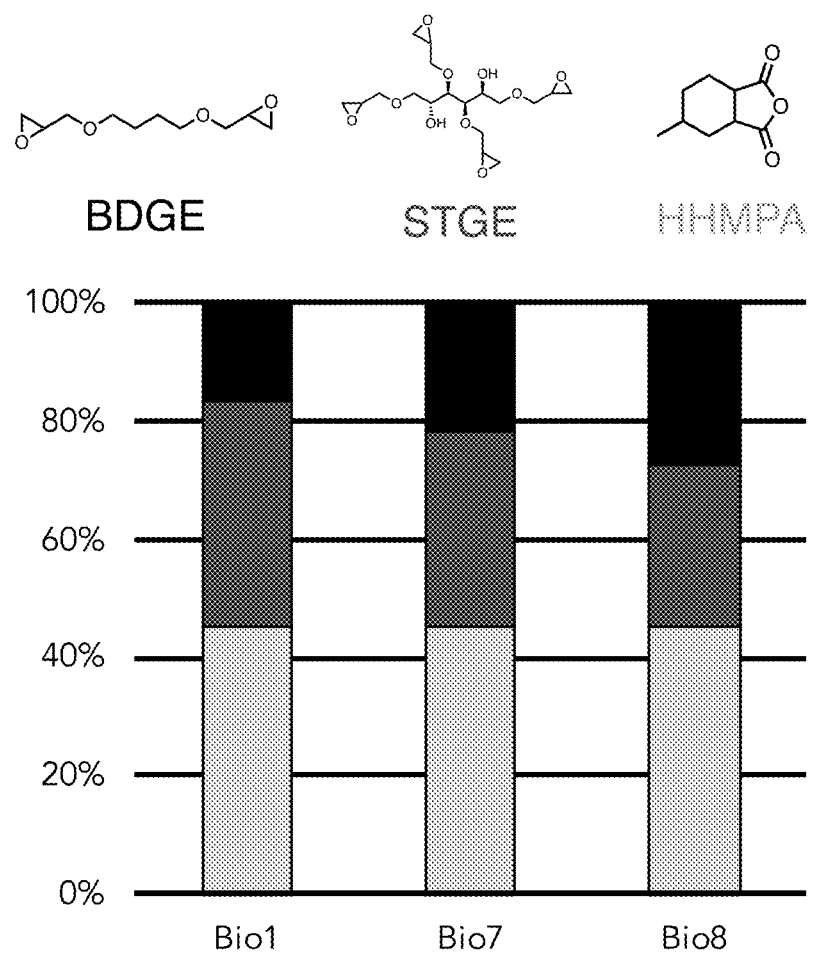
FIG. 6 illustrates formulation details of the bioderived resins synthesized from BDGE, STGE, and HHMPA), according to some embodiments of the present disclosure.
Figure 7:
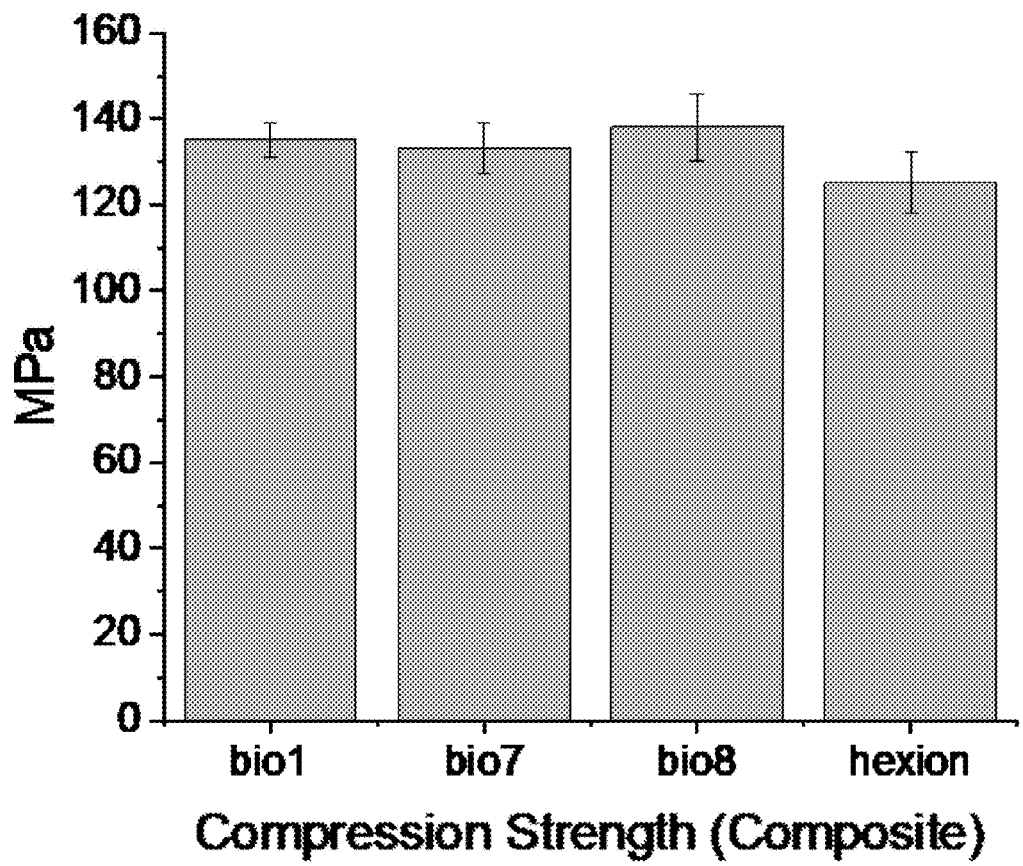
FIG. 7 illustrates compression strength of the bioderived resins produced using methods described herein, according to some embodiments of the present disclosure.

FIG. 6 illustrates formulation details of the bioderived resins synthesized from BDGE, STGE, and HHMPA), according to some embodiments of the present disclosure. The structures of each are shown in FIG. 6. FIG. 7 illustrates compression strength of the bioderived resins produced using the formulations summarized in FIG. 6, compared to a commodity resin (Hexion), according to some embodiments of the present disclosure. Composites samples were prepared by a vacuum infusion process. Details of the process is described below.

Figure 8:
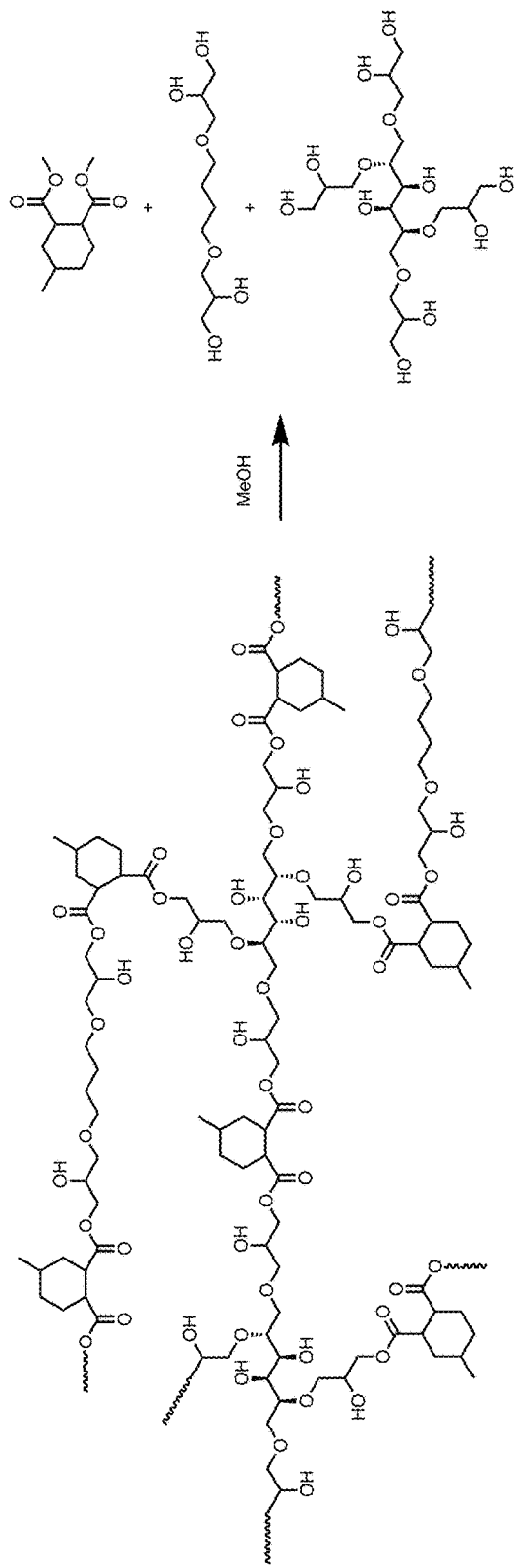
FIG. 8 illustrates a reaction scheme (Panel A) for degrading the bioderived polymers and resins described herein by transesterification reactions with methanol with photographs of actual examples shown in Panel B, according to some embodiments of the present disclosure.
Figure 8:
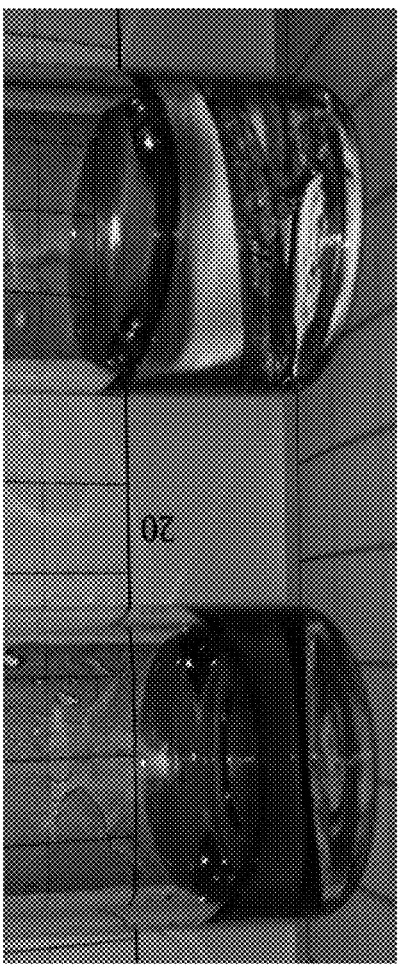
Figure 9:
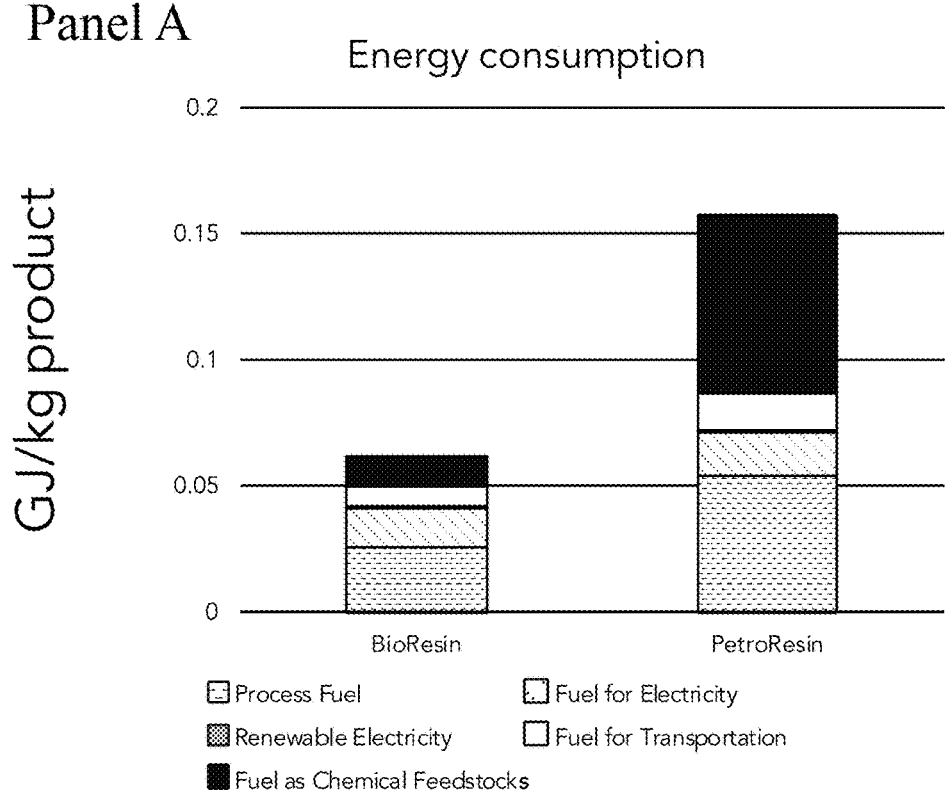
FIG. 9 illustrates various advantages provided by the chemistry, methods, and compositions described herein on energy consumption (Panel A) and greenhouse gas emissions (Panel B), according to some embodiments of the present disclosure.
Figure 9:
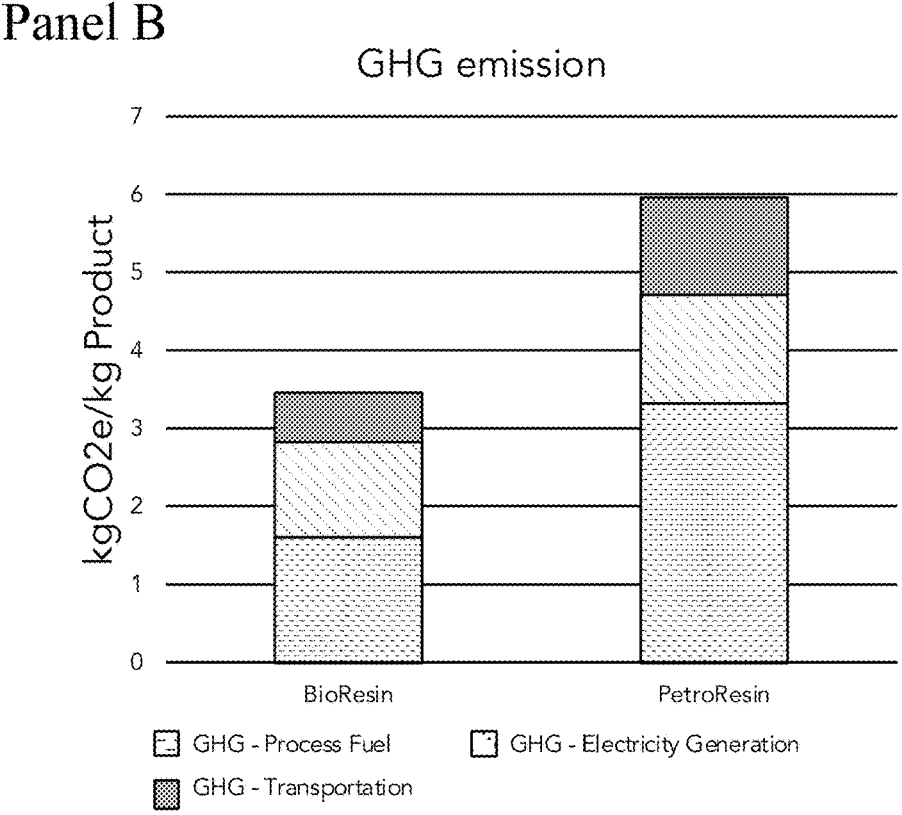

FIG. 8 (top) illustrates a reaction scheme for degrading the bioderived polymers and resins described herein by metanalysis reactions. FIG. 8 (bottom) illustrates a picture of a depolymerized bio sample with the catalyst of transesterification reactions (left), and picture of an intact sample of the bio sample without the catalyst (right), according to some embodiments of the present disclosure. FIG. 9 (Panel A) illustrates the calculated energy consumption of preparing the bioderived resin samples prepared according to the methods described herein, in comparison with petroleum-derived incumbent materials, according to some embodiments of the present disclosure. FIG. 9 (Panel B) illustrates predicted greenhouse gas emission for manufacturing the bioderived resins described herein, in comparison with petroleum-derived incumbent materials, according to some embodiments of the present disclosure.

Figure 10:
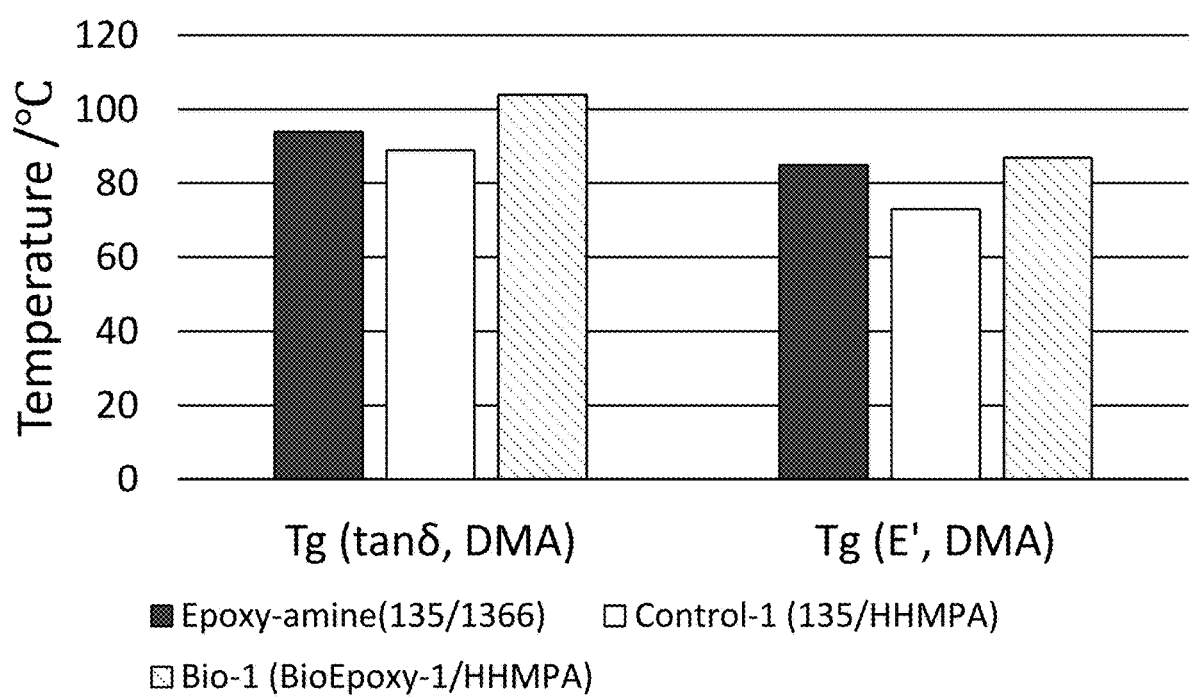
FIG. 10 illustrates glass transition temperatures as determined by Dynamic Mechanical Analysis of two control resins (epoxy-amine and control) compared to the resin resulting from the epoxy-anhydride chemistry described herein, resulting from the Bio-1 formulation, according to some embodiments of the present disclosure.
Figure 11:
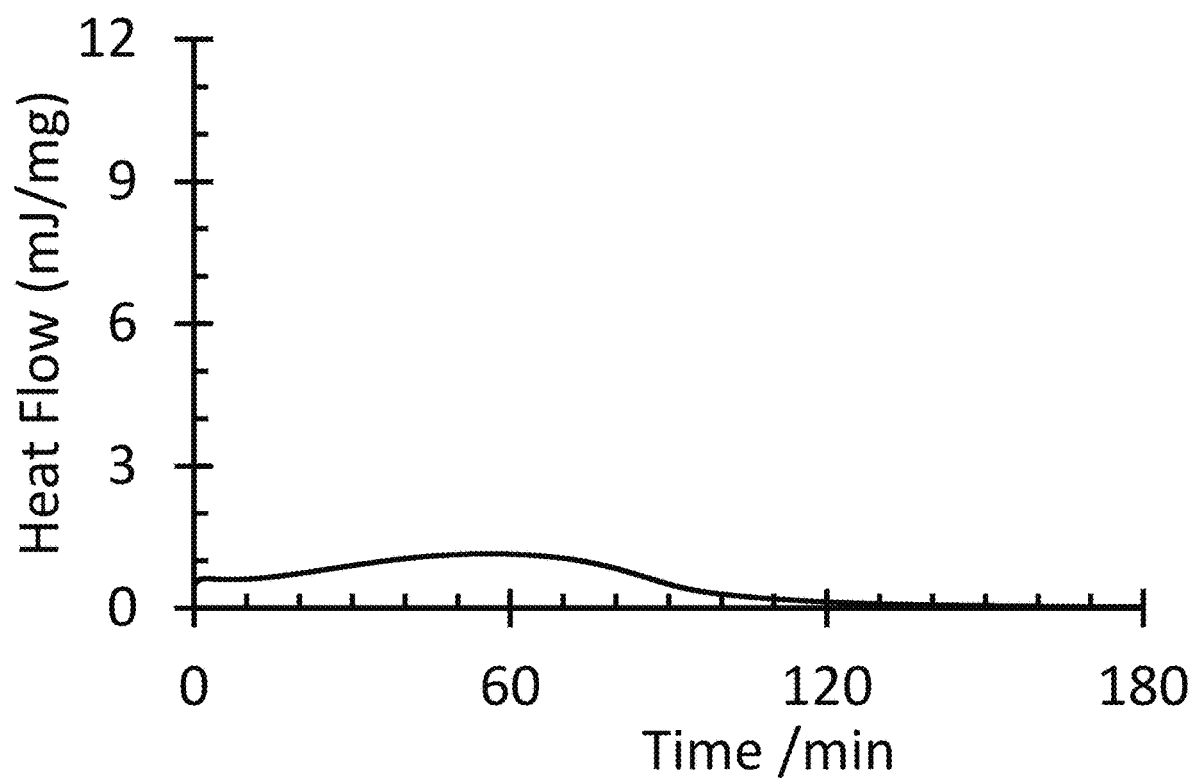
FIG. 11 illustrates DSC data, which demonstrates that the time to cure the bioresin formulation (Bio-1) can be tuned by changing the temperature, according to some embodiments of the present disclosure.

FIG. 10 illustrates glass transition temperatures as determined by Dynamic Mechanical Analysis of two control resins (epoxy-amine and control) compared to the resin resulting from the epoxy-anhydride chemistry described herein, resulting from the Bio-1 formulation, according to some embodiments of the present disclosure. These results demonstrate that the thermal properties of this exemplary epoxy-anhydride resin are comparable with typical epoxy amine performance. In addition, FIG. 11 illustrates DSC data, which demonstrates that the time to cure the bioresin formulation (Bio-1) can be tuned by changing the temperature, according to some embodiments of the present disclosure. Cure is considered complete when the DSC trace returns to baseline. In this example, a curing temperature and curing time of about 80° C. for about four hours appear to be about optimum, as the cure is complete. Further, the lack of large exotherms ensures minimal or no degradation or boiling of the monomer will occur during the synthesis process.

Figure 12:
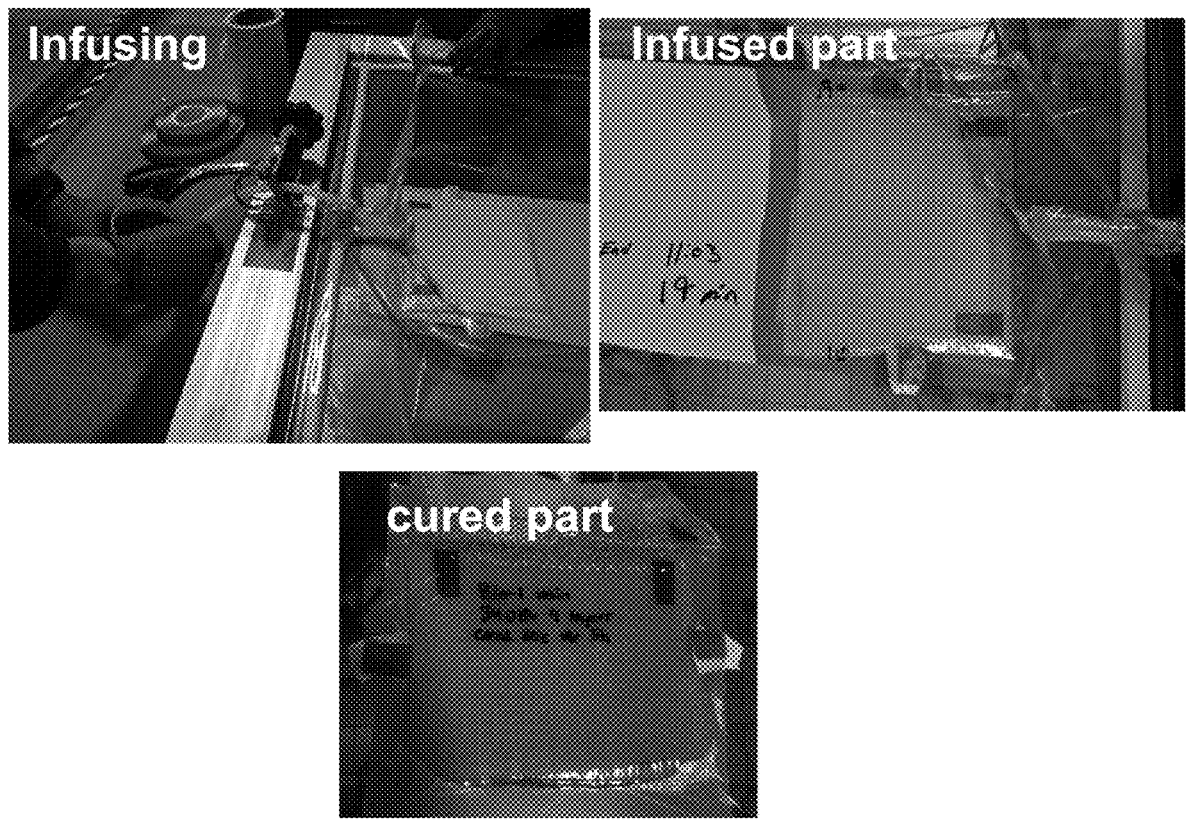
FIG. 12 illustrates photographs of the experimental system used to infuse the bioresin formulations described herein into glass fiber fabrics to produce a resin-fiberglass composites, according to some embodiments of the present disclosure.

FIG. 12 illustrates photographs of the experimental system used to infuse the bioresin formulations described herein into glass fiber fabrics to produce a resin-fiberglass composites, according to some embodiments of the present disclosure.

Figure 13:
FIG. 13 illustrates a photograph comparing a bioresin made from formulation Bio-1 (Panel A) compared to a conventional epoxy material (Hexion) after being applied as a coating to glass slides and the laboratory device (Panel B) used to create the coatings, according to some embodiments of the present disclosure.
Figure 13:
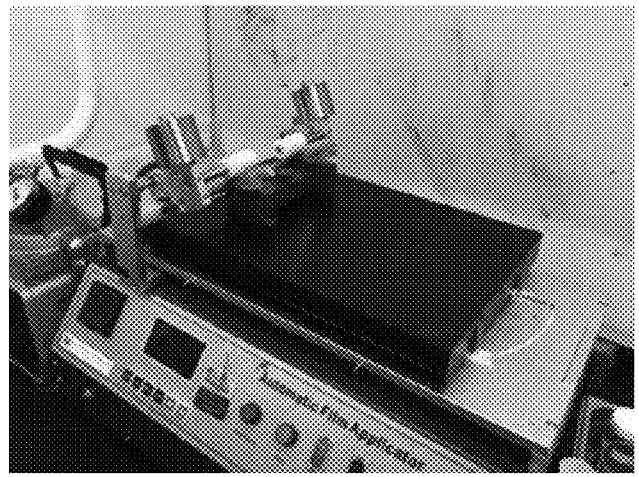
Figure 14:
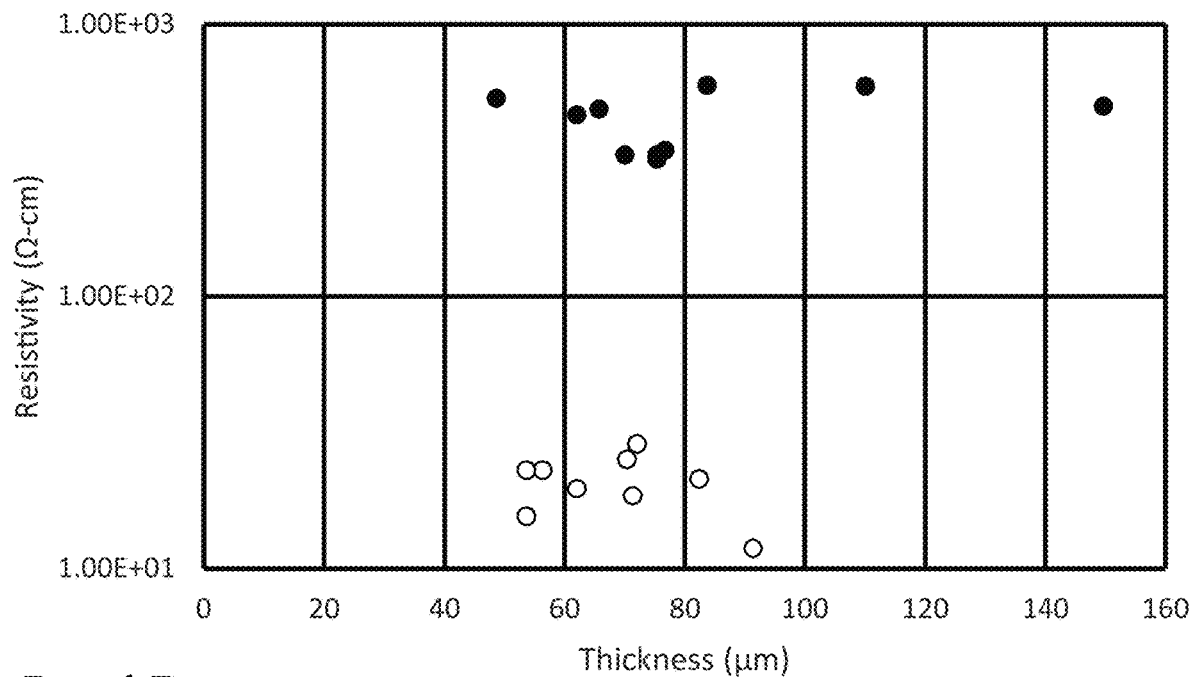
FIG. 14 illustrates sheet resistivities (Panel A) and resistances (Panel B) measured as a function of film thickness for epoxy/carbon black composites prepared, according to some embodiments of the present disclosure.
Figure 14:
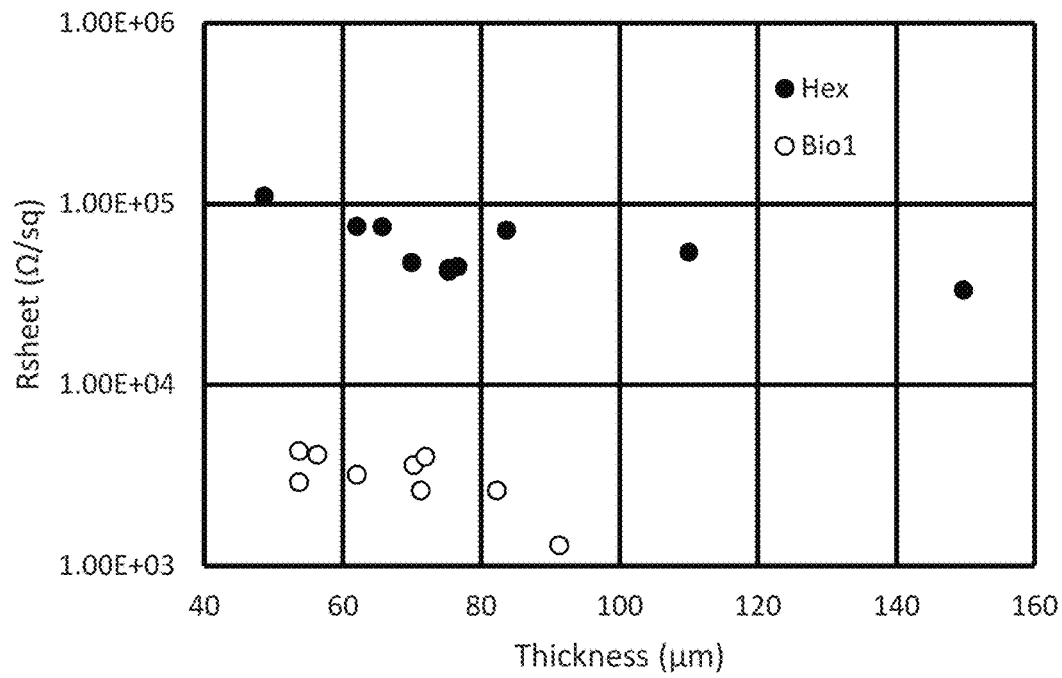
Figure 15:
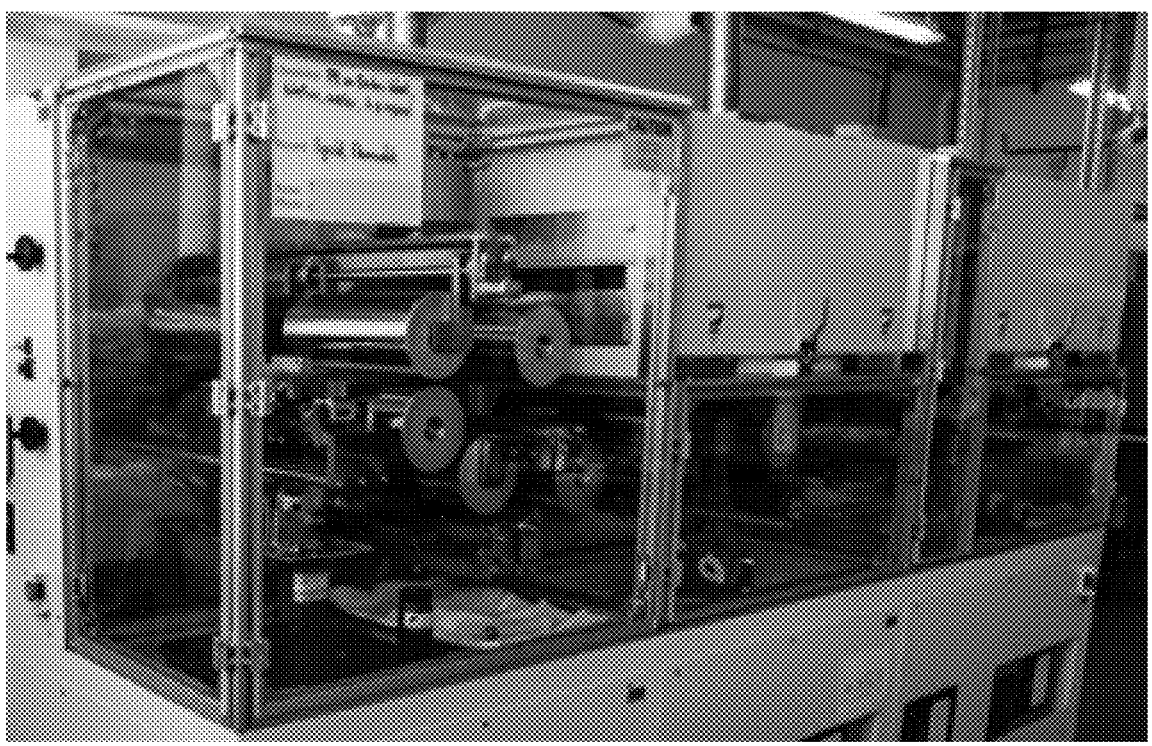
FIG. 15 illustrates a photograph of roll-to-roll system suitable for applying coatings of the bioresins described herein onto flexible substrates such as polymer films, according to some embodiments of the present disclosure.

As described herein, the epoxy-anhydride derived resins described herein may have a variety of other uses, including coating applications. FIG. 13 (Panel A) illustrates a photograph comparing a bioresin/carbon black composite film made from formulation Bio-1 compared to a conventional epoxy material (Hexion) after being applied as a thin liquid coating to glass slides, according to some embodiments of the present disclosure. The automatic applicator unit used for these experiments is also shown in FIG. 13 (Panel B). The coatings were applied to a substrate (glass) using an adjustable film applicator with a translational speed of 150 mm/s and the films were dried at a temperature of about 40° C. This slightly elevated temperature was used to promote evaporation of acetone solvent used in this test. Subsequently, the bioresin from the Bio-1 formulation was cured at 160° C. for about 5 minutes. Further, FIG. 14 illustrates sheet resistances measured as a function of film thickness for epoxy/carbon black composites prepared with bioresin and conventional epoxy. The Panel A of FIG. 14 illustrates the calculated film resistivity of the epoxy/carbon black composites based on the sheet resistance and film thickness data shown in Panel B of FIG. 14. Both plots show the bioresin provides lower resistance/resistivity than the conventional epoxy for this slurry composition. The sheet resistance values of the bioresin composites are comparable with product information for conventional epoxy/carbon black composites. FIG. 15 illustrates a photograph of roll-to-roll system suitable for applying coatings of the bioresins described herein onto flexible substrates such as polymer films, according to some embodiments of the present disclosure.

Figure 16:
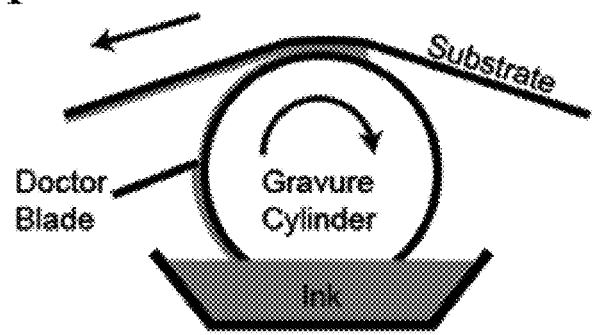
FIG. 16 illustrates a cartoon (Panel A) and a photograph (Panel B) of the use of gravure coating to apply bioresins onto flexible substrates, according to some embodiments of the present disclosure.
Figure 16:
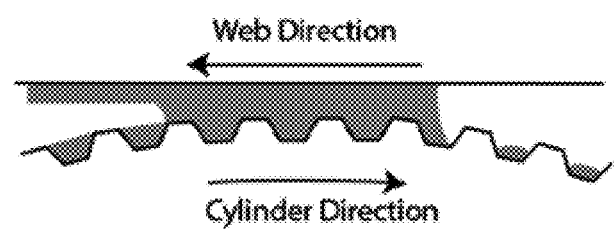
Figure 16:
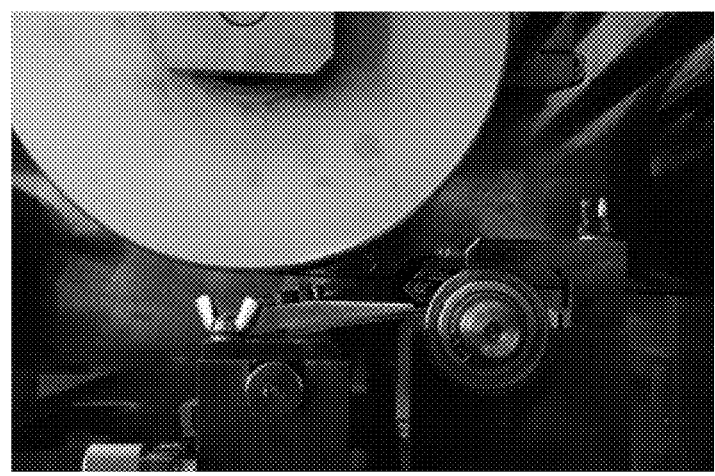

FIG. 16 illustrates the use of gravure coating to apply bioresins onto flexible substrates, according to some embodiments of the present disclosure. Panel A of FIG. 16 shows a basic schematic of gravure coating where the gravure cylinder is rotated through a pan of ink/liquid that fills the engravings of the gravure cylinder. Below this in Panel A of FIG. 16, is an illustration of filled engraving contacting a substrate, resulting in the transfer of liquid to the substrate to create the liquid film. The photo in Panel B of FIG. 16 shows the experimental setup of the gravure coating equipment. The photo on the bottom right shows the engraving pattern of the gravure cylinder.

Figure 17:
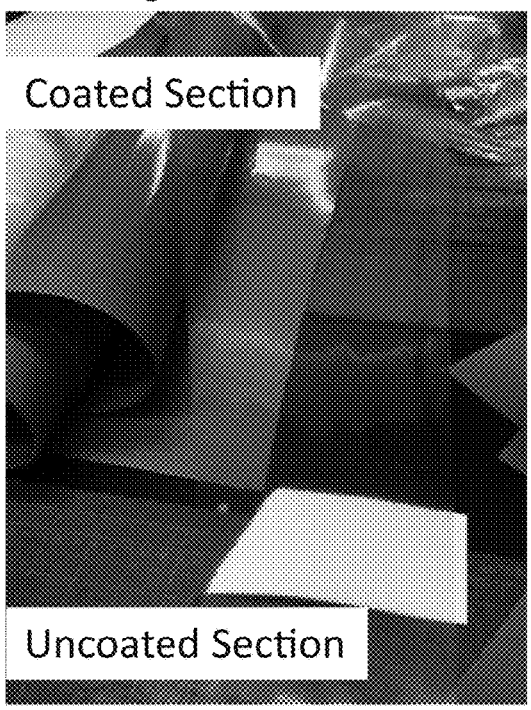
FIG. 17 illustrates that the bioresins described herein may also be used as adhesives between two or more thin sheets of a polymer, according to some embodiments of the present disclosure.
Figure 17:
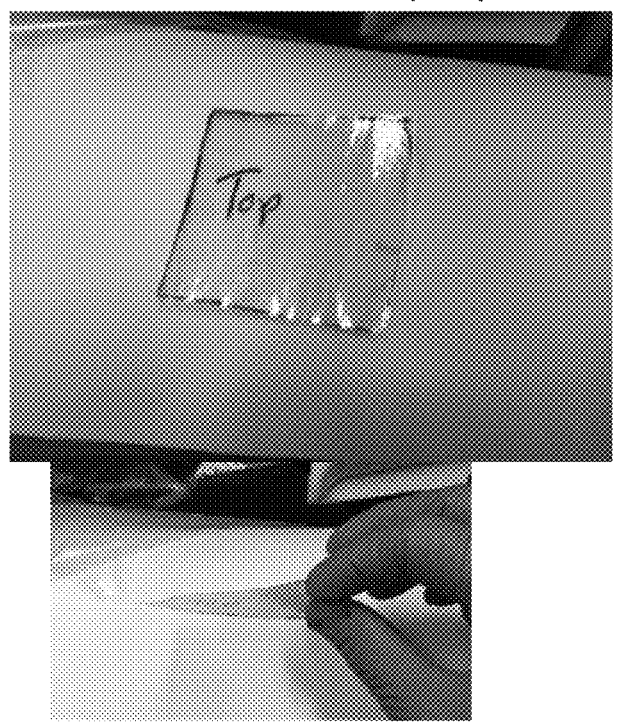

FIG. 17 illustrates that the bioresins described herein may also be used as adhesives between two or more thin sheets of a polymer, according to some embodiments of the present disclosure. Therefore, the bioresins described herein may have potential applications in multilayer polymer films such as food packaging or other water and oxygen barrier films. The formulation of the bioresin was as follows: 11.25 g HHMPA, 13.75 of a bioepoxy-1 and 0.25 g of catalyst. The ratio of components was the same as was used for the conductive epoxy films. Due to the low viscosity of this formulation, it was possible to coat films of approximately 10 μm thickness using gravure coating without the need to add solvents for viscosity reduction or to increase the liquid film thickness. This removes the need to dry the films and eliminates volatile organic compound emissions. The coatings were prepared using the roll-to-roll coating apparatus illustrated in FIG. 16. Films of the resin formulation were coated on to a 50 μm thick polyester (PET) roll using gravure coating. The gravure cylinder had a trihelical pattern with a volume factor of 67 cm$^3$/m$^2$. For coating the linear speed of the PET was 1 m/min. The coated epoxy films were cured in an air flotation oven at 160° C. The image in the center of the slide shows an exemplary PET sheet with a bioresin coating. The bioresin coating (i.e., film) covers the upper two thirds of the PET sheet shown in the image. The bottom ⅓ was uncoated. The thickness of cured resin coating was approximately 10 μm. To demonstrate the potential of the epoxy as an adhesive a second sheet of PET was laminated to the first sheet of PET coated with uncured bioresin. Following lamination, the multilayer PET/bioresin/PET stack was cured at 160° C. This successfully adhered the two sheets of PET together. The photographs on the right show a coupon of the multilayer stack following curing demonstrating ability of the bioresin to act as an adhesive.

Figure 18:
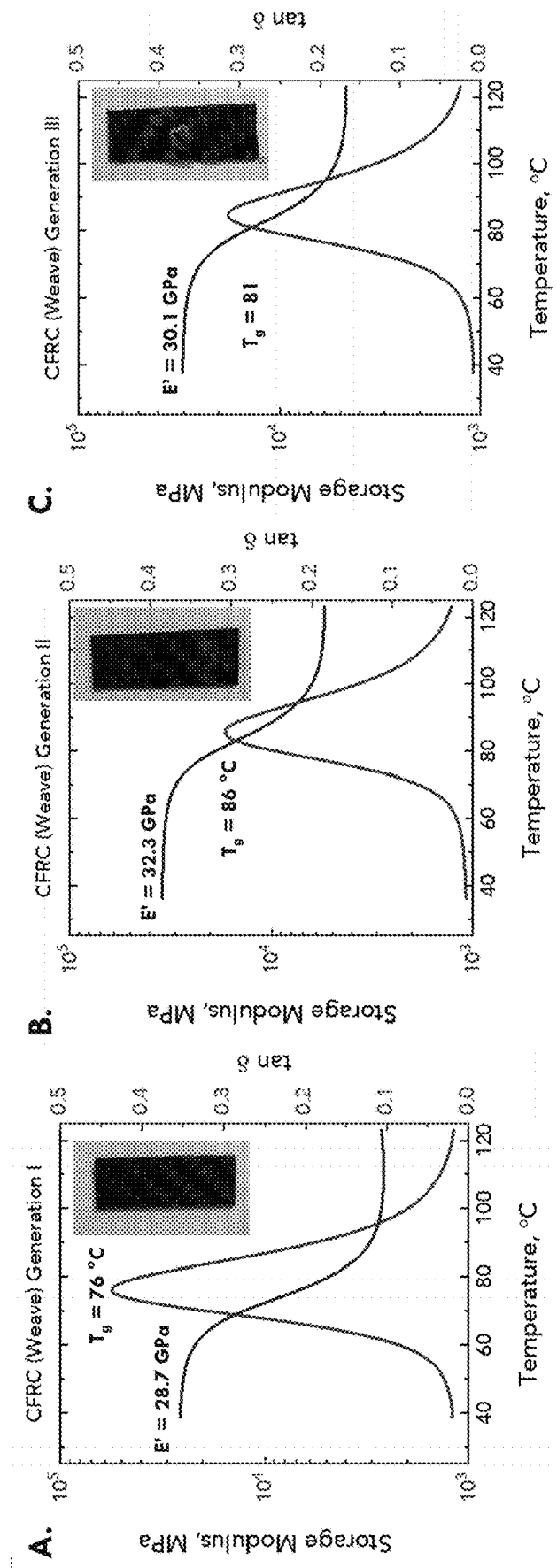
FIG. 18 illustrates dynamic mechanical analysis data obtained from carbon fiber/bioresin composites, according to some embodiments of the present disclosure.

FIG. 18 illustrates dynamic mechanical analysis data obtained from carbon fiber/bioresin composites, according to some embodiments of the present disclosure. These data illustrate that consistent Tg values can be obtained using the bioresins described herein, as well as storage moduli that exhibit only minimal variation, even after the carbon fibers have been incorporated into resin/fiber composites with the bioresins described herein, recovered and recycled three times, using the depolymerization chemistry described herein. Thus, these data demonstrate that the epoxy-anhydride derived resins are well suited for manufacturing carbon fiber reinforced composites (CFRC), that can be reused and recycled such that at least the carbon fibers can be recovered and used multiple time. The storage moduli and glass transition temperature are within error across all three uses (i.e., "lives"). The insets show photographs of the carbon fiber composites (i.e., reused fiber plus virgin resin) as they appeared in each use. This tests were conducted by infusing a carbon fiber composite, cutting a sample for testing, depolymerizing, washing the recovered fiber, reinfusing, cutting a sample for testing, and repeating to get all three sets of data and photographs.

Figure 19:
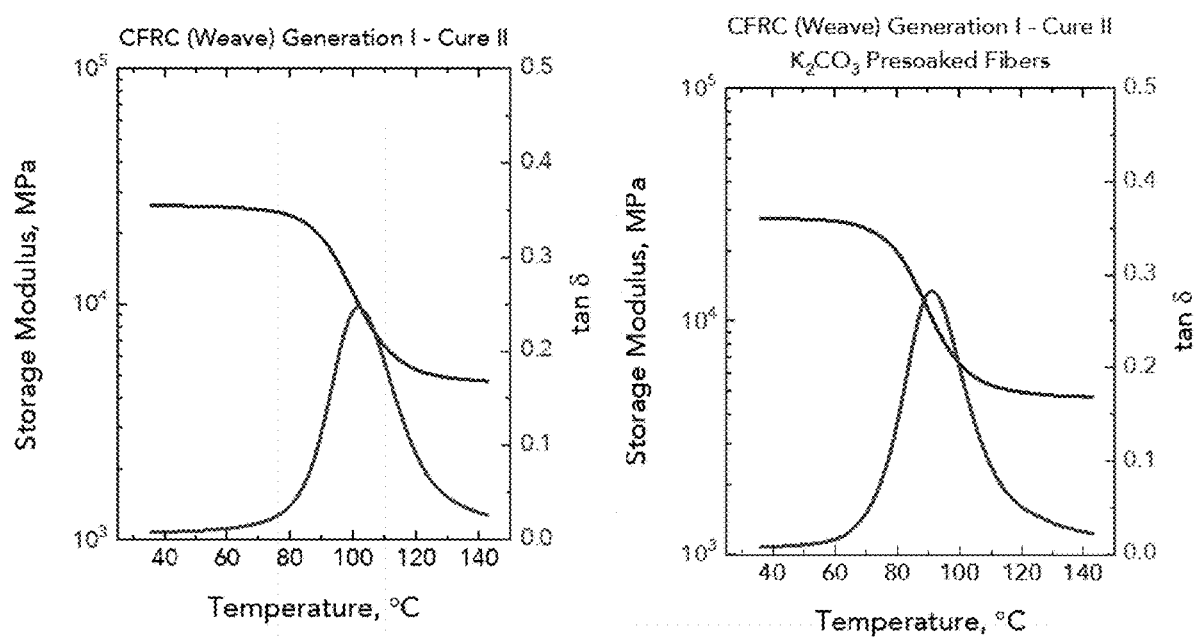
FIG. 19 illustrates recycle, recovery, and reuse of the carbon fibers, according to some embodiments of the present disclosure.
Figure 20:
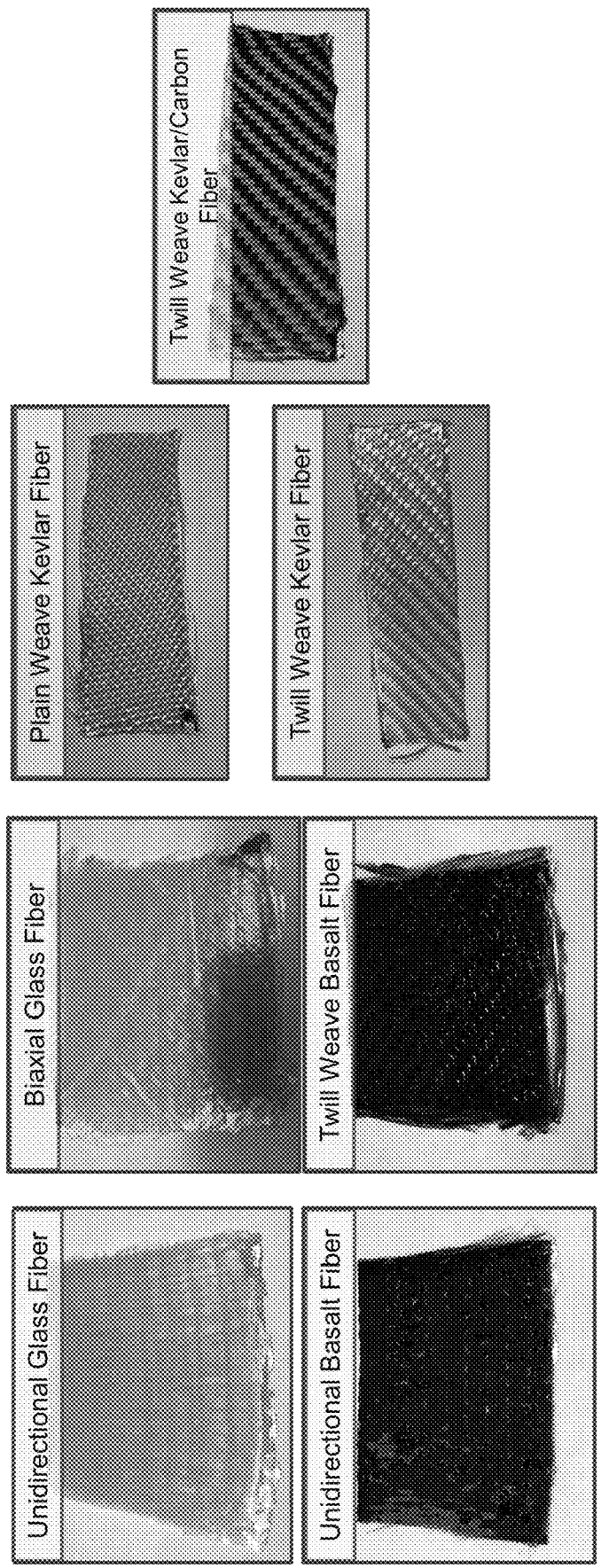
FIG. 20 illustrates photos of CFRCs made from a variety of fibers combined with the epoxy-anhydride derived resins, according to some embodiments of the present disclosure.

Further, FIG. 19 illustrates that the recycle, recovery, and reuse of the carbon fibers, as described above for FIG. 18, including the repeated exposure to the depolymerization step, does not measurably affect the carbon fiber quality. The panel on the left illustrates the storage modulus for a carbon fiber composite prepared with no pre-treatment to the carbon fibers, whereas the panel on the right illustrates the storage modulus obtained from carbon fibers that were pretreated using the typical depolymerization solution prior to resin infusion, to simulate the effects of depolymerizing a CFRC using this fiber and the epoxy-anhydride derived resins described herein. In addition, FIG. 20 illustrates photos of CFRCs made from a variety of fibers combined with the epoxy-anhydride derived resins described herein. This demonstrates the possibility of the bioresins described herein of having far-reaching utility in a variety of composites, products, and industries. For example, epoxy-anhydride derived resins described herein may be combined with a variety of fibers, including fiberglass, carbon fiber, polyaramid, and fiber blends.

Figure 21:
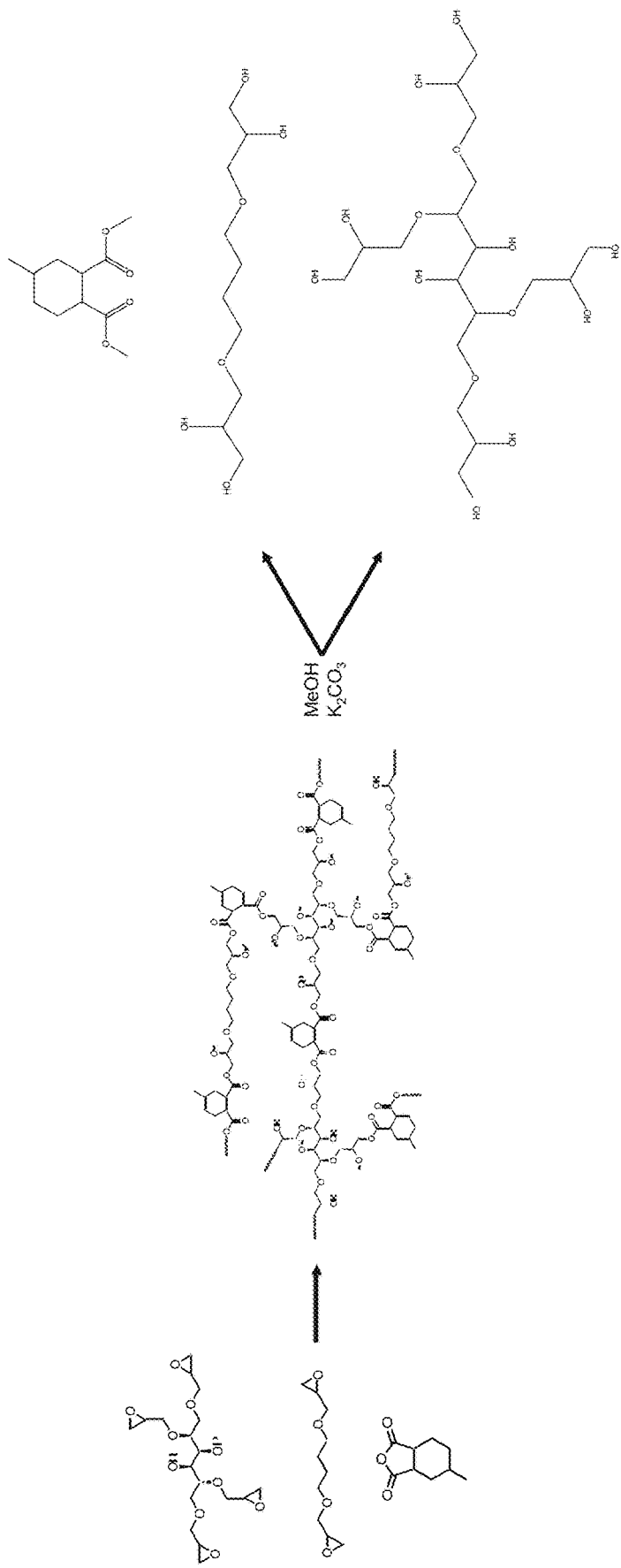
FIGS. 21-23 illustrate summarizes the epoxy-anhydride reaction to make a bioresin having thermoset network, followed by depolymerization of the bioresin, as described herein, and according to some embodiments of the present disclosure.
Figure 22:
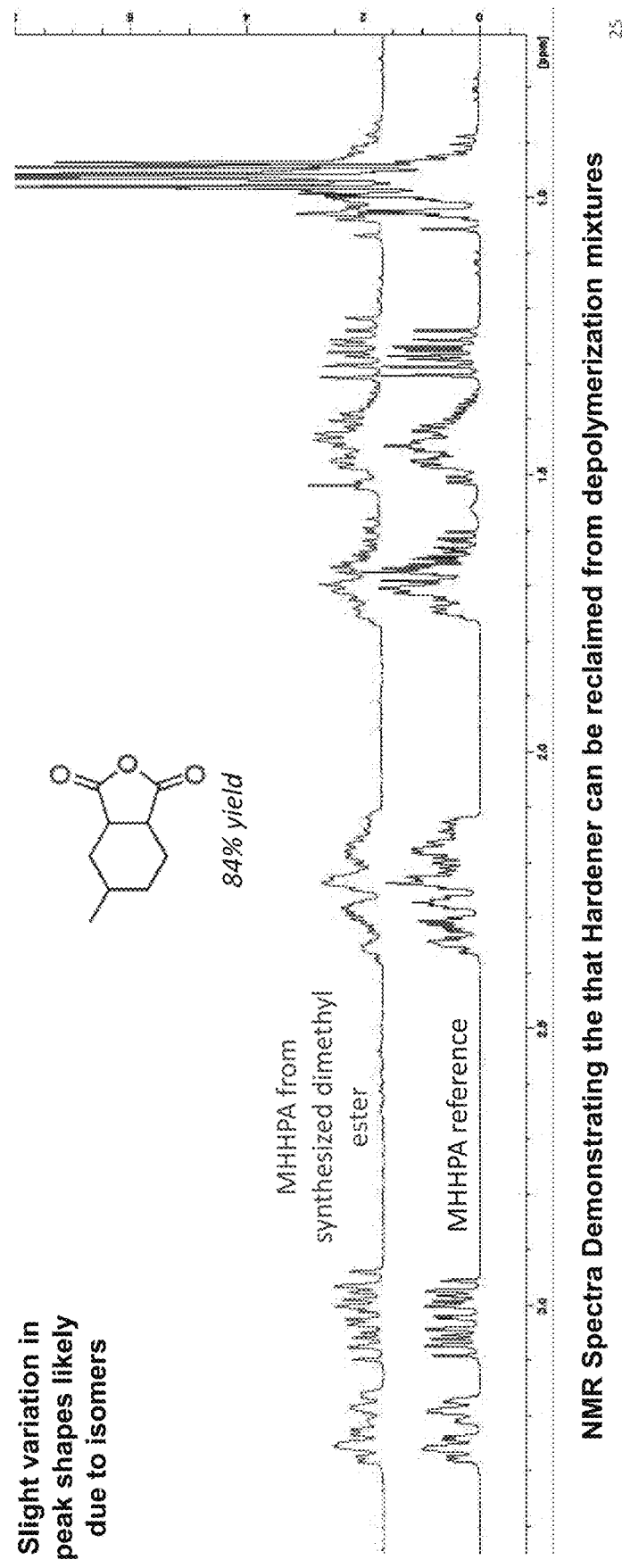
Figure 23:
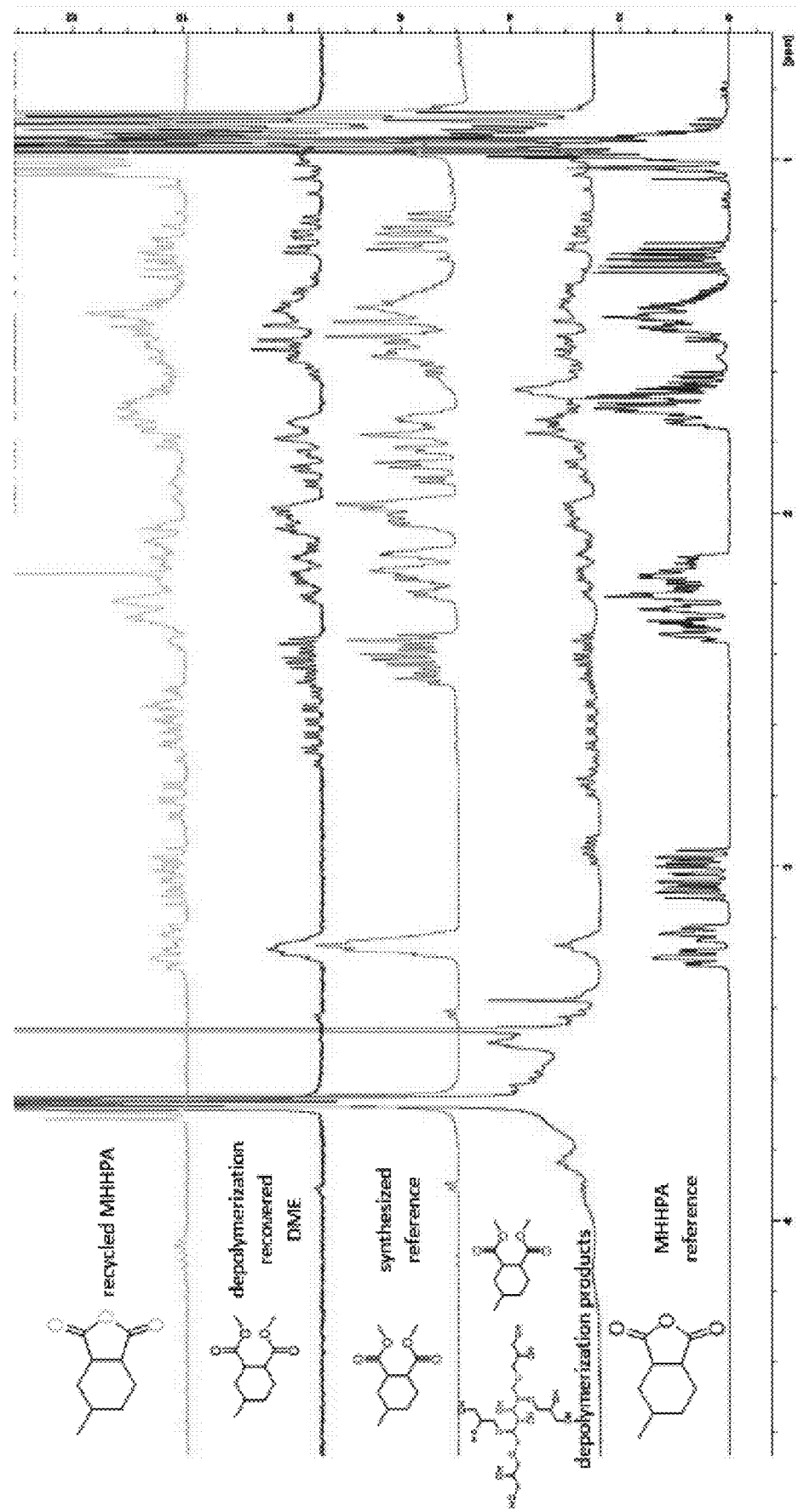

FIG. 21 summarizes the epoxy-anhydride reaction to make a bioresin having thermoset network, followed by depolymerization of the bioresin, as described herein, and according to some embodiments of the present disclosure. As shown in the exemplary chemistry shown in FIG. 21, a bioresin may be produced by reacting STGE, BDGE, and HHMPA, as described above. Notably, this specific chemistry set enables the methyl ester functionality of the resin to be converted back to the anhydride component. The NMR data illustrated in FIG. 22 validates this. The NMR traces show alignment between the starting anhydride and an anhydride converted after reaction. FIG. 23 illustrates an expanded NMR spectra of the concepts presented in FIG. 22, where the dimethyl ester is isolated from the depolymerization mixture and converted back to an anhydride.

According to some embodiments of the present disclosure, bioresins produced by the epoxy-anhydride chemistry described herein may produced using carboxylate-based epoxies, where the starting carboxylic acid reactants may be obtained from polyethylene terephthalate (PET), where the resulting epoxy has the structure (TPA-DGE),

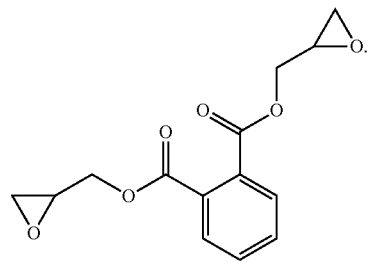 [SMILES: O=C(OCC1CO1)c1ccccc1C(=O)OCC1CO1]

Figure 24:
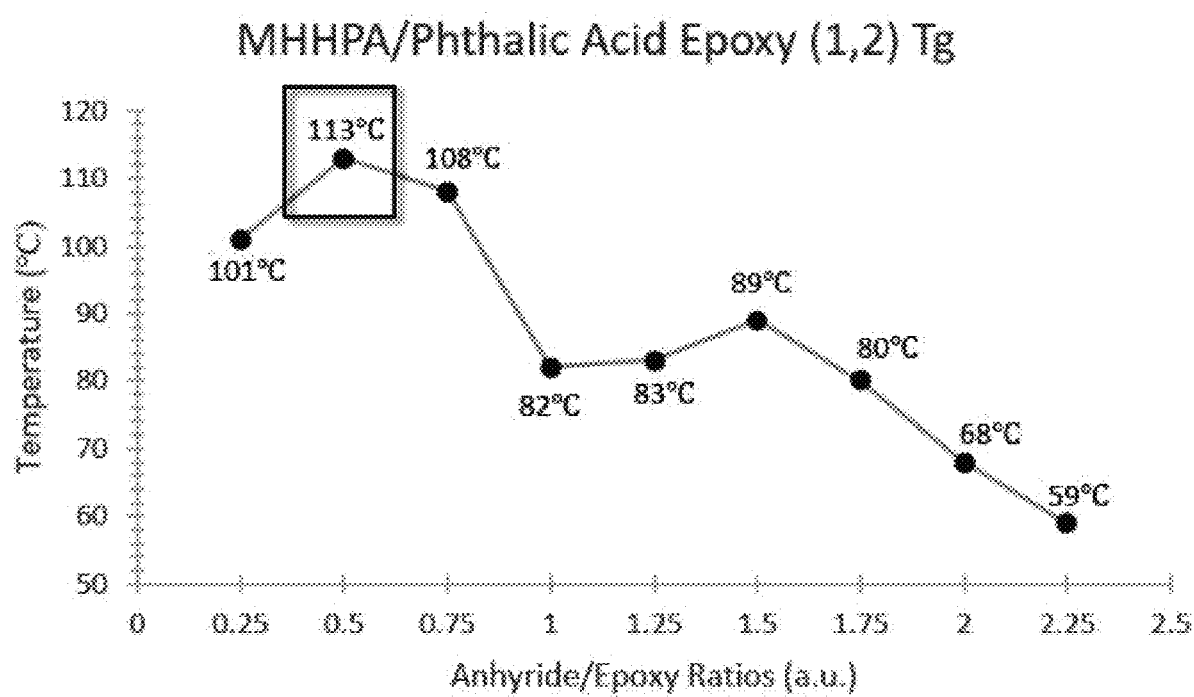
FIG. 24 illustrates the glass transition temperature resulting from the reaction of this epoxy with MHHPA as a function of the stoichiometry between the anhydride and epoxy component, according to some embodiments of the present disclosure.
Figure 25:
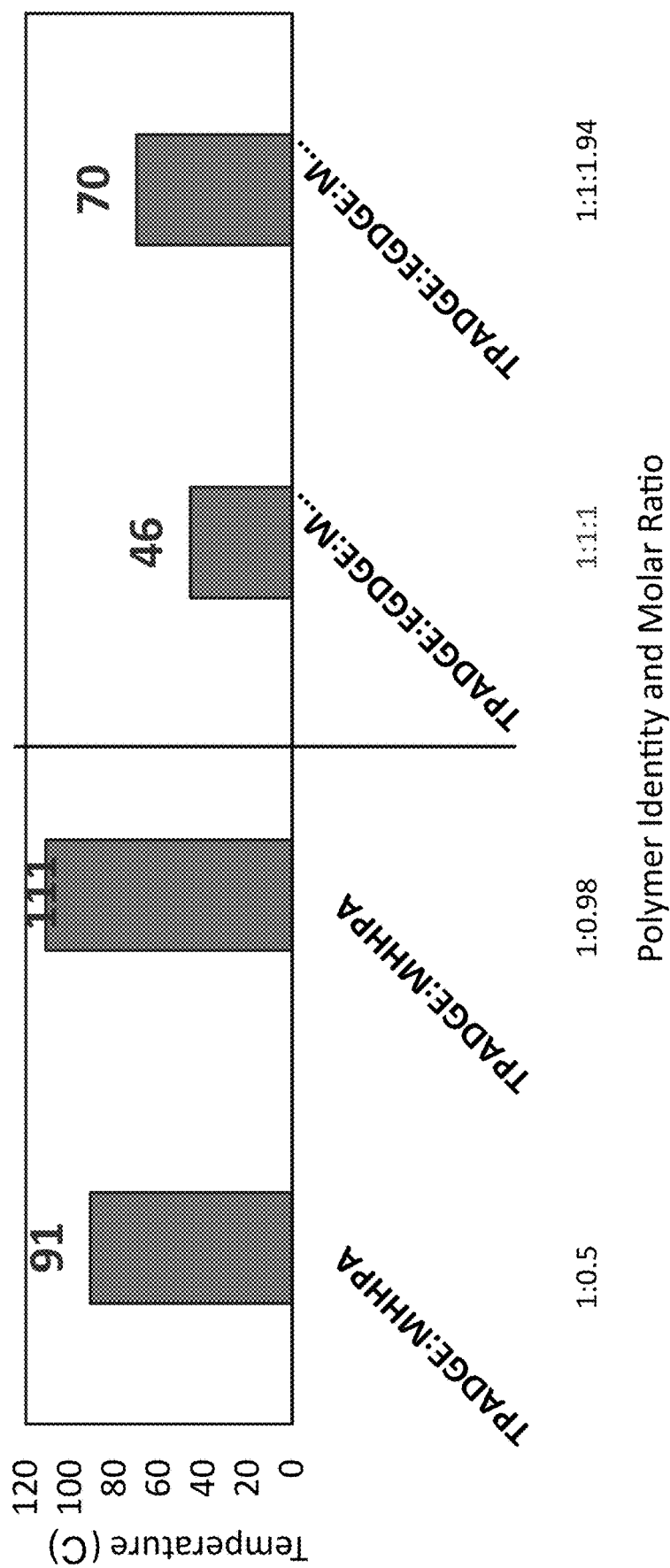
FIG. 25 illustrates that the presence of the ethylene glycol-based epoxy can reduce the glass transition temperature of the resulting bioresin, according to some embodiments of the present disclosure.

FIG. 24 illustrates the glass transition temperature resulting from the reaction of this epoxy with MHHPA as a function of the stoichiometry between the anhydride and epoxy component. At an optimal stoichiometry, the glass transition temperature was a maximum at about 113° C. Further, FIG. 25 illustrates that the presence of the ethylene glycol-based epoxy can reduce the glass transition temperature of the resulting resin, where EG-DGE corresponds to the epoxy reactant having the following structure:

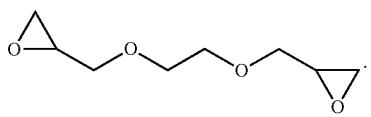 [SMILES: C(COCC1CO1)OCC1CO1]

Figure 26:
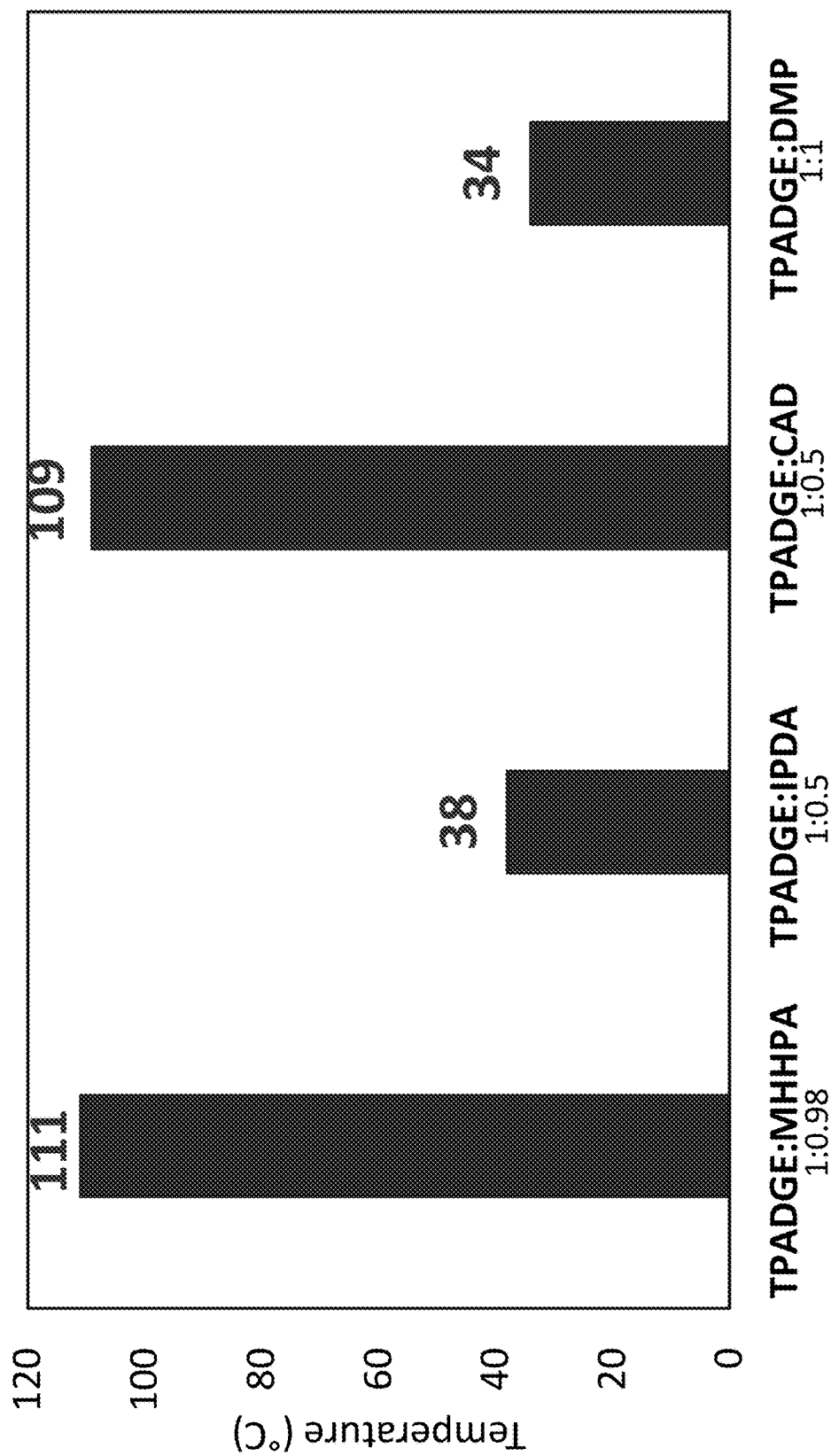
FIGS. 26 and 27 illustrate glass transition temperatures of bioresins resulting from the reaction of terephthalic acid-based epoxy with different hardeners, according to some embodiments of the present disclosure.
Figure 27:
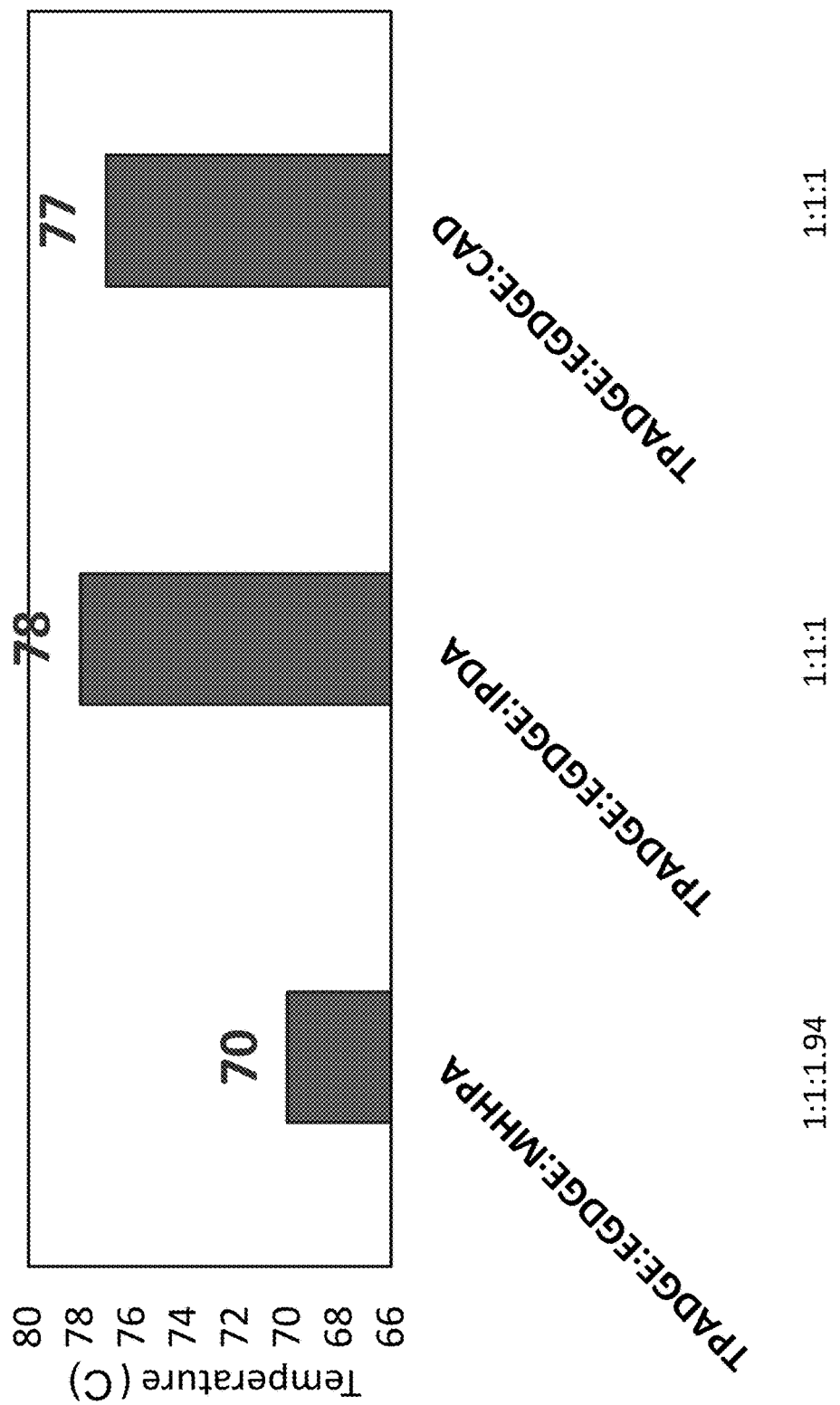

FIGS. 26 and 27 illustrate glass transition temperatures of resins resulting from the reaction of terephthalic acid-based epoxy with different hardeners. Due to the ester moiety in the epoxy, recyclability was consistently maintained even when traditional amine-based hardeners were used. The benefit of this strategy is that recyclability can be maintained while other virtue of amine bonds can be incorporated. The nomenclature used in FIGS. 26 and 27 correspond to the following structures (CAD, DMP, and IPDA, respectively:

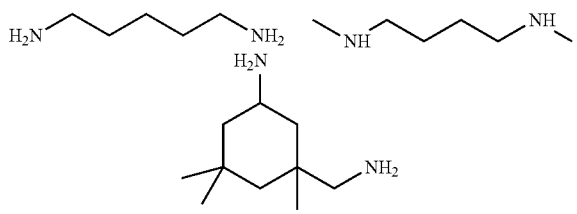

Experimental Methods:

Materials: Hexahydro-4-methylphthalic anhydride (mixture of cis and trans), bisphenol A di-glycidyl ether, and potassium carbonate were purchased from Sigma-Aldrich. Isophorone diamine was purchased from TCI Chemicals. Sorbitol derived tetrafunctional epoxy (Erisys GE-60), 1,4-butanediol derived difunctional epoxy (Erisys GE-21), 1,6-hexanediol derived difunctional epoxy (GE-25), and 2-ethyl-4-methyl imidazole (EMI) were obtained from CVC Thermoset Specialties. 1200 gsm unidirectional fiberglass (part number U-E-1182 g/m²-1500 mm) was obtained from Saertex, and a 3 oz plain weave carbon fiber was obtained from Fiber Glast. All reagents were used as received.

Polymer fabrication: Neat polymer samples were prepared by mixing the monomers in a 2:1 molar ratio between epoxy and anhydride, in ~50-gram scale. The mixed resin was placed under vacuum for 30 min to remove bubbles. Subsequently, the resin was casted into moulds with a desired geometry (e.g., rectangular bars, tensile test specimen), and the casted resin was cured in an oven at 80° C. for 5 hours.

Fabrication of fiber reinforced composites: Composites specimens were prepared by vacuum assisted resin transfer moulding (VARTM) in the Composites Manufacturing Education and Technology (CoMET) facility at NREL. One-square foot composite panels were manufactured and cut into desired test specimens. Resin was degassed for 15 minutes prior to infusion. Infusion times and processing methods were similar between the traditional Hexion epoxy amine and the bio-derivable epoxy anhydride. Resin mixtures were homogenized by stirring and subsequently degassed for 15 minutes under vacuum. The resin was then infused, via a tube, to layers of fiber that were horizontally laid on a glass surface. For one-square foot panels, an infusion time of ~10 min was observed for the resin to fully wet the fiber. The infused resin was cured by applying a heating blanket that was set at 80° C. for 5 h. Lastly, the composites were cut into desired test specimens for mechanical testing. The process was same for both glass and carbon fibers used in this work.

Slurry preparation: Carbon black-epoxy slurries were prepared by weighing 1 g of Vulcan XC72R powder into a glass jar. For the Bio-1 formula slurry, 4.9 g of the Bio-1 material was added to the carbon black, followed by 15 g of acetone. For the commercial material slurry, 6 g of Hexion Epon 828 were added to the jar, followed by 15 g of acetone. To each jar, 90 g of high-density zirconia beads were added. The slurries with beads were ball milled overnight to disperse the carbon black. After mixing, 4 g of hardener and 0.09 g of accelerator were added to the Bio1 slurry. To the commercial slurry, 1.5 g each of Hexion Epikure 3381 and Hexion Epikure 3010 were added. The slurries were then returned to the rollers for 5 minutes to mix the components.

Resistance measurements: The sheet resistances of the films were measured using a custom built 4-point probe with Keithley digital multimeter to supply the source current and measure voltage. To convert the sheet resistances to resistivity the measured sheet resistances were multiplied by the film thickness, which was measured using a micrometer. The thicknesses were measured in at least 3 locations for each conductivity measurement. The conductivity was measured twice in the same spot, once increasing the current from negative to positive and then in the opposite direction, to ensure there was no charging of the film or other hysteresis. The applied current range was −0.1-0.1 mA.

Material characterization: Fourier-transform infrared spectroscopy (FTIR). A single reflectance attenuated total reflection (ATR) setup was used on a ThermoFisher 6700 spectrometer. The curing reaction was monitored by the shift of carbonyl vibration from anhydride to ester.

Dynamic mechanical analysis (DMA). Samples with approximately 30 mm (L)*10 mm (W)*1 mm (T) were loaded by a tension clamp on a TA Q800, and were monitored over an oscillatory strain of 0.1% at 1 Hz, from 35° C. to 200° C. The glass transition temperature ($T_g$) was determined by the highest point on the tan d curve. Rubbery modulus was defined as the storage modulus at $T=T_g+40°$ C.

Differential scanning calorimetry (DSC). Samples (~10 mg) were loaded by an aluminium pan on a TA Q2000 with an autosampler. A "first" heating cycled was used to erase thermal history. The glass transition temperature ($T_g$) was determined by extrapolating the middle point of the "step" that was observed in the "second" heating cycle.

Transverse tensile testing and in-plane compression testing were selected for initial composite characterisation due to the resin-dominant failure modes represented in these tests. These tests were done according to ISO 14126 or transverse tension (dogbone specimens) and ISO 527-5 for compression (rectangular specimen).

Whether or not a reactant or product described herein is "bioderived" may be determined by analytical methods. Using radiocarbon and isotope ratio mass spectrometry analysis, the bio-based content of materials can be determined. ASTM International, formally known as the American Society for Testing and Materials, has established a standard method for assessing the biobased content of carbon-containing materials. The ASTM method is designated ASTM-D6866. The application of ASTM-D6866 to derive a "biobased content" is built on the same concepts as radiocarbon dating, but without use of the age equations. The analysis is performed by deriving a ratio of the amount of radiocarbon (14C) in an unknown sample to that of a modern reference standard. The ratio is reported as a percentage with the units "pMC" (percent modern carbon). If the material being analyzed is a mixture of present-day radiocarbon and fossil carbon (containing no radiocarbon), then the pMC value obtained correlates directly to the amount of biomass material present in the sample. Thus, ASTM-D866 may be used to validate that the compositions described herein are and/or are not derived from renewable sources.

Polymer/Resin Examples

Example 1. A composition comprising: a structure comprising

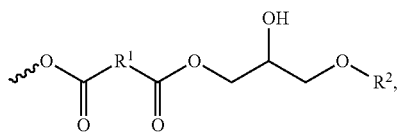

wherein: $R_1$ comprises at least one of a carbon atom or an oxygen atom, $R^2$ comprises at least one of a carbon atom or an oxygen atom, and ⌇ represents a covalent bond.

Example 2. The composition of Example 1, wherein the composition is bioderived.

Example 3. The composition of either Example 1 or Example 2, wherein $R_2$ comprises a hydrocarbon chain having between 1 and 10 carbon atoms.

Example 4. The composition of any one of Examples 1-3, wherein the hydrocarbon chain is a straight chain.

Example 5. The composition of any one of Examples 1-4, wherein the hydrocarbon chain is a branched chain.

Example 6. The composition of any one of Examples 1-5, wherein the hydrocarbon chain is saturated.

Example 7. The composition of any one of Examples 1-6, wherein the hydrocarbon chain is unsaturated.

Example 8. The composition of any one of Examples 1-7, wherein the hydrocarbon chain further comprises at least one of a hydroxyl group, a carboxylic acid group, a glycidal ether, or an aromatic.

Example 9. The composition of any one of Examples 1-8, wherein the structure comprises at least one of

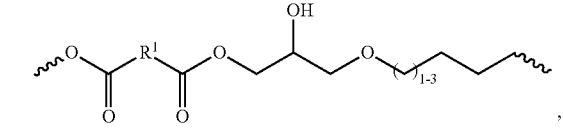

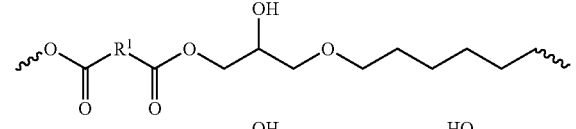

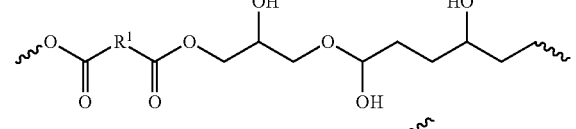

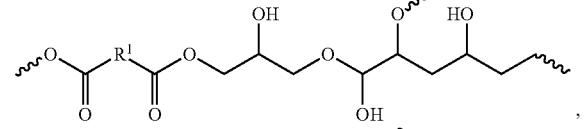

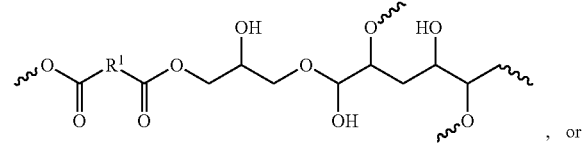

, or

-continued

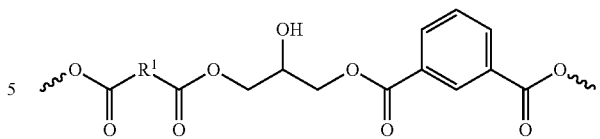

Example 10. The composition of any one of Examples 1-9, wherein the structure comprises at least one of

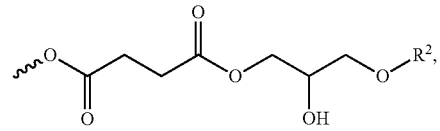

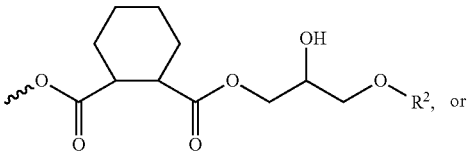

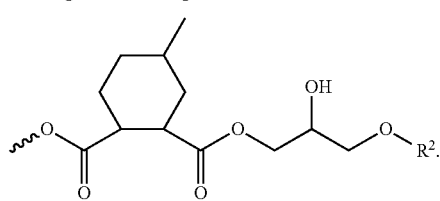

Example 11. The composition of any one of Examples 1-10, wherein the structure comprises at least one of

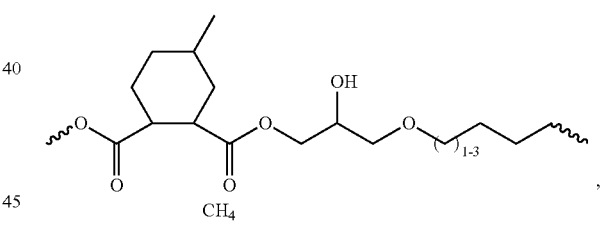

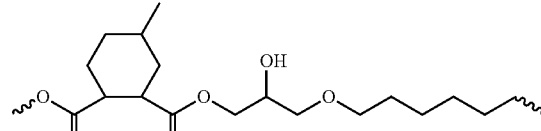

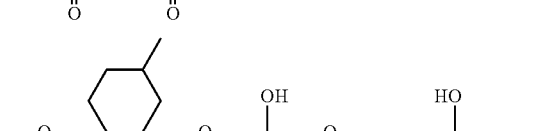

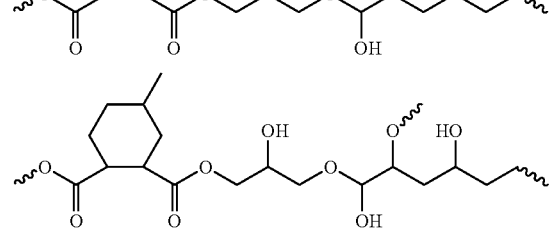

,

Example 12. The composition of any one of Examples 1-11, wherein the structure comprises

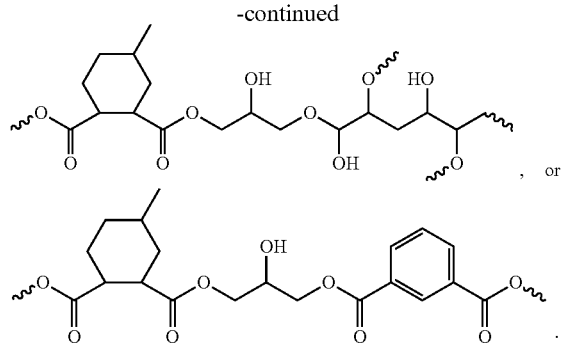

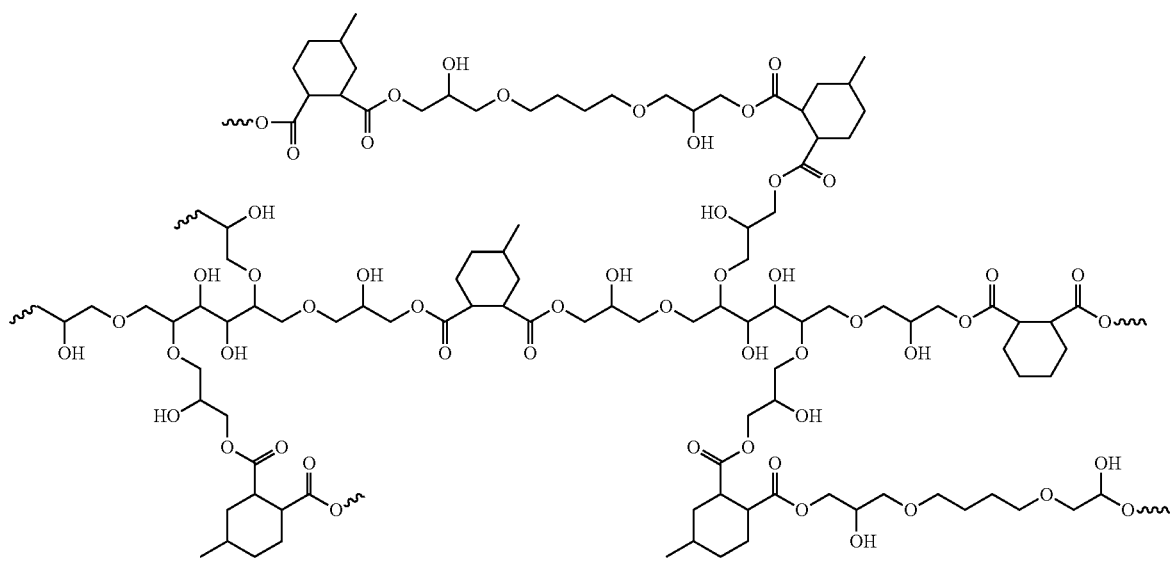

Example 13. The composition of any one of Examples 1-12, further comprising a glass transition temperature between about 60° C. and about 130° C. or between about 40° C. to 150° C.

Example 14. The composition of any one of Examples 1-13, further comprising a storage modulus between about 10 MPa and about 140 MPa or between about 1 MPa and about 10000 MPa.

Example 15. The composition of any one of Examples 1-14, further comprising an ultimate tensile modulus between about 45 MPa and about 75 MPa or between about 50 MPa and about 60 MPa.

Example 16. The composition of any one of Examples 1-15, further comprising at least one of a fiber or a particle such as a glass fiber, a carbon fiber, or a carbon black particle.

Composite Examples

Example 1. A composite comprising: a composition having a structure comprising

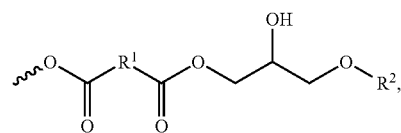

and at least one of a fiber or a particle such as a glass fiber, a carbon fiber, or a carbon black particle, wherein: $R_1$ comprises at least one of a carbon atom or an oxygen atom, $R^2$ comprises at least one of a carbon atom or an oxygen atom, and ⁓ represents a covalent bond.

Example 2. The composite of Example 1, further comprising an in-plane compression strength between about 100 MPa and about 160 MPa or between about 1 MPa an about 1000 MPa.

Example 3. The composite of either Example 1 or Example 2, further comprising an transverse modulus between about 5 GPa and about 20 GPa or between about 0.1 GPa an about 50 GPa.

Example 4. The composite of any one of Examples 1-3, further comprising carbon black resulting in a sheet resistance between about 1×10³ to about 4×10³ Ω/.

Laminate Examples

Example 1. A composite comprising: a first film comprising at least one of a polymer or a resin having a structure comprising

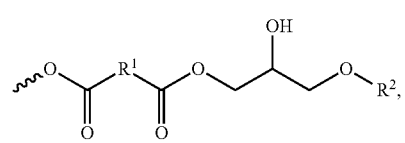

and a second film comprising at least one of a polymer or a glass, wherein: $R_1$ comprises at least one of a carbon atom or an oxygen atom, $R^2$ comprises at least one of a carbon atom or an oxygen atom, and ⁓ represents a covalent bond.

Example 2. The composite of Example 1, further comprising a third film comprising at least one of a polymer or a glass, wherein: the first film is positioned between the second film and the third film.

Example 3. The composite of either Example 1 or Example 2, wherein the polymer of the second film comprises at least one of polyester, polyethylene, polypropylene, ethylene vinyl alcohol, or ethylene vinyl alcohol.

Example 4. The composite of any one of Examples 1-3, wherein the polymer of the third film comprises at least one of polyester, polyethylene, polypropylene, ethylene vinyl alcohol, or ethylene vinyl alcohol.

Example 5. The composition of any one of Examples 1-4, wherein the first film has a thickness between about 0.1 μm and about 100 μm.

Methods of Making Polymers/Resins Examples

Example 1. A method for making a polymer or resin, the method comprising: reacting a first compound with a second compound to form at least one of the polymer or resin, wherein: the first compound has a first structure comprising

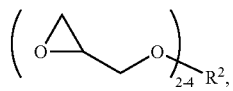

the second compound has a second structure comprising

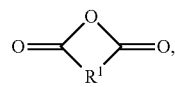

the polymer or resin has a third structure comprising

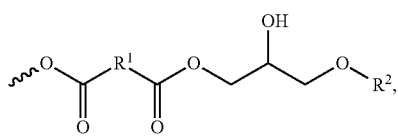

$R_1$ comprises at least one of a carbon atom or an oxygen atom, $R^2$ comprises at least one of a carbon atom or an oxygen atom, and ⤳ represents a covalent bond.

Example 2. The method of Example 1, wherein: the reacting further comprises a third compound, the third compound has a third structure comprising

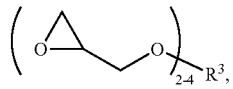

and $R^3$ comprises at least one of a carbon atom or an oxygen atom.

Example 3. The method of either Example 1 or Example 2, wherein at least one of the first compound, the second compound, or the third compound is bioderived.

Example 4. The method of any one of Examples 1-3, wherein $R_2$ comprises a hydrocarbon chain having between 1 and 10 carbon atoms.

Example 5. The method of any one of Examples 1-4, wherein the hydrocarbon chain is a straight chain.

Example 6. The method of any one of Examples 1-5, wherein the hydrocarbon chain is a branched chain.

Example 7. The method of any one of Examples 1-6, wherein the hydrocarbon chain is saturated.

Example 8. The method of any one of Examples 1-7, wherein the hydrocarbon chain is unsaturated.

Example 9. The method of any one of Examples 1-8, wherein the hydrocarbon chain comprises at least one of a hydroxyl group, a carboxylic acid group, a glycidal ether, or an aromatic.

Example 10. The method of any one of Examples 1-9, wherein at least one of the first structure or the third structure comprises

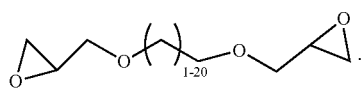

Example 11. The method of any one of Examples 1-10, wherein at least one of the first structure or the third structure comprises

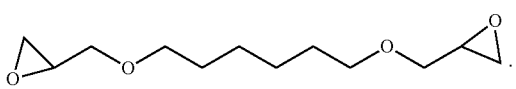 [SMILES: C(CCCOCC1CO1)CCOCC1CO1]

Example 12. The method of any one of Examples 1-11, wherein at least one of the first structure or the third structure comprises

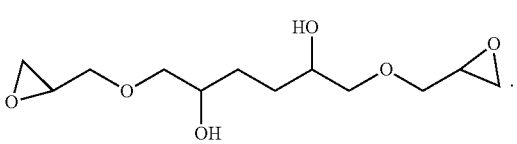 [SMILES: OC(CCC(O)COCC1CO1)COCC1CO1]

Example 13. The method of any one of Examples 1-12, wherein at least one of the first structure or the third structure comprises

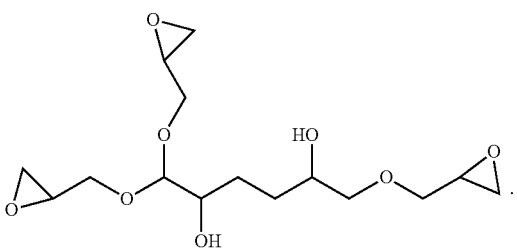 [SMILES: OC(CCC(O)C(OCC1CO1)OCC1CO1)COCC1CO1]

Example 14. The method of any one of Examples 1-13, wherein at least one of the first structure or the third structure comprises

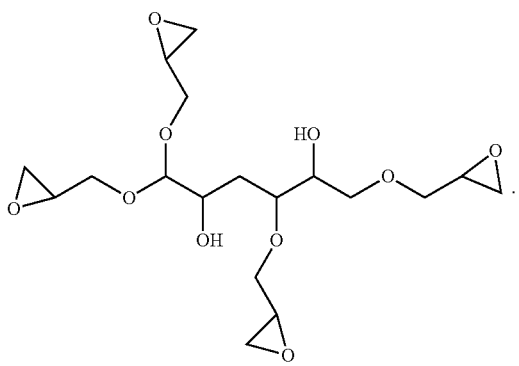 [SMILES: OC(COCC1CO1)C(CC(O)C(OCC1CO1)OCC1CO1)OCC1CO1]

Example 15. The method of any one of Examples 1-14, wherein at least one of the first structure or the third structure comprises at least one of

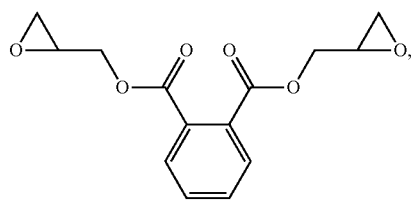

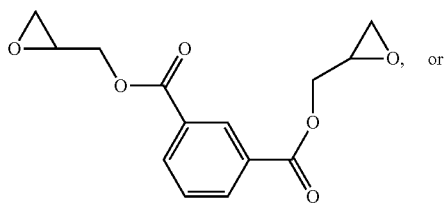  or

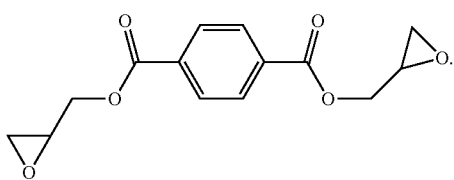

Example 16. The method of any one of Examples 1-15, wherein the second structure comprises at least one of

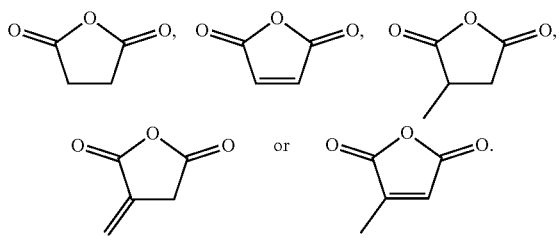

Example 17. The method of any one of Examples 1-16, wherein the second structure comprises at least one of

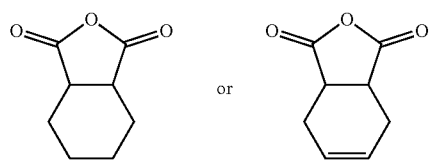

Example 18. The method of any one of Examples 1-17, wherein the second structure comprises at least one of

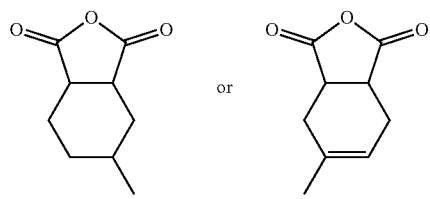

Example 19. The method of any one of Examples 1-18, wherein the third structure comprises at least one of

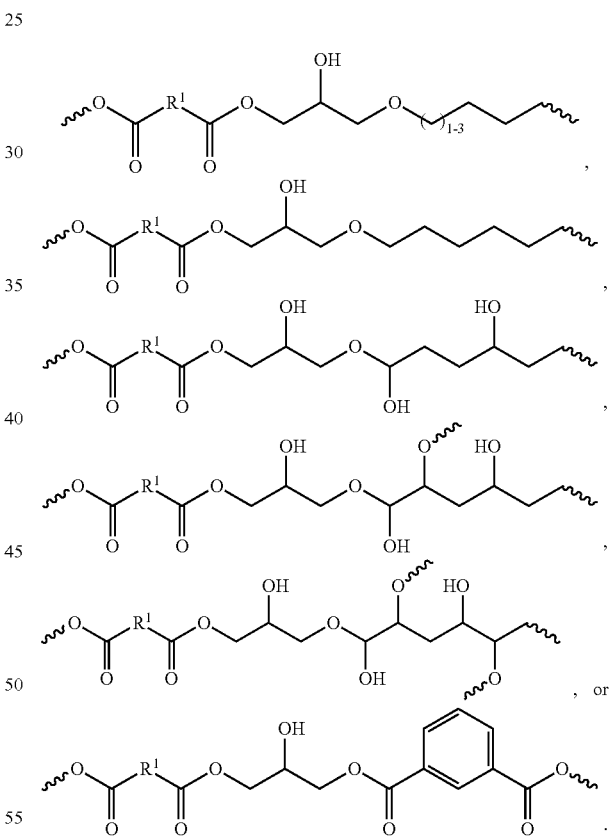

Example 20. The method of any one of Examples 1-19, wherein the third structure comprises at least one of

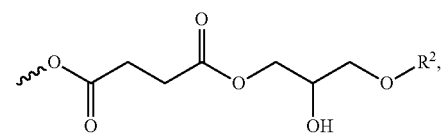

-continued

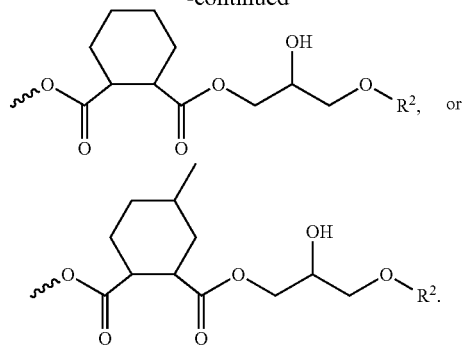

Example 21. The method of any one of Examples 1-20, wherein the third structure comprises at least one of

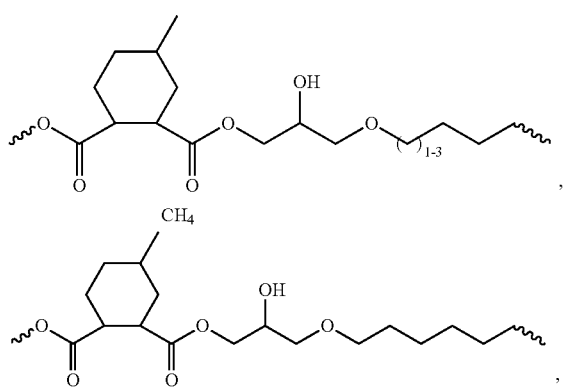

-continued

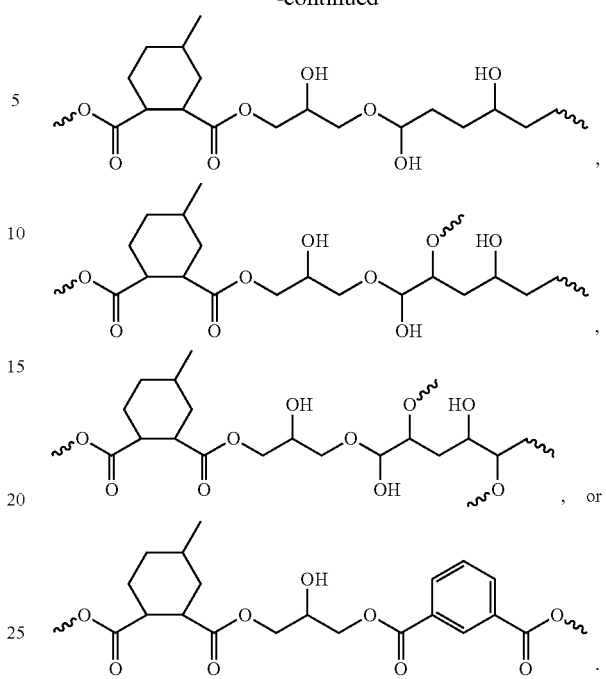

Example 22. The method of any one of Examples 1-21, wherein the third structure is derived from reacting sorbitol-derived tetra-glycidyl ether, methylhexahydrophthalic anhydride, and butanediol di-glycidyl ether.

Example 23. The method of any one of Examples 1-22, wherein the third structure comprises

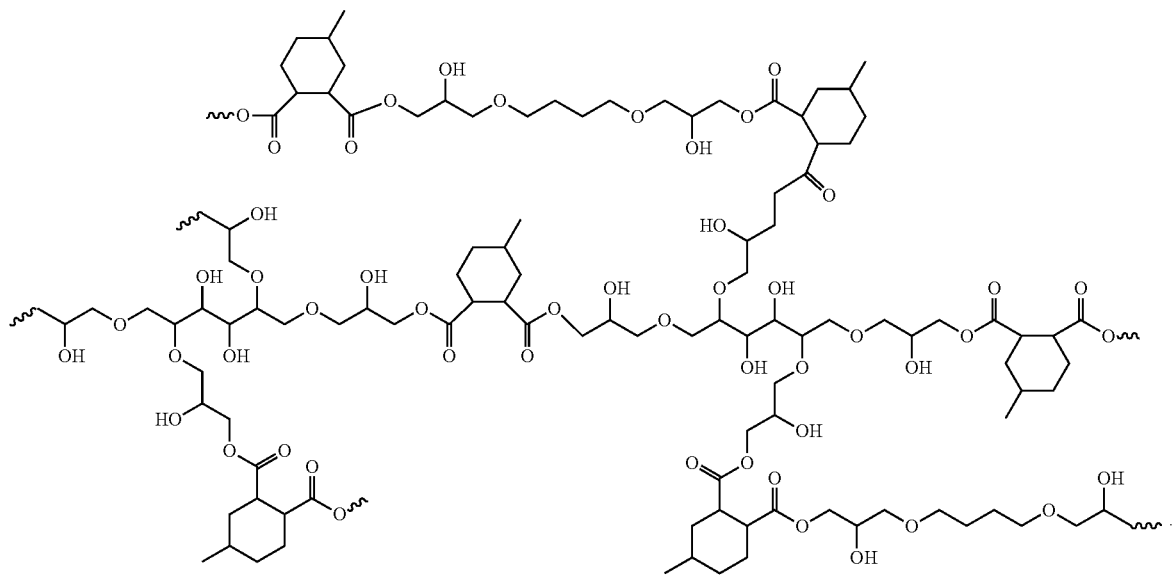

Example 24. The method of any one of Examples 1-23, further comprising a glass transition temperature between about 60° C. and about 130° C. or between about 40° C. to 150° C.

Example 25. The method of any one of Examples 1-24, further comprising a storage modulus between about 10 MPa and about 140 MPa or between about 1 MPa and about 10000 MPa.

Example 26. The method of any one of Examples 1-25, further comprising an ultimate tensile modulus between about 45 MPa and about 75 MPa or between about 50 MPa and about 60 MPa.

Example 27. The method of any one of Examples 1-26, further comprising at least one of a fiber or a particle such as a glass fiber, a carbon fiber, or a carbon black particle.

Methods of Depolymerizing Polymers/Resins Examples

Example 1. A method comprising: depolymerizing a composition comprising at least one of a polymer or a resin having a structure comprising

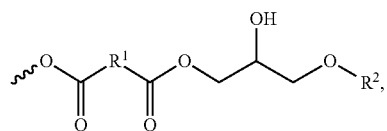

wherein: $R_1$ comprises at least one of a carbon atom or an oxygen atom, $R^2$ comprises at least one of a carbon atom or an oxygen atom, the depolymerizing results in

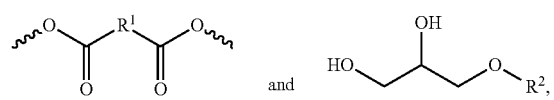

and $\sim\!\!\sim$ represents a covalent bond.

Example 2. The method of Example 1, wherein: the depolymerizing comprises the reaction

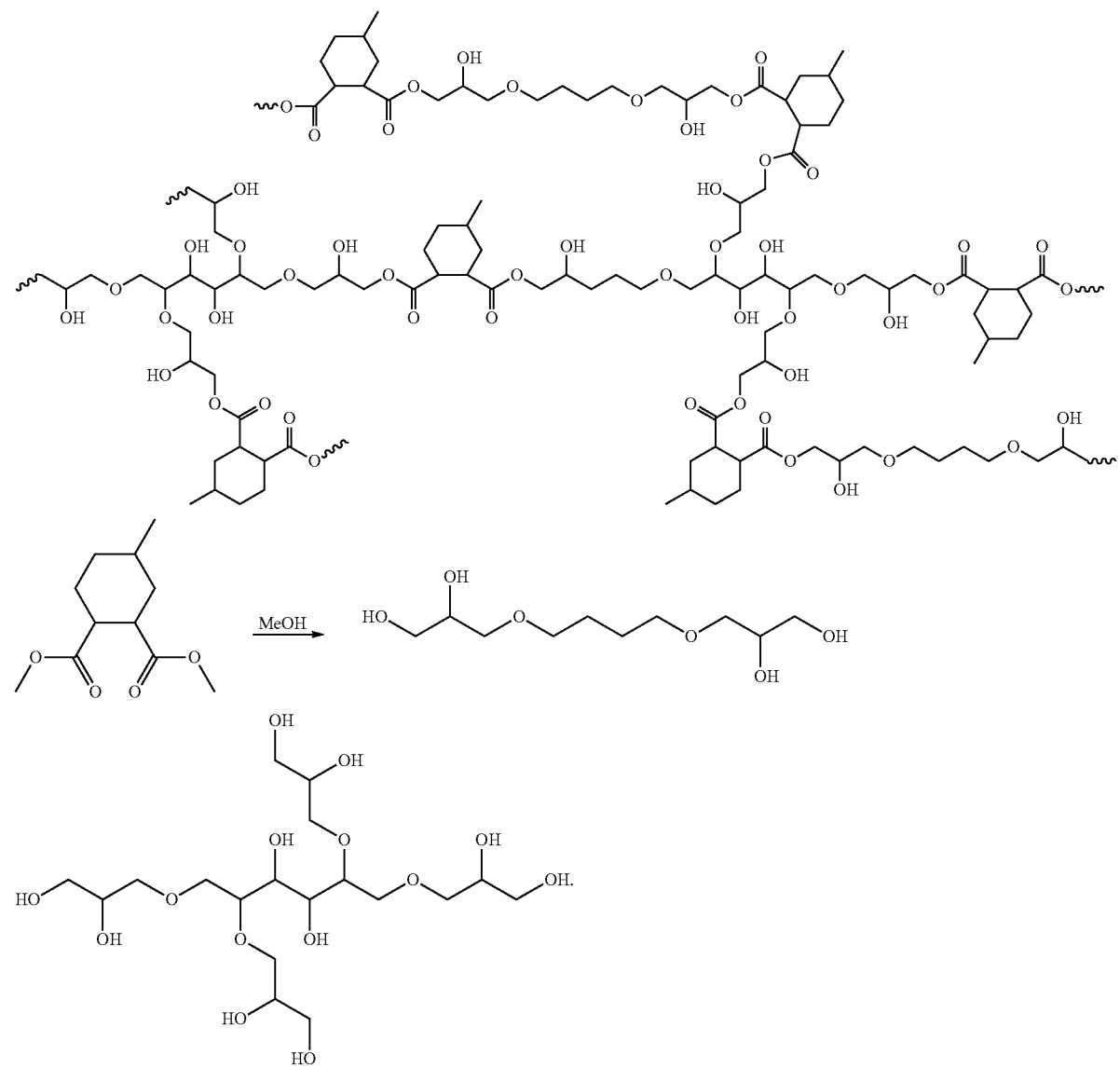

Example 3. The method of either Example 1 or Example 2, wherein: the composition further comprises a solid comprising at least one of a fiber or a particle, and the method further comprises recovering at least a portion of the solid.

Example 4. The method of any one of Examples 1-3, wherein the solid comprises at least one of a glass fiber, a carbon fiber, or a carbon black particle.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
a structure represented by Formula (I):

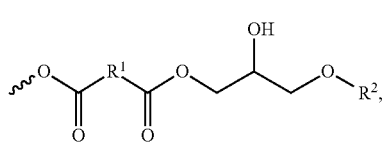

and
a glass transition temperature between 60° C. and 130° C., wherein:
$R^1$ comprises at least one of a carbon atom or an oxygen atom,
$R^2$ comprises at least one of a carbon atom or an oxygen atom, and $\sim$ represents a covalent bond.

2. The composition of claim 1, wherein the composition is bioderived.

3. The composition of claim 1, wherein $R^2$ comprises a hydrocarbon chain having between 1 and 10 carbon atoms.

4. The composition of claim 3, wherein the hydrocarbon chain is a straight chain.

5. The composition of claim 3, wherein the hydrocarbon chain is saturated.

6. The composition of claim 3, wherein the hydrocarbon chain further comprises at least one of a hydroxyl group, a carboxylic acid group, a glycidal ether, or an aromatic.

7. The composition of claim 1, wherein the structure is represented by at least one of Formulas (II), (III), (IV), (V), (VI), or (VII):

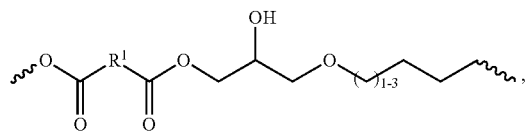

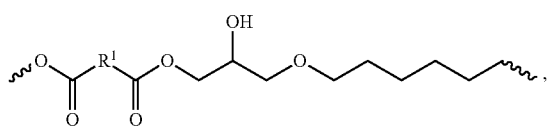

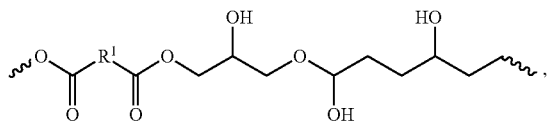

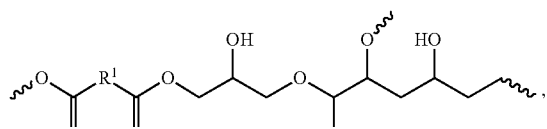

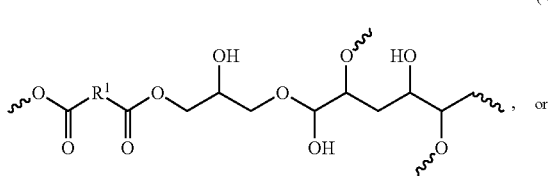

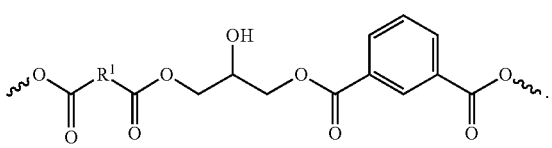

8. The composition of claim 1, wherein the structure is represented by at least one of Formulas (VIII), (IX), or (X):

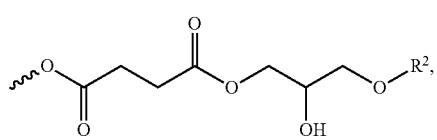

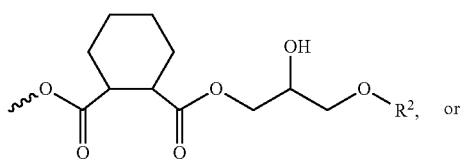

(X)
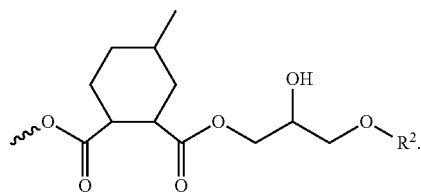

9. The composition of claim 1, wherein the structure is represented by at least one of Formulas (XI), (XII), (XIII), (XIV), (XV), or (XVI):

(XI)
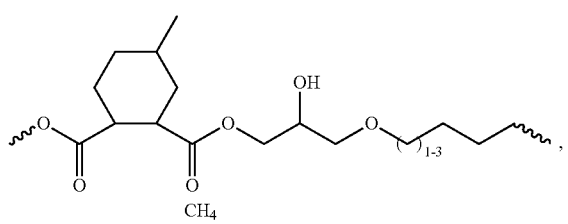

(XII)
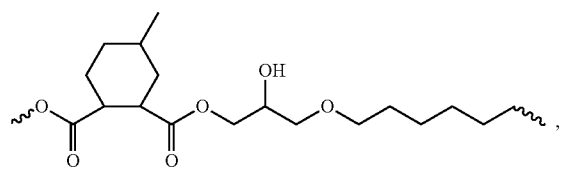

(XIII)
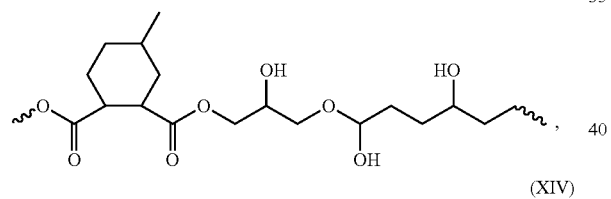

(XIV)
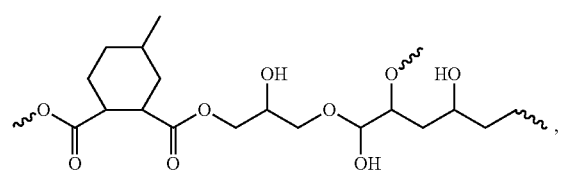

(XV)
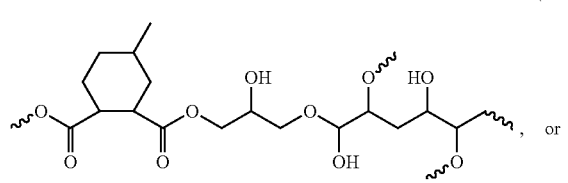

(XVI)
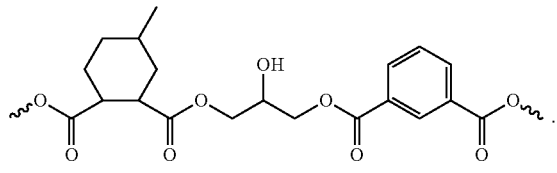

10. The composition of claim 9, wherein the structure is represented by Formula (XVII):

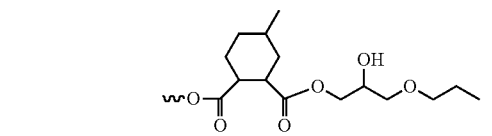

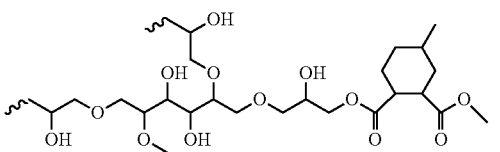

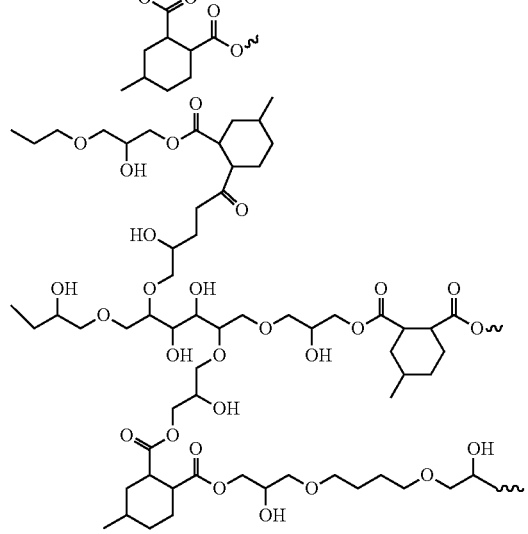

11. The composition of claim 1, further comprising a storage modulus between 10 MPa and 140 MPa.

12. The composition of claim 1, further comprising an ultimate tensile modulus between 45 MPa and 75 MPa.

13. The composition of claim 1, further comprising at least one of a fiber or a particle such as a glass fiber, a carbon fiber, or a carbon black particle.

* * * * *